United States Patent
Bryant et al.

(10) Patent No.: US 8,594,426 B2
(45) Date of Patent: Nov. 26, 2013

(54) COLOR MATCHING USING COLOR SEGMENTATION

(75) Inventors: Andrew Bryant, Los Gatos, CA (US); Daniel Pettigrew, Pacific Palisades, CA (US); Olivier Fedkiw, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 13/021,694

(22) Filed: Feb. 4, 2011

(65) Prior Publication Data

US 2012/0201451 A1 Aug. 9, 2012

(51) Int. Cl.
*G06K 9/00* (2006.01)
*G06K 9/36* (2006.01)

(52) U.S. Cl.
USPC .................................. 382/173; 382/162

(58) Field of Classification Search
USPC .................... 382/103, 162–167, 173–180
See application file for complete search history.

(56) References Cited

U.S. PATENT DOCUMENTS

| | | | |
|---|---|---|---|
| 5,130,789 A | 7/1992 | Dobbs et al. | |
| 5,317,425 A | 5/1994 | Spence et al. | |
| 5,487,020 A | 1/1996 | Long | |
| 5,715,325 A | 2/1998 | Bang et al. | |
| 5,751,845 A | 5/1998 | Dorff et al. | |
| 5,864,630 A | 1/1999 | Cosatto et al. | |
| 5,874,988 A | 2/1999 | Gu | |
| 6,118,455 A | 9/2000 | Hidaka et al. | |
| 6,137,540 A | 10/2000 | Desprez-Le Goarant et al. | |
| 6,236,750 B1 | 5/2001 | Garber | |
| 6,351,557 B1 | 2/2002 | Gonsalves | |
| 6,362,829 B1 | 3/2002 | Omvik et al. | |
| 6,400,843 B1 | 6/2002 | Shu et al. | |
| 6,456,328 B1 | 9/2002 | Okada | |
| 6,477,271 B1 | 11/2002 | Cooper et al. | |
| 6,640,005 B1 * | 10/2003 | Westerman et al. | 382/166 |

(Continued)

FOREIGN PATENT DOCUMENTS

| | | |
|---|---|---|
| EP | 0989739 | 3/2000 |
| EP | 1087614 | 3/2001 |
| WO | WO 01/26050 | 4/2001 |

OTHER PUBLICATIONS

Author Unknown, "Adobe Photoshop 5.0 Limited Edition User Guide, Chapter 4: Making Color and Tonal Adjustments," Adobe Photoshop 5.0 Limited Edition User Guide, Jan. 1, 1998, pp. 67-89, Adobe Systems Incorporated, USA.

(Continued)

*Primary Examiner* — Alex Liew
(74) *Attorney, Agent, or Firm* — Adeli & Tollen LLP

(57) ABSTRACT

Some embodiments provide a computer program for matching colors of a first image to colors of a second image. The computer program identifies a set of transforms for converting the first image to a device-independent color space. The computer program modifies the set of transforms to segment colors of the first image into a set of segmented colors. The computer program applies the modified set of transforms to pixel values of the first image in order to segment the pixels of the first image into the set of segmented colors. The computer program applies the modified set of transforms to pixel values of the second image in order to segment the pixels of the second image into the set of segmented colors. The computer program matches each segmented color in the set of segmented colors in the first image to the segmented color in the second image.

27 Claims, 56 Drawing Sheets

(56) References Cited

U.S. PATENT DOCUMENTS

| | | |
|---|---|---|
| 6,757,425 B2 | 6/2004 | Pettigrew et al. |
| 6,763,134 B2 | 7/2004 | Cooper et al. |
| 6,943,917 B2 | 9/2005 | Tamagawa |
| 7,034,849 B1 | 4/2006 | Weybrew et al. |
| 7,092,122 B2 | 8/2006 | Iwaki |
| 7,256,911 B2 | 8/2007 | Takabayashi et al. |
| 7,292,370 B2 | 11/2007 | Iwaki |
| 7,383,509 B2 | 6/2008 | Foote et al. |
| 7,508,455 B2 | 3/2009 | Liu et al. |
| 7,623,138 B2 | 11/2009 | Fukao et al. |
| 7,978,938 B1 | 7/2011 | Wilensky |
| 7,986,355 B2 | 7/2011 | Nozawa |
| 8,055,067 B2 | 11/2011 | Petrescu et al. |
| 2001/0028738 A1 | 10/2001 | Pettigrew et al. |
| 2001/0036310 A1 | 11/2001 | Pettigrew et al. |
| 2002/0041707 A1 | 4/2002 | Newman |
| 2002/0051002 A1* | 5/2002 | Kumada et al. ............... 345/600 |
| 2003/0016881 A1 | 1/2003 | Matsuura |
| 2003/0053685 A1 | 3/2003 | Lestideau |
| 2003/0103234 A1 | 6/2003 | Takabayashi et al. |
| 2004/0227768 A1 | 11/2004 | Bates et al. |
| 2004/0264767 A1 | 12/2004 | Pettigrew |
| 2005/0094896 A1 | 5/2005 | Masumura et al. |
| 2005/0238217 A1 | 10/2005 | Enomoto et al. |
| 2006/0018540 A1* | 1/2006 | Imamura et al. ............. 382/173 |
| 2007/0189627 A1 | 8/2007 | Cohen et al. |
| 2008/0117333 A1 | 5/2008 | Walsh |
| 2008/0170783 A1 | 7/2008 | Yoo et al. |
| 2010/0110101 A1 | 5/2010 | Relyea et al. |
| 2010/0295977 A1 | 11/2010 | Manabe |
| 2012/0201450 A1 | 8/2012 | Bryant et al. |
| 2012/0201452 A1 | 8/2012 | Pettigrew et al. |
| 2012/0210229 A1 | 8/2012 | Bryant et al. |

OTHER PUBLICATIONS

Author Unknown, "Adobe Photoshop 5.0 User Guide, Chapter 7: Selecting," Adobe Photoshop 5.0 User Guide, Month Unknown, 1998, pp. 137-164, Adobe Systems Incorporated.

Author Unknown, "Using Adobe Premiere Elements 8 Editor," last updated Aug. 12, 2010, 313 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Bai, Xue, et al., "A Geodesic Framework for Fast Interactive Image and Video Segmentation and Matting," Dec. 26, 2007, 8 pages, IEEE Xplore.

Farid, Hany, "Fundamentals of Image Processing," Month Unknown, 2008, 74 pages. http://www.cs.dartmouth.edu/farid/tutorials/fip.pdf.

Mortensen, Eric N., et al., "Intelligent Scissors for Image Composition," Computer Graphics Proceedings (SIGGRAPH), Aug. 6-11, 1995, pp. 191-198, IEEE, New York, USA.

Mortensen, Eric N., et al., "Interactive Segmentation with Intelligent Scissors," Graphical Models and Image Processing, Sep. 1998, pp. 349-684, vol. 60, No. 5, Academic Press, Duluth, MA, USA.

Neophytou, Neophytos, et al., "Color-Space CAD: Direct Gamut Editing in 3D," IEEE Computer Graphics and Applications, May 1, 2008, pp. 88-98, vol. 28, No. 3, IEEE Sevice Center, New York, NY, USA.

Phillips, Clifton B., et al., "Local Color Image Segmentation Using Singular Value Decomposition," Image Analysis and Interpretation, Apr. 5, 1998, pp. 148-153, IEEE Southwest Symposium on Tuscan, AZ, USA.

Rother, Carsten, et al., "GrabCut—Interactive Foreground Extraction Using Iterated Graph Cuts," Proceedings of the ACM SIGGRAPH, Month Unknown, 2004, pp. 309-3140, ACM, New York, USA.

\* cited by examiner $$\begin{bmatrix} R_{new} \\ G_{new} \\ B_{new} \end{bmatrix} = \begin{bmatrix} M1 & M2 & M3 & M4 \\ M5 & M6 & M7 & M8 \\ M9 & M10 & M11 & M12 \end{bmatrix} \times \begin{bmatrix} R_{orig} \\ G_{orig} \\ B_{orig} \\ K \end{bmatrix}$$

$R_{new} = (R_{orig} \times M1) + (G_{orig} \times M2) + (B_{orig} \times M3) + (K \times M4)$ $G_{new} = (R_{orig} \times M5) + (G_{orig} \times M6) + (B_{orig} \times M7) + (K \times M8)$ $B_{new} = (R_{orig} \times M9) + (G_{orig} \times M10) + (B_{orig} \times M11) + (K \times M12)$

*Figure 31*

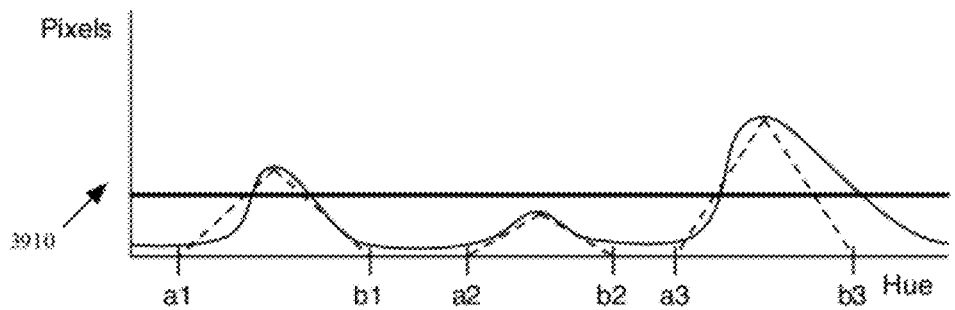
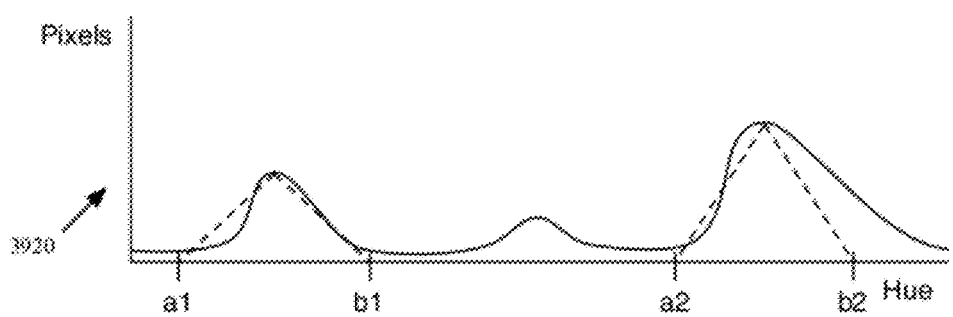
*Figure 39*

Target Image

| D1 | D2 | D3 | D4 |
| D5 | D6 | D7 | D8 |
| D9 | D10 | D11 | D12 |

Source Image

| E1 | E2 | E3 | E4 |
| E5 | E6 | E7 | E8 |
| E9 | E10 | E11 | E12 |

$$Distance = \sqrt{(E1-D1)^2 + (E2-D2)^2 + (E3-D3)^2 + (E4-D4)^2 + (E5-D5)^2 + (E6-D6)^2 + (E7-D7)^2 + (E8-D8)^2 + (E9-D9)^2 + (E10-D10)^2 + (E11-D11)^2 + (E12-D12)^2}$$

*Figure 62*

COLOR MATCHING USING COLOR SEGMENTATION

CROSS REFERENCE TO RELATED APPLICATIONS

This Application is related to the following applications: U.S. patent application Ser. No. 13/021,699, filed Feb. 4, 2011, now published as U.S. Patent Publication No. 2012/0201452; and U.S. patent application Ser. No. 13/021,701, filed Feb. 4, 2011, now published as U.S. Patent Publication No. 2012/0201450.

BACKGROUND

When editing videos or images, users of a media-editing application often want to reproduce the look and appearance of the colors of another video or image. In order to do so, users typically must make numerous adjustments to various different properties (e.g., saturation, contrast, exposure, etc.) of the media. This becomes a cumbersome process that may take a large amount of time.

Moreover, users may also want to modify the appearance of particular colors in a video or image to be similar to the appearance of the particular colors in another video or image. For example, user may wish to match the sky in an image to the sky in one of the user's favorite images. The user must isolate the portion of the image (e.g., the sky) that the user is interested in modifying and then make adjustments to the various different properties of that portion of the image. This process is similarly cumbersome and time-consuming for the user.

BRIEF SUMMARY

Some embodiments of the invention provide a novel color matching tool for a media-editing application. The color matching tool automatically matches colors of an image (e.g., target image or destination image) or video clip to colors of another image (e.g., source image or reference image) or video clip. In some embodiments, the color matching tool matches the colors of a target image to the colors of a source image by modifying the color attributes of pixels in the target image so that the colors of the target image appear the same or similar to the colors of the source image. The image that is matched (modified) will be referred to below as the target image and the image to which the target image is matched will be referred to below as the source image.

In some embodiments, the media-editing application provides a user interface tool with which a user invokes a color matching operation that matches colors of a target image to colors of a source image. Different embodiments use different techniques to implement the color matching operation. For instance, some embodiments utilize a luma-based color matching technique to match the colors of the target image to the colors of the source image. Some embodiments match the colors of the images using a hue-based color matching operation. Some embodiments use color segmentation to match the colors of the target image to the colors of the source image.

Some embodiments that employ a luma-based color matching technique identify several luma ranges (e.g., ranges of luma levels) for the target image and corresponding luma ranges for the source image based on the distribution of luma component values of pixels in each of the respective images. In some embodiments, the target image is matched to the source image in a luma-range-by-luma-range-basis.

For each identified luma range of the target image and the corresponding identified luma range of the source image, some embodiments (i) match the contrast of the pixel values in the target image that have luma component values within the luma range of the target image to the contrast of the pixel values in the source image that have luma component values within the corresponding luma range of the source image, (ii) match the average color of the pixel values in the target image that have luma component values within the luma range of the target image to the average color of the pixel values in the source image that have luma component values within the corresponding luma range of the source image, and (iii) match the saturation of the pixel values in the target image that have luma component values within the luma range of the target image to the saturation of the pixel values in the source image that have luma component values within the corresponding luma range of the source image.

To match such attributes of the target image to the corresponding attributes of the source image, some embodiments determine a set of transforms for modifying pixel values of the source image so that the above described attributes of the target image are the same or similar to the corresponding attributes of the source image. As noted above, some embodiments match the target image to the source image in a luma-range-by-luma-range-basis. In some of these embodiments, the luma-based color matching operation determines a set of transforms for each luma range of the target image and the corresponding luma range of the source image. In addition, some embodiments blend the sets of transforms to smooth out transitions between the transforms.

Instead of, or in conjunction with, a luma-based color matching operations, some embodiments provide a hue-based color matching operation. The hue-based technique of some embodiments identifies dominant hue ranges (e.g., ranges of dominant hues) in each of the images based on the distribution of hue component values of pixels in each of the respective images. Some embodiments identify dominant hue ranges in the target image that are similar to dominant hue ranges in the source image as corresponding dominant hue ranges.

To identify corresponding dominant hue ranges, some embodiments determine whether a dominant hue range in the target image is similar to a dominant hue range in the source based on a set of criteria. For instance, some embodiments determine the similarity between dominant hue ranges based on the peak distribution of pixels (e.g., the height of the hue ranges) of each of the hue ranges, the number of different hue component values in the hue ranges (e.g., the width of the hue ranges in a color space), and the amount of hue component values that the dominant hue ranges share (i.e., the intersection of the hue ranges).

Based on the corresponding dominant hues, the hue-based color matching operation of some embodiments determines transforms for matching the hues of pixels in the target image that are within a dominant hue to the hues of pixels in the source image that are within the corresponding dominant hue. In some embodiments, the transforms include hue shift transforms that shift the dominant hues of the target image to align with the corresponding dominant hues of the source image. The transforms are applied to the target image to match the colors of the target image to the colors of the source image.

As mentioned previously, some embodiments implement the color matching operation using color segmentation, either instead of or in conjunction with the color matching techniques described above. In some embodiments, the color matching operation applies a transform for mapping particular colors of the target image to a color in a set of colors and mapping particular colors of the source image to a color in a corresponding set of colors. For example, the transform of some embodiments maps blue colors and bright colors (e.g., highlights) to blue colors and maps red colors, brown colors, and dark colors (e.g., shadows) to red and/or brown colors. In some embodiments, the transform is a modified version of a transform for converting the pixel values of the images to a device-independent color space that is optimized for identifying colors in an image (e.g., an XYZ color space). Such embodiments take advantage of the device-independent color space's ability to better identify colors (e.g., highlights and shadows) in the image compared to other color spaces (e.g., an RGB color space) to more accurately map particular colors to a color in the set of colors.

After the colors in each image are mapped into the set of colors, each color of the set of colors in the target image is matched to the corresponding color in the source image. Some embodiments match a set of characteristics of a color in the set of colors in the target image to a corresponding set of characteristics of the color in the source image. The set of characteristics include the average color value of the color, the average color value of dark portions of the image with the color, the average color value of bright portions of the image with the color, the average saturation value of the color, and the contrast of the color, in some embodiments.

To determine the set of characteristics of a particular color in an image, some embodiments identify the pixel values of the pixels with the particular color and determine the characteristics based on the pixel values of those pixels. For example, average color values of the pixels with the particular color are determined by averaging the color values of the pixels. The average saturation value of pixels with the particular color is similarly determined by averaging the saturation values of the pixels. Some embodiments determine the average color of bright pixels and dark pixels of the particular color using luminance thresholds to identify bright and dark pixels and then averaging the color values of those pixels, respectively.

After determining the set of characteristics of the target image and the source image, some embodiments determine transforms to match the set of characteristics of each color in the set of colors of the target image to the set of characteristics of each corresponding color in the source image. In some embodiments, the transforms modify the pixel values of the target image so that the set of characteristics of each color in the set of colors of the source image matches the set of characteristics of each color of the source image. The transforms are then applied to the target image in order to match the colors in the set of colors of the target image to the corresponding colors of the source image.

Before converting the target and source images to a device-independent color space in order to map the colors of the images to a set of colors and matching the colors in the set of colors of the target image to the corresponding colors of the source image, some embodiments perform an overall color matching operation. The overall color matching operation of some embodiments matches a set of characteristics of the target image to a corresponding set of characteristics of the source image. Different embodiments define different combinations of characteristics of an image for the overall color matching operation. Examples of characteristics include the average color of the image, the average color of dark portions of the image, the average color of bright portions of the image, the average saturation of the image, the contrast of the image, among other characteristics.

Some embodiments analyze the pixel values of an image in order to determine the set of characteristics of the image. In some embodiments, the characteristics of a color described above are determined in a similar manner except the characteristics are determined based on the pixel values of all the pixels in the image instead of the pixel values of pixels that have a particular color. Once the overall color matching operation determines the set of characteristics for the target image and the source image, some embodiments determine transforms for matching the set of characteristics of the target image to the corresponding set of characteristics of the source image. These transforms modify the pixel values of pixels in the target image so that the set of characteristics of the target image match to the corresponding set of characteristics of the source image. After these transform are determined, the transforms are applied to the target image to match the set of characteristics of the target image to the corresponding set of characteristics of the source image.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 31 illustrates an example of determining new values for a pixel of a target image.

FIG. 39 illustrates an example of filtering of dominant hue ranges identified by the process illustrated in FIG. 38 according to some embodiments of the invention based on a predefined threshold.

FIG. 62 illustrates an example of determining closeness between two images.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel color matching tool for a media-editing application. The color matching tool automatically matches colors of an image (e.g., target image or destination image) or video clip to colors of another image (e.g., source image or reference image) or video clip. In some embodiments, the color matching tool matches the colors of a target image to the colors of a source image by modifying the color attributes of pixels in the target image so that the colors of the target image appear the same or similar to the colors of the source image. The image that is matched (modified) will be referred to below as the target image and the image to which the target image is matched will be referred to below as the source image. In some embodiments, the target image and the source image may each be a still image, an image (e.g., frame or field) in a video, or any other type of image.

An image in some embodiments is an array of pixels (e.g., 800×600 pixels, 1024×768 pixels, 1600×1200 pixels). Each pixel represents a portion of the image and includes the color and brightness information for such portion of the image. Different embodiments represent the color and brightness information of pixels in an image differently for different color spaces. For instance, for an image defined in an RGB color space, the pixels' color and brightness information are represented by a red component value, a green component value, and a blue component value in some embodiments. In other embodiments, the color and brightness of pixels of an image defined in a Y'CbCr color space are represented using a luma (Y') component value for brightness and a blue-difference (Cb) component value and a red-difference (Cr) component value for chrominance (i.e., color). In some embodiments, the luma component is the weighted sum of the nonlinear gamma compressed R'G'B' components. In some of these embodiments, R'G'B' is gamma corrected red, green, and blue components. Other ways of representing the pixels' color and brightness are possible for images defined in other color spaces. A video clip is a sequence of images (e.g., frames) in some embodiments.

Figure 1:
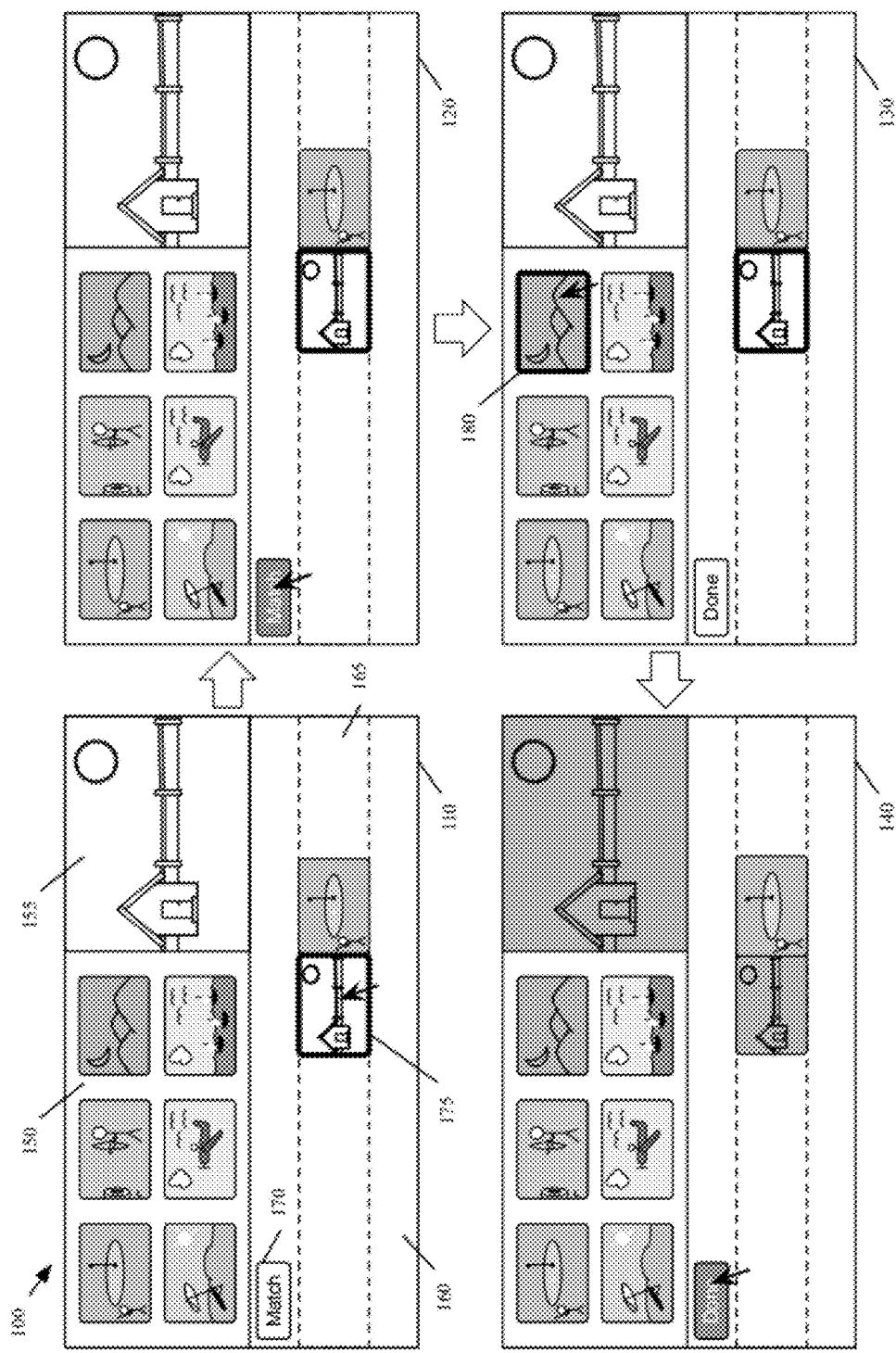
FIG. 1 conceptually illustrates a graphical user interface of a media-editing application that provides a color matching tool of some embodiments.

FIG. 1 conceptually illustrates a graphical user interface (GUI) 100 of a media-editing application of some embodiments that provides such a color matching tool. Specifically, FIG. 1 illustrates the GUI 100 at four different stages 110-140 of a color matching operation of the color matching tool that matches the colors of a target image to the colors of a source image.

As shown in FIG. 1, the GUI 100 includes a media library 150, a preview display area 155, and a compositing display area 160. The preview display area 155 displays a preview of a composite presentation that the application creates by compositing several media clips (e.g., video clips, audio clips, audio and video clips, still images, etc.).

The media library 150 (also referred to as an "organizer display area") is an area in the GUI 100 through which a user of the application can select media clips to add to a presentation that the user is compositing with the media-editing application. In addition, the media library 150 of some embodiments can be used for other purposes, such as organizing media clips, compositing media clips, etc. The media clips in the media library 150 are represented as thumbnails that can be selected and added to the compositing display area 160 (e.g., through a cursor operation or a menu selection operation). The media clips in the media library 150 may also be represented as a list, a set of icons, or any form of representation that allows a user to view and select the various media clips in the media library 150. In some embodiments, the media library 150 may include audio clips, video clips, audio and video clips, text overlays, pictures, sequences of media clips, and other types of media clips.

The compositing display area 160 provides a visual representation of the composite presentation being created by the user. Specifically, it displays one or more geometric shapes that each represents one or more media clips that are part of the composite presentation. In some embodiments, the compositing display area 160 specifies a description of a composite presentation (also referred to as a "composite media presentation" or a "composite representation").

As shown in FIG. 1, the compositing display area 160 includes a central compositing lane 165 and a user selectable user interface (UI) item 170. The central compositing lane 165 spans a timeline and displays a graphical representation of the composite presentation by displaying thumbnail representations of media clips that form the composite presentation. One or more media clips can be placed on the central compositing lane 165.

The user selectable UI item 170 is a conceptual illustration of one or more UI items that allows the color matching tool to be invoked (e.g., by a cursor operation such as clicking a mouse, tapping a touchpad, or touching the UI item on a touchscreen). Different embodiments implement the UI item 170 differently. Some such embodiments implement the UI item 170 as a UI button while other embodiments implement the UI item 170 as a menu selection command that can be selected through a pull-down, drop-down, or pop-up menu. Still other embodiments implement the UI item 170 as a keyboard command that can be invoked through one or more keystrokes or a series of keystrokes. Yet other embodiments allow the user to invoker the color matching tool through two or more of such UI implementations or other UI implementations.

The operation of the GUI 100 will now be described by reference to the four different stages 110-140 that are illustrated in FIG. 1. The first stage 110 illustrates that a user has selected media clip 175 in the compositing display area 160 using a cursor (e.g., by clicking a mouse button, tapping a touchpad, or touching a touchscreen). The selection is illustrated by a bolding of the border of the media clip 175. In this example, the user selects the media clip 175 as the media clip that the user wants to modify (e.g., the target media clip). As shown, the thumbnail representation of the media clip 175 shows an image of a house, a fence, and a sun in the sky. For this example, the media clip 175 is a still image. However, the media clip 175 can be any other type of media clip, as mentioned above.

The first stage 110 also illustrates the image of the media clip 175 displayed in the preview display area 155. In some embodiments, the media-editing application displays the image of the media clip 175 in the preview display area 155 when the media-editing application receives the selection of the media clip 175 from the user.

The second stage 120 shows that the user has selected the user selectable UI item 170 (e.g., by clicking a mouse button, tapping a touchpad, or touching the media clip 175 on a touchscreen) to activate the color matching tool. The second stage 120 illustrates this activation by changing the appearance of the UI item 170. After the user has activated the color matching tool, the user can select another media clip (e.g., a source media clip) to which the user wishes to match the media clip 175. In some embodiments, after the user has activated the color matching tool, the media-editing application provides another user selectable UI item (e.g., a "Cancel" button) for deactivating the color matching tool. The user can select this UI item in order to deactivate the color matching tool without applying a color matching operation to the media clip 175. In some cases where the user selects this UI item to deactivate the color matching tool, the media-editing application returns to the state illustrated in the first stage 110 (without the media clip 175 selected and bolded in some embodiments).

The third stage 130 illustrates that the user has selected media clip 180 displayed in the media library 150 using the cursor (e.g., by clicking a mouse button, tapping a touchpad, or touching the media clip 180 displayed on a touchscreen). The selection of the media clip 180 is indicated by a bolding of the border of the media clip 180. Similar to the media clip 175, the media clip 180 is a still image in this example, but the media clip 180 may be any other type of media clip. As shown, the thumbnail representation of the media clip 180 shows a dark image as indicated by a gray cast in the thumbnail. As mentioned above, after the color matching tool is activated, the user selects another media clip to which the user wants to match the media clip 175. In this example, the user has selected media clip 180 as the media clip to which the user wants to match the media clip 175.

The third stage 130 also shows that the text of the UI item 170 has changed. As shown, the text of the UI item 170 has changed from "Match" to "Done". The media-editing application of some embodiments modifies the text of the UI item 170 from "Match" to "Done" and displays the modified UI item 170 when the media-editing application receives the selection of UI item 170 as described above in the second stage 120. After the user has selected a media clip to which the user wishes to match the media clip 175, the user can select the modified UI item 170 to invoke a color matching operation that matches the colors of the media clip 175 to the colors of the selected media clip.

As noted above, the media clip 180 is a still image in the example illustrated in FIG. 1. In cases where the user wants to select an image from a video clip to which the user wishes to match the media clip 175, some embodiments of the color matching tool allow the user to identify a frame in the video clip using a playhead indicator (also referred to as a scrubber bar) and to select an identified frame in the video clip using a cursor control operation (e.g., clicking a mouse button, tapping a trackpad, or touching a touchscreen). In some embodiments, the user might want to match the colors of a frame in a video clip to the colors of another frame in the same video clip. Some such embodiments provide the user with the same method noted above for identifying (i.e., using a playhead indicator) and selecting the frames in a video clip.

The fourth stage 140 illustrates that the user has selected the modified UI item 170 to invoke a color matching operation that matches the colors of the media clip 175 to the colors of the media clip 180. The fourth stage 140 illustrates the selection of the modified UI item 170 by changing the appearance of the UI item 170. As shown at the stage 140, the color matching tool has modified the colors of the media clip 175 to match the colors of the media clip 180 as indicated by the similar gray cast shown in the thumbnail representation of the media clip 175. In addition, the fourth stage 140 shows a preview of the modified media clip 175 displayed in the preview display area 155. The media-editing application of some embodiments displays the preview of the modified media clip 175 in the preview display area 155 when the media-editing application receives the selection of the modified UI item 170.

After the color matching tool completes the color matching operation, the media editing application of some embodiments removes the bolding of the border of the media clips 175 and 180 that were used in the color matching operation, as shown in the fourth stage 140. Furthermore, some embodiments of the media-editing application deactivate the color matching tool after the color matching tool completes the color matching operation by changing the text of the modified UI item 170 from "Done" back to "Match".

Some embodiments of the media-editing application provide a preview of a color matching operation applied to the target media clip before invoking the color matching operation to modify the target media clip. In this manner, the user can see how the target media clip would look with the color matching operation applied without actually applying the color matching operation to the target media clip. However, some embodiments apply the color matching operation to the target media clip when providing a preview of the color matching operation applied to the target media clip. The color matching operation might be applied to the thumbnail representation of the target media clip in some embodiments in order to save processing power when creating a preview. This allows the user to quickly browse through different media clips to select a source media clip to which the user wants to match the target media clip.

Different embodiments provide the preview of the color matching operation applied to the target media clip differently. For example, some embodiments of the media-editing application provide the preview in the preview display area 155. In such embodiments, the media-editing application displays the preview of the target media clip with the color matching operation applied to it when the user selects a source media clip to which the user wishes to match the target image (e.g., in the third stage 130). Each time the user selects a media clip in the media library 150 or the compositing display area 160, the media-editing application of these embodiments generates a preview of the target media clip with the color matching operation applied to it based on the selected source media clip. As another example, some embodiments of the media-editing application provide a second preview display area for displaying the preview when the color matching tool is activated (e.g., in the second stage 120). In some such embodiments, the second preview display area may be part of a picture-in-picture arrangement with the preview display area 155 (e.g., as the main picture or as the inset picture) while, in other such embodiments, the second preview display area is a display area separate from the preview display area 155.

FIG. 1 illustrates one arrangement of a GUI of a media-editing application. However, different embodiments of the media-editing application can be arranged any number of different ways. For example, in some embodiments, the media library 150 may be located on the right side of the GUI 100, the preview display area 155 may be located on the left side of the GUI 100, and the compositing display area 160 may be located near the top region of the GUI 100. In addition, some embodiments allow the user to move these display areas around the GUI 100. The GUI of a media-editing application of some embodiments can include additional and/or other UI elements than those illustrated in FIG. 1. For instance, some embodiments may provide a menu tool bar, user selectable UI items to resize the GUI 1 and/or display areas 150-160, other display areas, etc.

As described above, FIG. 1 illustrates one way a user of the color matching tool of some embodiments may invoke a color matching operation. Some embodiments of the color matching tool allow the user to invoke the color matching operation by first selecting two media clips and then selecting the UI item 170 to match the colors of one of the selected media clips with the colors of the other selected media clips. Conversely, some embodiments of the color matching tool allow the user to invoke the color matching operation by first selecting the UI item 170 and then selecting two media clips to match the colors of one of the selected media clips with the colors of the other selected media clip. The color matching tool of some embodiments allows the user to invoke the color matching operation using any combination of different methods described above.

The stages 110-140 of FIG. 1 show the user selecting various UI elements in the GUI 100 using a cursor. However, other embodiments provide other ways of selecting UI elements. For example, some embodiments of the media-editing application allow the user to select UI elements by touching the UI elements that are displayed on a touchscreen. As another example, the media-editing application of some embodiments allows user to select the UI elements through a keyboard command (e.g., a keystroke, a combination of keystrokes, or a series of keystrokes, etc.). In some embodiments, the media-editing application allows the user select the UI elements through a command included in a menu (e.g., a drop-down menu, a pull-down menu, a pop-up menu, etc.) Other ways of selecting the various UI elements of the GUI 100 are possible.

While the example illustrated in FIG. 1 shows a particular sequence of operations for a color matching operation, other sequences of operations are possible. For instance, after the user has activated the color matching tool in the second stage 120, the user may select any number of different media clips in the media library 150 and the compositing display area 160 in order to find a media clip (e.g., a source media clip) to which the user wishes to match the media clip 175 (e.g., a target media clip). The media clip that the user most recently selected before selecting the modified UI item 170 is the media clip to which the media clip 175 will be matched.

Figure 2:
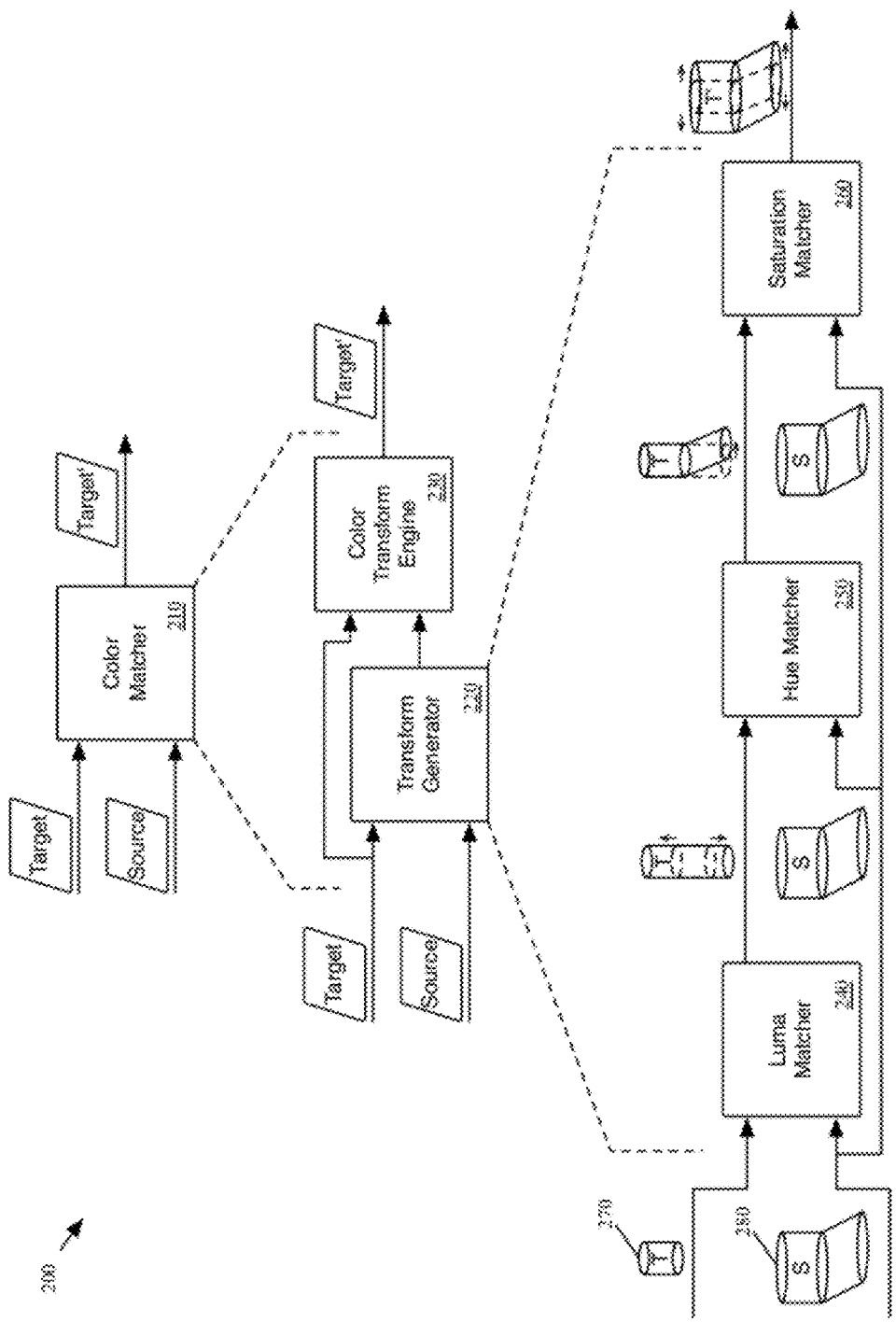
FIG. 2 conceptually illustrates a software architecture of a color matching tool of some embodiments.

The following FIG. 2 conceptually illustrates a software architecture 200 of a color matching tool of some embodiments. As shown, FIG. 2 illustrates the software architecture 200 at three different hierarchical levels. The top level of the software architecture 200 includes a color matcher 210. As illustrated at the top level, the color matcher 210 receives a target image (or a frame from a video clip) and a source image (or a frame from a video clip). In some embodiments, the color matcher 210 receives the images from a media-editing application or any other application that provides the color matching tool. The color matcher 210 analyzes the attributes (e.g., contrast, saturation, luminance, luma, hue, etc.) of each of the received images. In some embodiments, the color matcher 210 converts the color space of the received images (e.g., from RGB to Y'CbCr) before analyzing their attributes.

Based on the analyses of the images, the color matcher 210 of some embodiments modifies the target image (as indicated by the "Target'" notation) so that the colors of the target image match the colors of the source image. Instead of modifying the target image, some embodiments of the color matcher 210 generate a version of the target image with the colors that match the colors of the source image. This leaves an unmodified copy of the target image as well as the modified version with the colors matched to the colors of the source image. In some embodiments, the color matcher 210 outputs the color matched target image (e.g., to a preview display area of a GUI).

The middle level of the software architecture 200 illustrates the modules that are included in the color matcher 210 of some embodiments. As shown at this level by dashed brackets, the color matcher 210 includes a transform generator 220 and a color transform engine 230. The transform generator 220 receives the target image and the source image as input. In some embodiments, the transform generator 220 analyzes the attributes of the target image and the source image in order to determine and generate transforms that match the colors of the target image to the colors of the source image. The transform generator 220 then sends the generated transforms to the color transform engine 230.

As shown at the middle level of the software architecture 200, the color transform engine 230 receives as input the target image and receives from the transform generator 220 the transforms generated by the transform generator 220. As mentioned, the generated transforms are for matching the colors of the target image to the colors of the source image. The color transform engine 230 of some embodiments applies the transforms to the target image so that the colors of the target image match the colors in the source image. In some embodiments, the color transform engine 230 applies the transforms to an unmodified version (e.g., a copy) of the target image (since the transform generator 220 of some embodiments modifies the target image in order to determine some transforms). After applying the transforms to the target image (or a copy of the target image), some embodiments of the color transform engine 230 output the modified target image (e.g., to a preview display area of a GUI).

At the bottom level of the software architecture 200, FIG. 2 illustrates the modules that are included in the transform generator 220 of some embodiments. As shown at this level by dashed brackets, the transform generator 220 includes a luma matcher 240, a hue matcher 250, and a saturation matcher 260. Each of the modules 240-260 determines different transforms for matching different attributes of the target image to the attributes of the source image.

As shown, the bottom level also illustrates conceptual representations of the color values (e.g., pixel values) of an example target image and an example source image in a three-dimensional color space. In particular, the bottom level of FIG. 2 illustrates the conceptual effects that the transforms determined by each of the modules 240-260 have on the representations of the colors of the target image in an HSL color space (also referred to as a HLS color space), which is a hue, saturation, and luma (or lightness in some embodiments) color space in this example. In the HSL color space, the angle around a central vertical axis represents different hues, the distance from the central vertical axis represents different saturation levels, and the distance along the central vertical axis represents different levels of luma.

While these conceptual representations are shown as contiguous cylinders, one of ordinary skill in will recognize that the pixel values of an image are actually a set of discrete pixel values that may occupy an arbitrary set of points in a color space (e.g., the HSL color space shown in this example). Transforms applied by the color matching tool of some embodiments will affect each pixel value separately. In some embodiments, the pixel values of a particular pixel are the color values assigned to the pixel in a particular color space (e.g., the hue, saturation, and luma values). In addition, although the conceptual representations illustrated in FIG. 2 represent the color values of pixels in the images, the conceptual representations could instead represent the color values of pixels in the images having luma values within a particular range of luma levels. Some embodiments apply particular transforms to the pixels of an image that have luma values in a particular range of luma levels in order to modify the pixel values of those pixels.

As illustrated in FIG. 2, the luma matcher 240 receives the target image and the source image as input. As shown, a short and thin cylinder is shown for a color space representation 270 of the pixel values of the target image in the HSL color space and a tall and thick cylinder 280 with the bottom portion of the cylinder shifted towards the right is shown for a color space representation 280 of the pixel values of the source image. In some embodiments, the luma matcher 240 determines transforms for matching the luma (e.g., contrast) of the target image to the luma of the source image.

As mentioned above, the distance along the central vertical axis of the three-dimensional color space represents different levels of luma. Therefore, in this example, the luma matcher 240 determines transforms that match the range of luma levels of the pixel values of the target image to the range of luma levels of the pixel values of the source image. The effect of these transforms is conceptually illustrated by the vertical stretching of the color space representation 270 of the colors of the target image to match the vertical length of the color space representation 280 of the colors of the source image. In some embodiments, the luma matcher 240 applies the determined transform to the target image and then sends the modified target image to the hue matcher 250.

The hue matcher 250 receives from the luma matcher 240 the target image to which transforms determined by the luma matcher 240 have been applied. The hue matcher 250 also receives as input the source image. The hue matcher 250 of some embodiments determines transforms for matching the hues (e.g., colors) of the target image to the hues (e.g., colors) of the source image. In some such embodiments, the transforms are shear transformations that shift the pixel values of the target image toward the pixel values of the source image. In some embodiments, a two-dimensional shear transformation maintains a fixed axis and shifts all points parallel to the fixed axis by a distance proportional to their perpendicular distance from the fixed axis and a three-dimensional shear transformation maintains a fixed plane and shifts all planes parallel to the fixed plane by a distance proportional to their perpendicular distance from the fixed plane.

The angle around the central vertical axis of the HSL color space represents different hues, as noted above. Thus, in this example, the hue matcher 250 determines transforms that match the average pixel value at each of the levels of luma of the target image to the average pixels values at each of the corresponding levels of luma of the source image. The effect of these transforms is conceptually illustrated by the horizontal shifting (e.g., shearing) along the vertical axis of the color space representation of the target image so that the center of the circles along the vertical axis of the color space representation of the target image aligns with the center of the corresponding circles along the vertical axis of the color space representation of the source image. As shown, the lower portion of the color space representation of the target image is shifted towards the right to match the color space representation of the source image. Some embodiments of the hue matcher 250 apply the determined transform to the target image that the hue matcher 250 received from the luma matcher 240 (to which the luma matcher 240 has already applied the transforms determined by the luma matcher 240). The hue matcher 250 of some of these embodiments then sends the modified target image to the saturation matcher 260.

As shown at the bottom level of the software architecture 200 illustrated in FIG. 2, the saturation matcher 260 receives from the hue matcher 250 the target image (or a copy of the target image) that has the transforms determined by the luma matcher 240 and the hue matcher 250 applied to it. In addition, the saturation matcher 260 receives as input the source image. Some embodiments of the hue matcher 250 determine transforms for matching the saturation of the target image to the saturation of the source image.

As mentioned above, the distance from the central vertical axis of the HSL color space represents different saturation levels. As such, in this example, the saturation matcher 260 determines transforms that adjusts (e.g., increases or decreases) the saturation of the colors of the target image such that the saturation of the colors of the target image matches the saturation of the colors of the source image. The effect of these transforms is conceptually illustrated by a horizontal expansion of the color space representation of the target image to match the color space representation of the source image. As shown, FIG. 2 conceptually illustrates that the color space representation of the target image appears the same or similar to the color space representation of the source image after the transforms determined by the modules 240-260 have been applied to the target image.

While many of the features have been described as being performed by one module (e.g., the luma matcher 240, the hue matcher 250, the saturation matcher 260, etc.), one of ordinary skill in the art will recognize that the functions described herein might be split up into multiple modules. Similarly, functions described as being performed by multiple different modules might be performed by a single module in some embodiments (e.g., the color matching function, the transform generating function, etc.).

Figure 3:
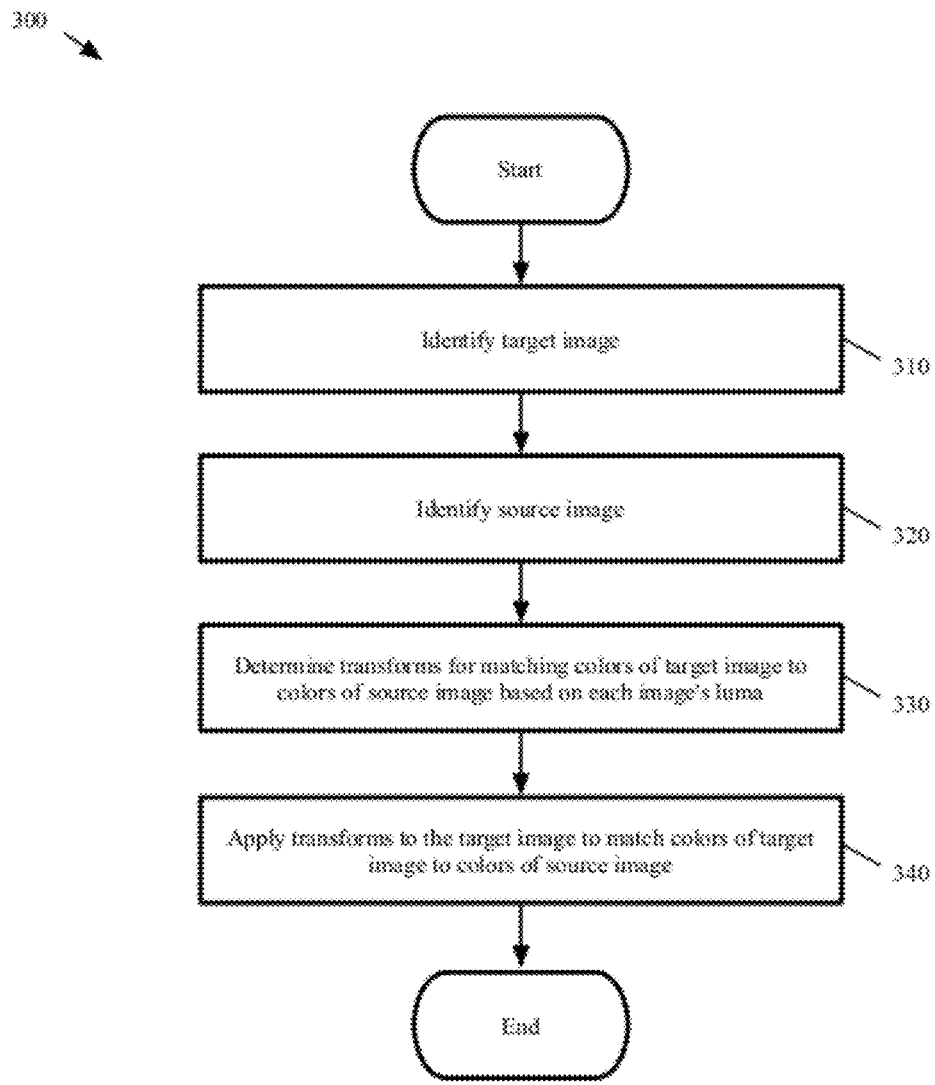
FIG. 3 conceptually illustrates a process of some embodiments for color matching images based on the images' luma.

The above FIG. 2 conceptually illustrates matching the colors (e.g., luma, hue, and saturation) of an image to the colors of another image according to some embodiments of the invention. These embodiments match the colors in a luma-based manner. FIG. 3 conceptually illustrates a luma-based color matching process 300 of some embodiments. In some embodiments, the process 300 is performed by the color matching tool when it performs a color matching operation (e.g., when the user selects the modified UI item 170 in the third stage 130 as described above by reference to FIG. 1).

As shown, the process 300 begins by identifying (at 310) a target image. The process 300 then identifies (at 320) a source image. As mentioned above, the target image and the source image may each be a still image, an image (e.g., frame) from a video, or any other type of image. In some embodiments, the identified images are images that are selected by a user through a GUI of an application (e.g., GUI 100) that provides the color matching tool.

Figure 10:
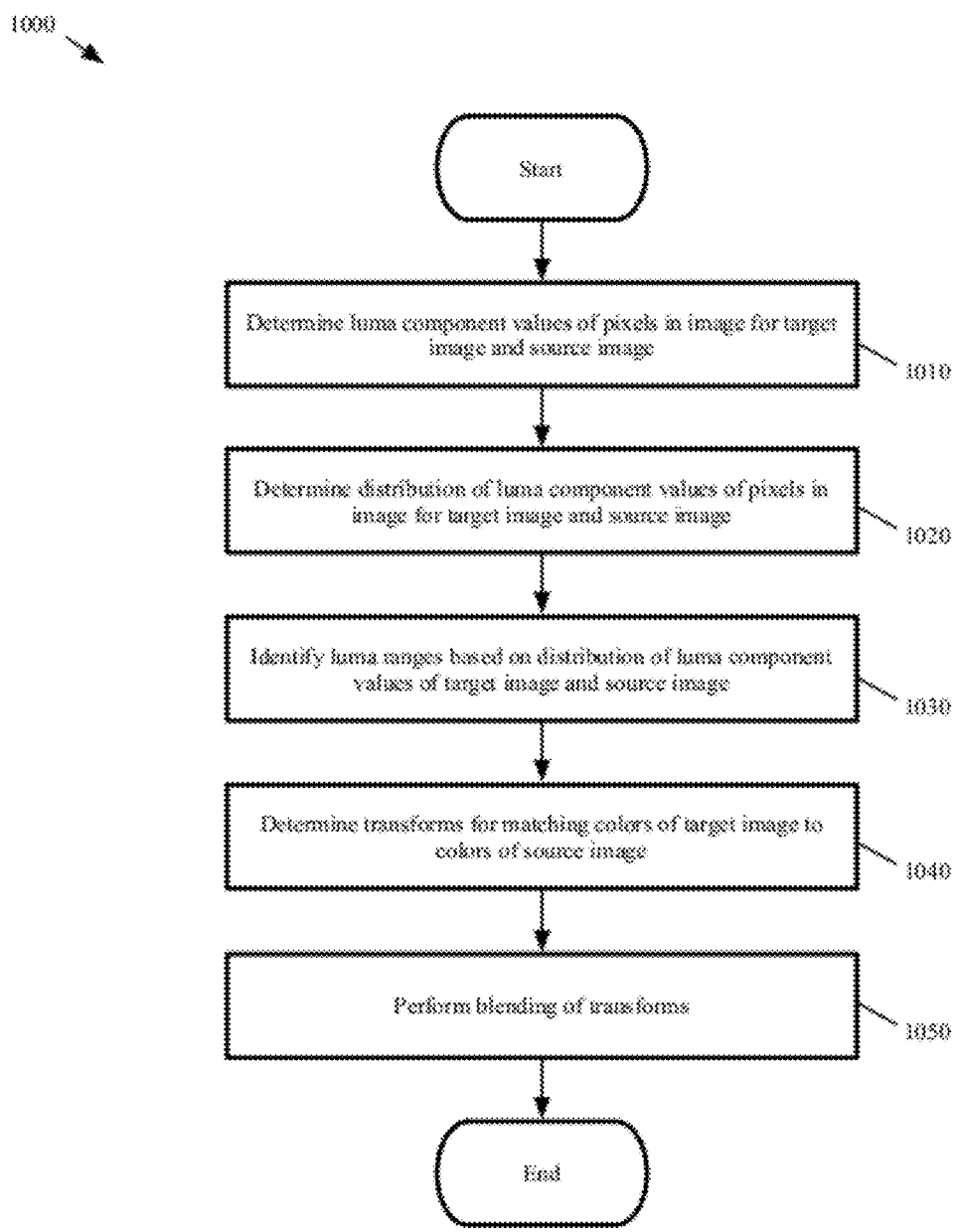
FIG. 10 conceptually illustrates a process of some embodiments for determining transforms for color matching images based on the images' luma.

After the target image and the source image have been identified, the process 300 then determines (at 330) transforms for matching the colors of the target image to the colors of the source image based on each image's luma. In some embodiments, a set of transforms is determined for every luma level (e.g., luma component value) of an image while, in other embodiments, a set of transforms is determined for each of several luma ranges (e.g., ranges of luma levels). FIG. 10, as will be described in more detail below, conceptually illustrates a process of some embodiments for determining transforms for each of several luma ranges.

Figure 30:
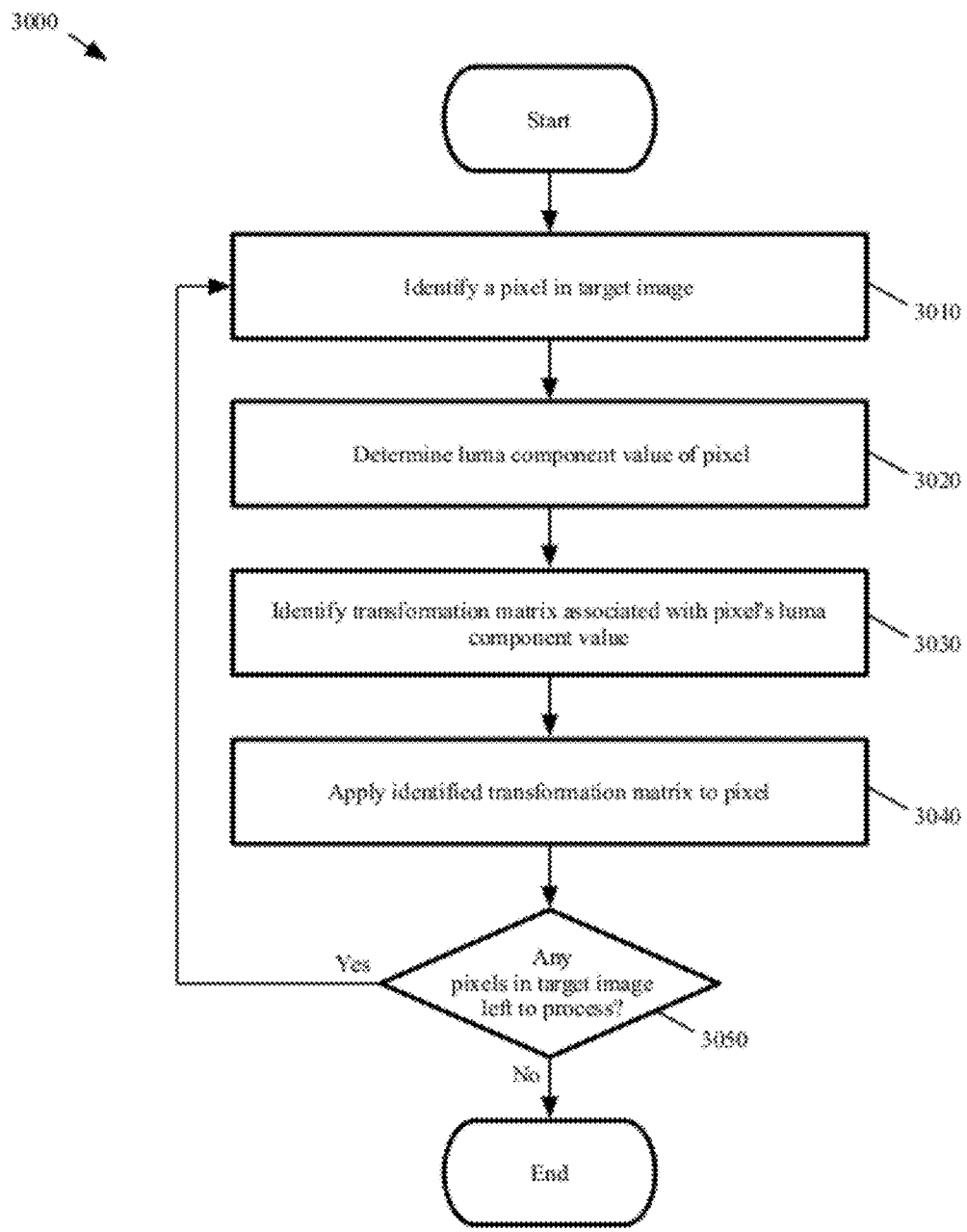
FIG. 30 conceptually illustrates a process of some embodiments for applying transforms to a target image.

Finally, the process 300 applies (at 340) the transforms to the target image to match the colors of the target image to the colors of the source image. FIG. 30, which is described in further detail below, conceptually illustrates such a process for applying transforms to a target image. For each pixel in the target image, some embodiments apply a set of transforms to the pixel. After all the pixels in the target image are processed, the colors of the target image match the colors of the source image.

While the above figures describe a technique for matching the colors of the target image to the colors of the source image based on the images' luma (also referred to as global color matching), the following will describe another technique for matching the colors of a target image to the colors of a source image. Some embodiments of the color matching tool provide a more localized color matching technique that matches the colors of the images based on the images' hues (also referred to as local color matching). Some of these embodiments utilize a dominant hue-dependent color matching technique. In such a technique, dominant hues in the target image and the source image are identified and dominant hues in the target image are shifted to match dominant hues in the source image that are the same or similar.

Different embodiments implement dominant hue-dependent color matching differently. For instance, some embodiments match the colors of the images based on the images' dominant hues and independent of the luma (or luminance) of the images. In other embodiments, after the dominant hue-dependent color matching technique is performed, all of the operations described above by reference to FIG. 2 (or a subset of them) are also performed on the images. Unlike the previously described color matching technique, such embodiments analyze the hues of the images and adjust (e.g., shift) the hues in the target image before performing the operations described by reference to FIG. 2.

As noted above, some of the operations described by reference to FIG. 2 are conceptually viewed as vertical adjustments of the colors of a target image along the vertical axis, horizontal shifts of colors of the target image along the vertical axis, and horizontal expansion or contraction of the colors of the target image along the vertical axis. In this same conceptual example, the dominant hue-dependent color matching technique can be viewed as a rotation of the colors (e.g., hues) of the target around the vertical axis that is independent of luma (or lightness). Alternatively, the dominant hue-dependent color matching can be conceptually viewed as rotations of a two-dimensional color space (e.g., a two-dimensional color wheel) around a center point.

Figure 4:
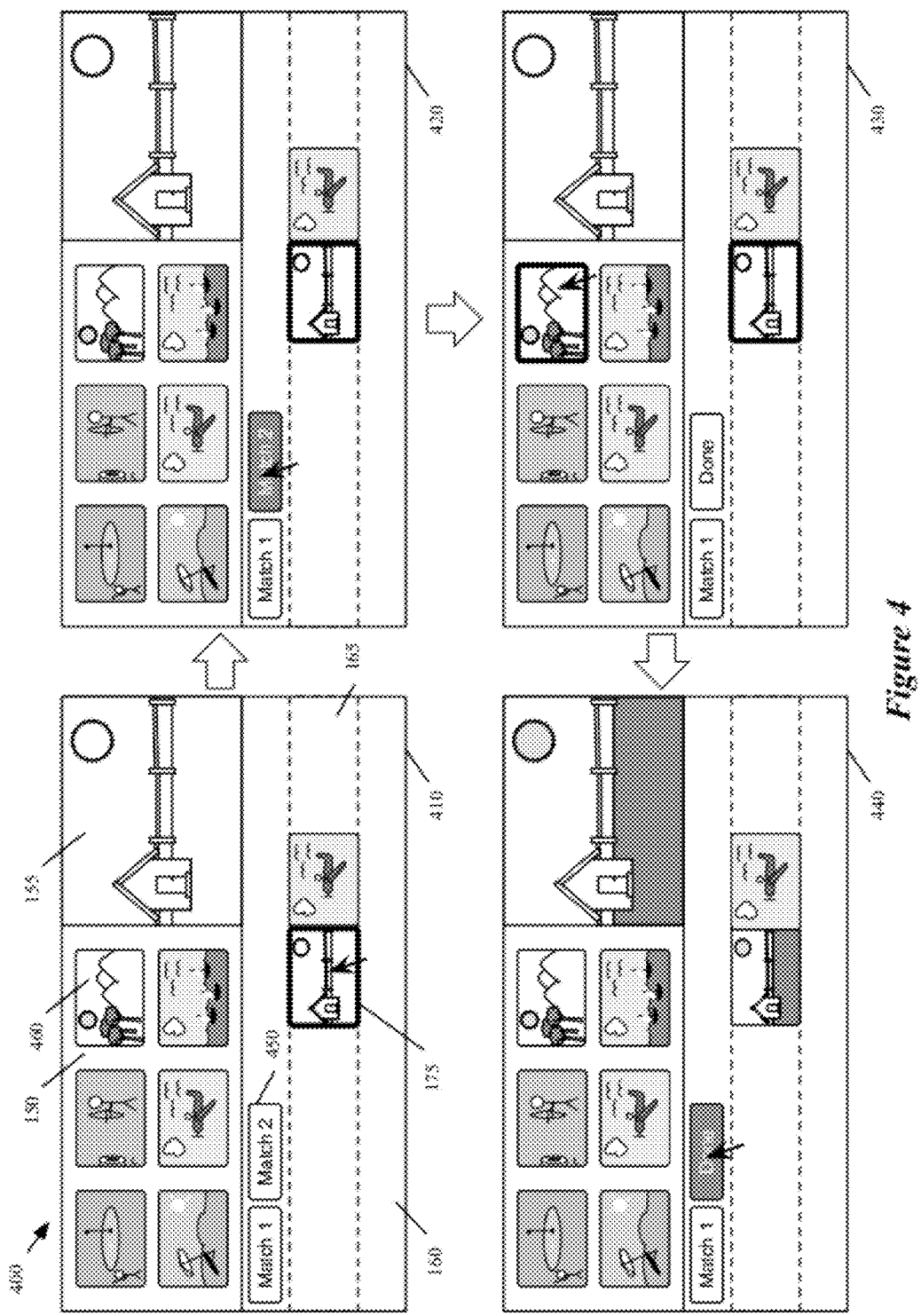
FIG. 4 conceptually illustrates the graphical user interface of a media-editing application illustrated in FIG. 1 that provides a color matching tool of some embodiments.

FIG. 4 conceptually illustrates a GUI 400 of a media-editing application that provides both local and global color matching tools. As shown, the GUI 400 is similar as the GUI 100 illustrated in FIG. 1 except the GUI 400 includes media clip 460 instead of the media clip 180 and includes an additional user selectable UI item 450 that is labeled "Match 2". In addition, the UI item 170 is labeled "Match 1" accordingly. The UI item 450 is similar to the UI item 170, but instead of allowing for the global color matching tool to be invoked, the UI item 450 allows the local color matching tool to be invoked. As such, the UI item 450 is a conceptual illustration of one or more UI items for invoking the local color matching tool and can be implemented using the many different ways described above for the UI item 170.

The operation of the GUI 400 will now be described by reference to four different stages 410-440 that are illustrated in FIG. 4. The first stage is the same as the first stage 110 that is described above by reference to FIG. 1. In the first stage 410, the user has selected the media clip 175, which is the media clip that the user wants to modify (e.g., the target media clip).

The second stage 420 is similar to the second stage 120, which is described above by reference to FIG. 1. However, in the second stage 420, the user has selected the UI item 450 (e.g., by clicking a mouse button, tapping a touchpad, or touching the media clip 175 on a touchscreen) instead of the UI item 170 in order to activate the local color matching tool after which the user can select another media clip to which the user wishes to match the media clip 175. This stage 420 similarly illustrates the selection of the UI item 450 by changing the appearance of the UI item 450. After the user has activated the local color matching tool, the media-editing application of some embodiments provides another user selectable UI item (e.g., a "Cancel" button) for deactivating the local color matching tool. The user can select this UI item in order to deactivate the local color matching tool without applying a local color matching operation to the media clip 175. In some instances where the user selects this UI item to deactivate the local color matching tool, the media-editing application returns to the state illustrated in the first stage 410 (without the media clip 175 selected and bolded in some embodiments).

The third stage 430 is similar to the third stage 130 that is described above by reference to FIG. 1 except, at the third stage 430, the user has selected the media clip 460 as the media clip to which the user wants to match the media clip 175. The selection of the media clip 460 is indicated by a similar bolding of the border of the media clip 460. In this example, the media clip 460 is a still image. However, as mentioned above, the media clip 460 may be any other type of media clip. As shown, the thumbnail representation of the media clip 460 shows an image of mountains, a sun, and trees.

Similar to the third stage 130, the third stage 430 of the GUI 400 shows the text of the UI item 450 modified from "Match 2" to "Done" and displayed when the media-editing application receives the selection of UI item 450 as described above in the second stage 420. After the user has selected a media clip to which the user wishes to match the media clip 175, the user can select the modified UI item 450 to invoke a local color matching operation that matches the colors of the media clip 175 to the colors of the selected media clip.

The fourth stage 440 is similar to the fourth stage 140 that is described above by reference to FIG. 1 but, in this fourth stage 440, the user has selected the modified UI item 450 to invoke a local color matching operation that matches the colors of the media clip 175 to the colors of the media clip 460. The fourth stage 440 illustrates the selection of the modified UI item 450 by similarly changing the appearance of the UI item 450. As shown at the fourth stage 440, the local color matching tool has modified the colors of the media clip 175 to match the colors of the media clip 460. In particular, the green color of the grass in the media clip 175 is matched to the green color of the trees in the media clip 460, as indicated by the matching medium gray color of the grass. In addition, the yellow color of the sun in the media clip 175 is matched to the yellow color of the sun in the media clip 460, which is indicated by the matching light gray of the sun. The fourth stage 440 also shows a preview of the modified media clip 175 displayed in the preview display area 155. In some embodiments, the media-editing application displays the preview of the modified media clip 175 in the preview display area 155 when the media-editing application receives the selection of the modified UI item 450.

For purposes of explanation and simplicity, the local color matching illustrated in the fourth stage 440 shows that only the green color of the grass in the media clip 175 matched to the green color of the trees in the media clip 460 and the yellow color of the sun in the media clip 175 matched to the yellow color of the sun in the media clip 460 in this example. However, other colors in the media clip 175 may also be matched as well (e.g., the blue color of the sky in the media clip 175 can be matched to the blue color of the sky in the media clip 460).

After the local color matching tool completes the local color matching operation, the media editing application of some embodiments removes the bolding of the media clips 175 and 460 that were used in the local color matching operation, as shown in the fourth stage 440. Moreover, some embodiments of the media-editing application deactivate the local color matching tool after the local color matching tool completes the local color matching operation by changing the text of the modified UI item 450 from "Done" back to "Match 2".

Different embodiments of the media-editing application provide a preview of a local color matching operation applied to the target media clip before invoking the local color matching operation to modify the target media clip in the various different ways described above by reference to FIG. 1. That is, some embodiments provide the preview in the preview display area 155, and some embodiments of the media-editing application provide a second preview display area (e.g., in a picture-in-picture fashion or as a preview display area separate from a first preview display area) for displaying the preview when the local color matching tool is activated (e.g., in the second stage 420).

Like to the GUI 100, the display areas 150-160 in GUI 400 can be arranged differently, resized, moved, etc. in some embodiments, as described above. In addition, the GUI 400, in some embodiments, can invoke the local color matching tool in the numerous different ways that are described above for the GUI 100. Also, the user media-editing application of some embodiments allows the user to select the numerous UI elements in the GUI 400 in the different ways, as describe above for the GUI 100.

While the example illustrated in FIG. 4 shows a particular sequence of operations for a local color matching operation, other sequences of operations are possible. For example, after the user has activated the local color matching tool in the second stage 420, the user may select any number of different media clips in the media library 150 and the compositing display area 160 in order to find a media clip (e.g., a source media clip) to which the user wishes to match the media clip 175 (e.g., the target media clip). The most recent media clip that the user selects before selecting the modified UI item 450 is the media clip to which the media clip 175 is matched.

Figure 5:
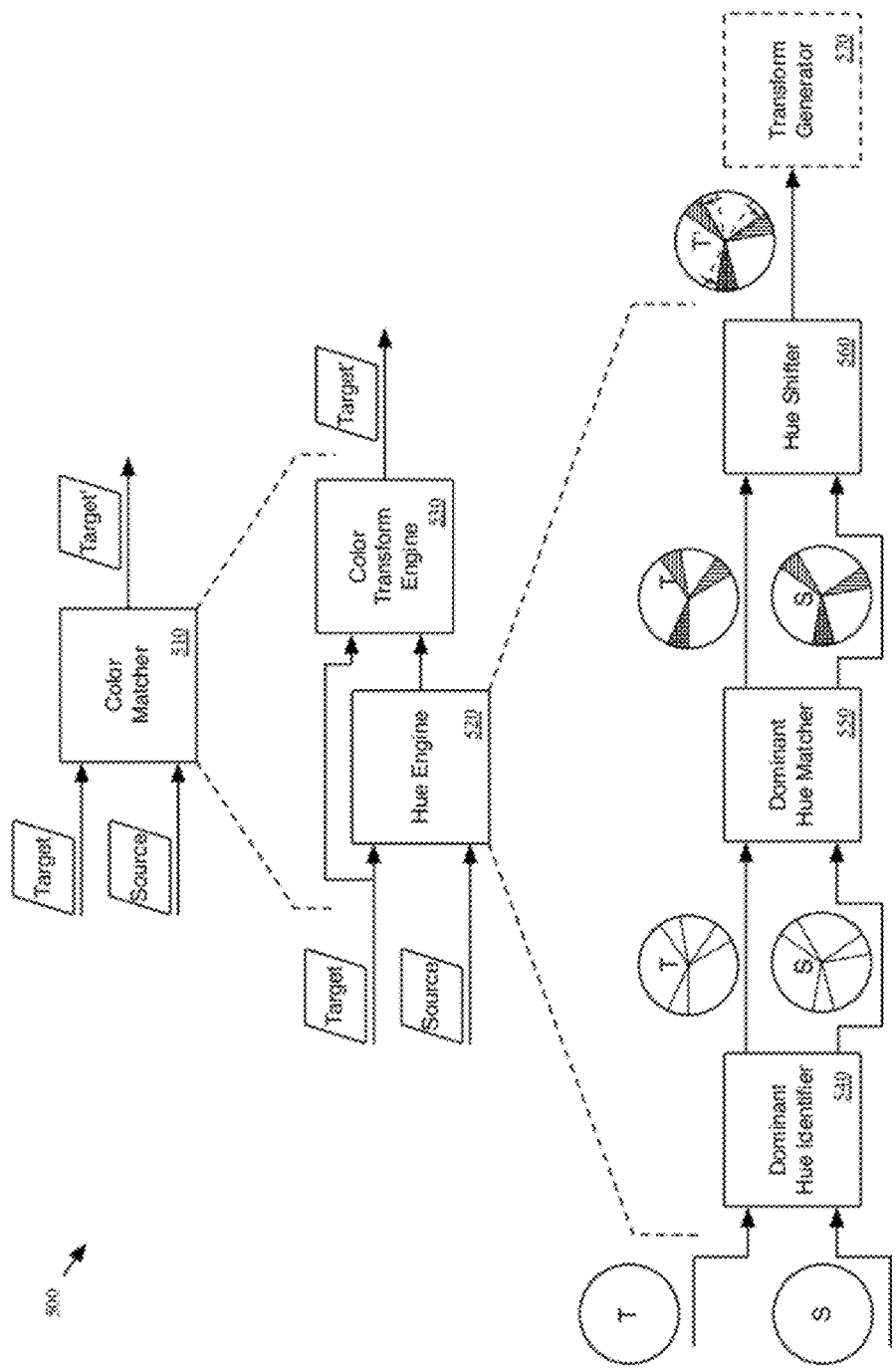
FIG. 5 conceptually illustrates a software architecture of a color matching tool of some embodiments.

FIG. 5 conceptually illustrates a software architecture 500 of a local color matching tool of some embodiments. Specifically, FIG. 5 illustrates the software architecture 500 at three different hierarchical levels. As shown, the top level of the software architecture 500 includes a color matcher 510 that receives a target image (e.g., a frame from a video clip) and a source image (e.g., a frame from a video clip). Some embodiments of the color matcher 510 receive the images from a media-editing application or any other application that provides the local color matching tool. The color matcher 510 analyzes the hue attributes of each of the received images in order to identify dominant hues in each of the images. In some embodiments, the color matcher 510 converts the color space of the received images (e.g., from RGB to Y'CbCr) before performing this analysis.

Based on the dominant hues that were identified in each of the images, some embodiments of the color matcher 510 determine matching dominant hues in each of the images. In this manner, dominant hues in the target image are matched to the same or similar dominant hues in the source image. After identifying and matching dominant hues in each of the images, the color matcher 510 of some embodiments modifies the target media clip (as indicated by the "Target" notation) so that the colors of the target media clip match the colors of the source media clip. Instead of modifying the target image, some embodiments of the color matcher 510 generate a version of the target image with the colors that match the colors of the source image. In some embodiments, the color matcher 510 outputs the color matched target image (e.g., to a preview display area of a GUI).

The middle level of the software architecture 500 illustrates the modules that are included in the color matcher 510. As shown at this level by dashed brackets, the color matcher 510 includes a hue engine 520 and a color transform engine 530. The hue engine 520 receives as input the target image and the source image. In some embodiments, the hue engine 520 analyzes the hue attributes of the target image and the source image to identify the dominant hues in the target image and the dominant hues in the source image. In addition, the hue engine 520 of such embodiments matches dominant hues in the target image with dominant hues in the source image that are the same or similar. Based on the analyses of the images' hues, the hue engine 520 shifts the hues in the target image so that the dominant hues in the target image align with the matching dominant hues in the source image. In some embodiments, the hue engine 520 determines and generates transforms that match the colors of the dominant hues of the target image to the colors of the dominant hues of the source image. The hue engine 520 then sends the generated transforms to the color transform engine 530.

The color transform engine 530 is similar in many ways to the color transform engine 230 describe above. However, in this example, the color transform engine 530 receives as input the target image and receives from the hue engine 520 the transforms generated by the hue engine 520. As mentioned, the generated transforms are for matching the colors of the target image to the colors of the source image. Some embodiments of the color transform engine 530 apply the transforms to the target image so that the dominant hues of the target image match to corresponding dominant hues in the source image. In some embodiments, the color transform engine 530 applies the transforms to an unmodified version (e.g., a copy) of the target image (since the transform generator 520 of some embodiments modifies the target image in order to determine some transforms). After applying the transforms to the target image (or a copy of the target image in some embodiments), some embodiments of the color transform engine 530 output the modified target image (e.g., to a preview display area of a GUI).

At the bottom level of the software architecture 500, FIG. 5 illustrates the modules that are included in the hue engine 520. As shown, the hue engine 520 includes a dominant hue identifier 540, a dominant hue matcher 550, and a hue shifter 560.

In addition, the bottom level illustrates conceptual representations of the color values (e.g., pixel values) of an example target image and an example source image in a two-dimensional color wheel. Specifically, the bottom level shows the conceptual effects that the functions performed by each of the modules 540-560 have on the representations of the hues of the target image. In this example, the angle around the center of the color wheel represents different hues. As such, a "wedge" in the color wheel represents a range of hues.

While these conceptual representations are shown as contiguous circles and wedges, one of ordinary skill in will realize that the pixel values of an image are actually a set of discrete pixel values that may occupy an arbitrary set of points in a color space (e.g., the HSL color space show in this example). These pixel values may be more highly concentrated in the regions of the color space represented by the wedges in this FIG. 5. Transforms applied by the color matching tool of some embodiments will affect each pixel value separately. In some embodiments, the pixel values of a particular pixel are the color values assigned to the pixel in a particular color space (e.g., the hue, saturation, and luma values).

As illustrated in FIG. 5, the dominant hue identifier 540 receives the target image and the source image as input. As shown, a color wheel that represents the hues in the target image and is indicated with a "T" and a color wheel that represents the hues in the source image is indicated with an "S". Some embodiments of the dominant hue identifier 540 identify dominant hues in the target image and dominant hues in the source image.

In this example, the dominant hue identifier 540 has identified three dominant hue ranges in the target image and three dominant hue ranges in the source image. As shown, three wedges in the color wheel that represents the hues in the target image represent three dominant hue ranges of pixel values in the target image. In addition, three wedges in the color wheel that represents the hues in the source image represent three dominant hue ranges of pixel values in the source image. After identifying the dominant hues in the target image and the source image, the dominant hue identifier 540 sends to the dominant hue matcher 550 information that indicates the dominant hues in the images along with the target image and the source image.

The dominant hue matcher 550 receives from the dominant hue identifier 540 the target image, the source image, and information indicating the dominant hues that the dominant hue identifier 540 has identified in each of the images. Based on this information, the dominant hue matcher 550 of some embodiments matches dominant hue ranges of pixel values in the target image with corresponding same or similar dominant hue ranges of pixel values in the source image. In some embodiments, the dominant hue matcher 550 matches the dominant hue ranges of pixel values in the target image with corresponding same or similar dominant hue ranges of pixels in the source image based on similarity factors, such as the range pixel values of dominant hues (e.g., the angle formed by the wedge that represents the range of pixel values of dominant hue in the color wheel), the size of the portion (e.g., the number of pixels) of each of the images that has pixel values in the dominant hue ranges, and the amount of overlapping hues in the dominant hues (e.g., the amount of overlap of pixel values in each of the color wheels).

For this example, the dominant hue matcher 550 has matched the three dominant hue ranges of pixel values in the target image with the three dominant hue ranges of pixel values in the source image, as indicated by the same type of lines filled in the matching wedges of the color wheels of the images. As shown, the dominant hue matcher 550 matched the wedge filled with the horizontal lines in the color wheel of the target image with the wedge filled with the horizontal lines in the color wheel of the source image. Likewise, the dominant hue matcher 550 matched the wedge filled with the vertical lines in the color wheel of the target image with the wedge filled with the vertical lines in the color wheel of the source image and matched the wedge filled with the horizontal and vertical lines in the color wheel of the target image with the wedge filled with the horizontal and vertical lines in the color wheel of the source image. After matching the dominant hue ranges of pixel values in the target image and the source image, the dominant hue matcher 550 sends to the hue shifter 560 information regarding the matched dominant hue ranges of pixel values in the images along with the target image and the source image.

As shown at the bottom level of the software architecture 500 illustrated in FIG. 5, the hue shifter 560 receives from the dominant hue matcher 550 the target image, the source image, and information that indicates matching dominant hue ranges of pixel values in the images. Based on this information, the hue shifter 560 of some embodiments performs a hue shift for each of the matching dominant hue ranges of pixel values in the target image and the source image so that each dominant hue range of pixel values in the target image is shifted towards the corresponding matching dominant hue range of pixel values in the source image. Some embodiments of the hue shifter 560 send the hue shifted target image and the source image (not shown) to a transform generator 570.

The transform generator 570 of some embodiments determines and generates transforms that match the colors of the target image to the colors of the source image. In particular, some of these embodiments determine transforms that match the color attributes of the dominant hues in the target image to the color attributes of the matching dominant hues in the source image. As indicated by the dashed box of the transform generator 570, the transform generator 570 does not determine and generate these transforms in some embodiments. Instead, the hue shifter 520, in some embodiments, determines and generates such transforms before sending the hue shifted target image to the color transform engine 530.

While many of the features have been described as being performed by one module (e.g., the dominant hue identifier 540, the dominant hue matcher 550, the hue shifter 560, etc.), one of ordinary skill in the art will realize that the functions described herein might be split up into multiple modules. Similarly, functions described as being performed by multiple different modules might be performed by a single module in some embodiments (e.g., the color matching function, the hue analysis function, etc.).

Figure 6:
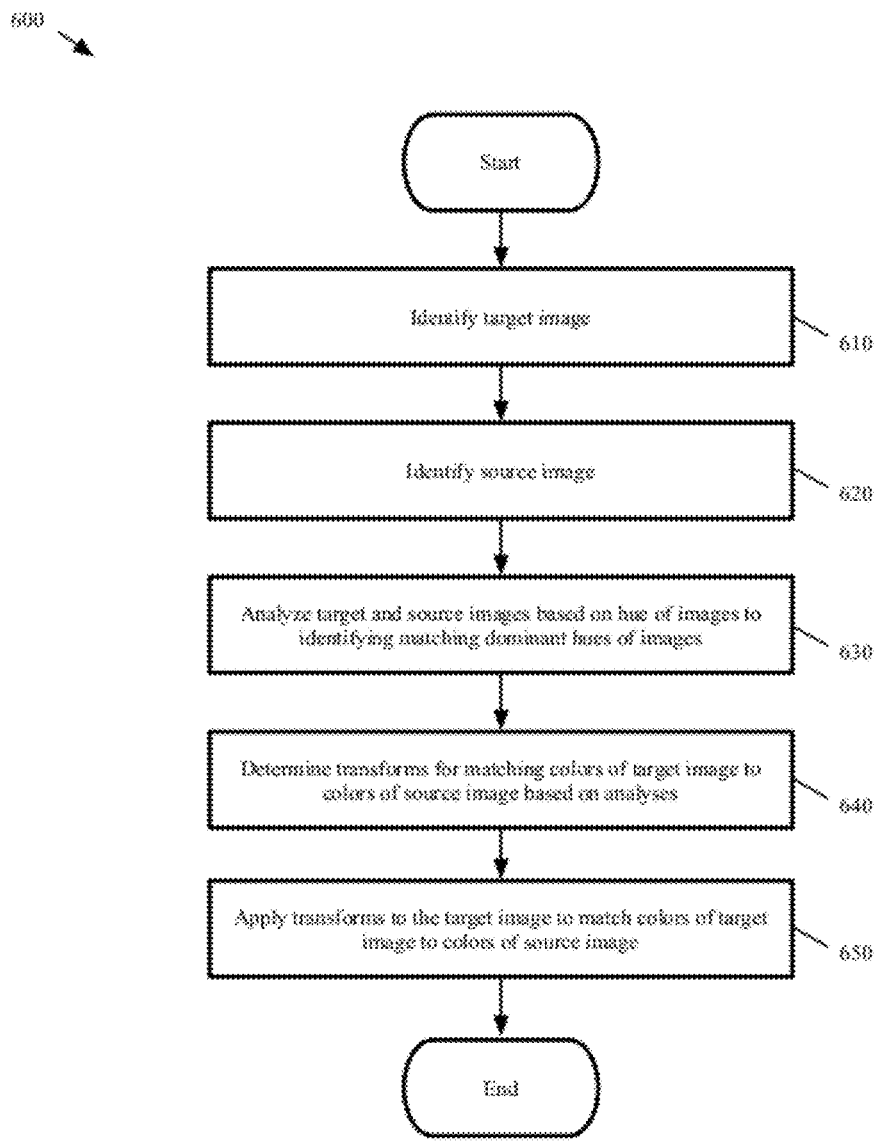
FIG. 6 conceptually illustrates a process of some embodiments for color matching images based on the images' hues.

Several of the figures illustrated above describe a local color matching tool that matches the colors of the target image to the colors of the source image based on the images' hues. The following FIG. 6 conceptually illustrates a process 600 of some embodiments for color matching images based on the images' hues. In some embodiments, the process 600 is performed by the local color matching tool when it performs a local color matching operation (e.g., when the user selects the modified UI 450 in the third stage 430 as described above by reference to FIG. 4).

The process 600 begins in the same way as the process 300, which is described above by reference to FIG. 3. Operations 610 and 620 are the same as described above for operations 310 and 320. At these operations, the process 600 identifies a target image and a source image. As noted above, the target image and the source image may each be a still image, an image (e.g., frame) from a video, or any other type of image. In some embodiments, the identified images are selected by a user through a GUI of an application (e.g., GUI 400) that provides the color matching tool.

After identifying the target image and the source image, the process 600 then analyzes (at 630) the target image and the source image based on the images' hue in order to identify dominant hues in the target image that match dominant hues in the source image. In some embodiments, hue is the degree to which a color is similar to or different from the colors red, blue, green, and yellow.

The process 600 of some embodiments analyzes the target and source images by examining the hue distribution of each image and identifying dominant hues (e.g., hue bumps) in the image. After the dominant hues are identified in each image, some embodiments identify dominant hues of the target image and dominant hues of the source image as matching dominant hues based on the similarity of the dominant hues. For example, dominant red and blue hues in a target image may be identified as matching dominant maroon (i.e., dark red) and navy (i.e., dark blue) hues, respectively, in a source image.

Next, the process 600 determines (at 640) a set of transforms for matching colors of the target image to the colors of the source image based on analysis at operation 630. Operation 640 is similar to operation 330. However, in some embodiments, a hue shift is performed to align the dominant hues in the target image with the corresponding matching dominant hues in the source image before the transforms are determined.

Figure 50:
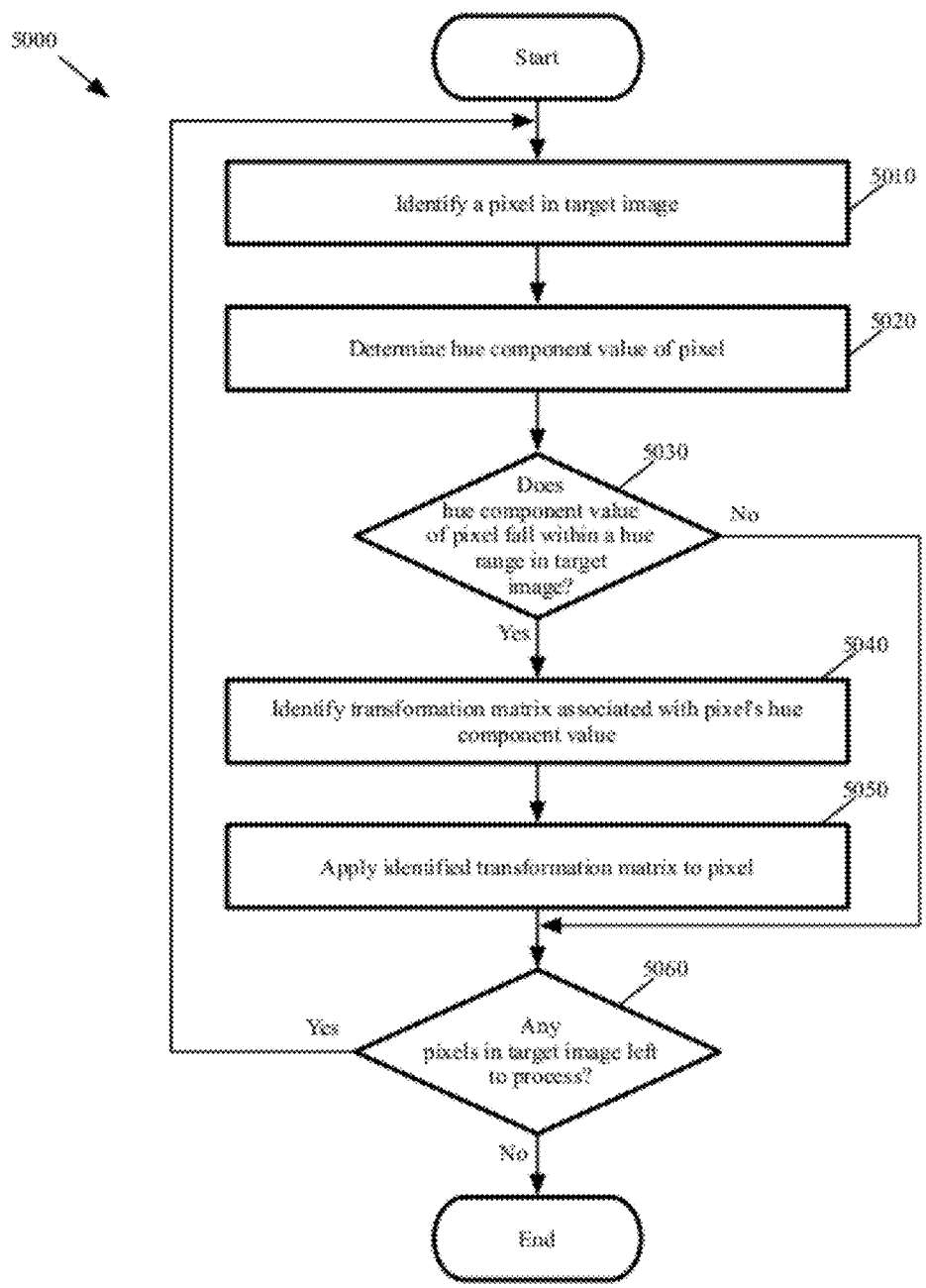
FIG. 50 conceptually illustrates a process of some embodiments for applying transforms to a target image to match the colors of the target image to the colors of a source image.

Finally, the process 600 applies (at 650) the transforms to the target image to match the colors of the target image to the colors of the source image. Operation 650 is similar to operation 340 except only pixels in the target image that have hues that are identified as dominant hues in the target image are modified using the transforms. In some embodiments, pixels in the target image that have hues that are identified as not within a dominant hue in the target image are unmodified. In this manner, a more localized color matching method is provided so that dominant colors of the target image are matched to corresponding dominant colors of the source image. FIG. 50, which is described in further detail below, conceptually illustrates a process of some embodiments for applying transforms to the target image to match the colors of the target image to the colors of the source image based on the images' hues.

The figures above describe some techniques for global color matching and for local color matching. However, some embodiments provide other techniques for global color matching and local color matching. For instance, some embodiments implement global color matching by analyzing the overall characteristics of the images and using a color segmentation technique.

Some embodiments segment colors of an image by modifying transforms that are used to convert the color space of the image to a color space that facilitates identifying certain colors in the image (e.g., whites and blacks). In some such embodiments, the transforms are modified so that certain colors are shifted (or skewed) towards other colors. Segmenting an image in this manner allows some embodiments to identify different subject types in the image based on the color of the subject types. For example, white and blue colors can be used to identify sky, green colors can be used to identify foliage, and red and brown colors can be used to identify earth or terrain. These embodiments match the colors of the images by matching the colors of the subject types in the target image to the colors of the corresponding subject types in the source image.

Figure 7:
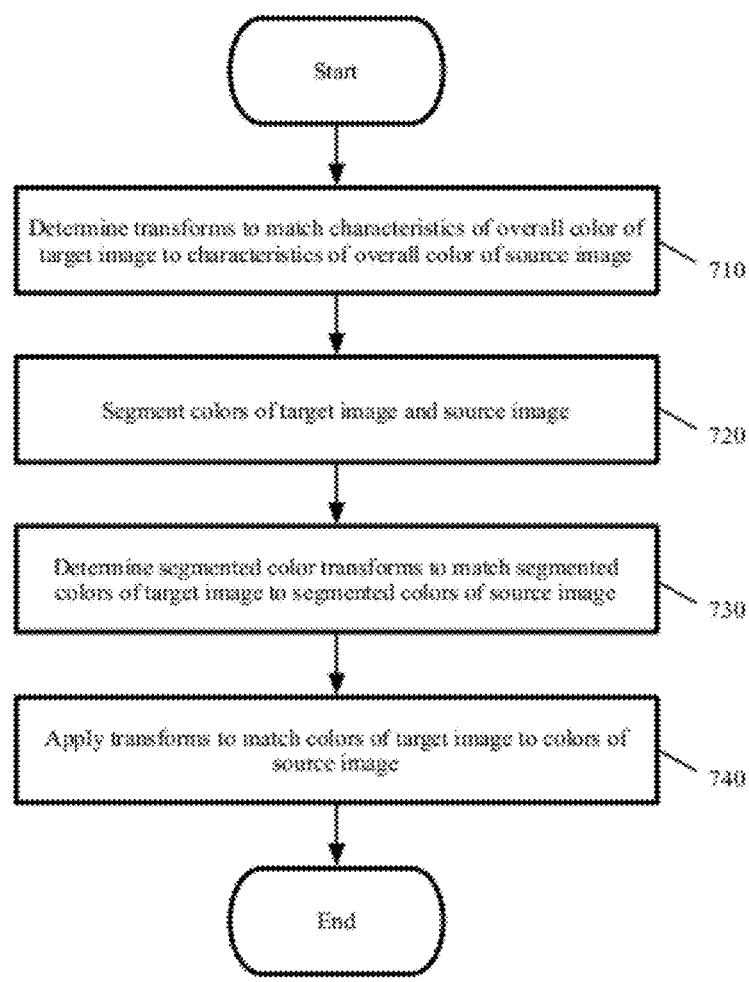
FIG. 7 conceptually illustrates a process of some embodiments for color matching images by color segmenting the images.

FIG. 7 conceptually illustrates a process 700 of some embodiments for color matching images by color segmenting the images. As shown, the process 700 starts by determining (at 710) transforms to match a set of characteristics of the target image to the set of characteristics of the source image. Different embodiments of the transforms match different combinations of characteristics of the images. Examples of characteristics include the average color of the image, the average color of dark portions of the image, the average color of bright portions of the image, the average saturation of the image, the contrast of the image, among other characteristics.

The process 700 then segments (at 720) the colors of the target image to identify a set of colors in the target image and segments the colors of the source image to identify the set of colors in the source image. Some embodiments segment the colors of an image by converting the color space of the image to a device-independent color space (e.g., a XYZ color space). Some such embodiments segment the colors of the image by modifying a set of transforms to convert the image to the device-independent color space so that certain colors in the device-independent color space are shifted towards other colors. For instance, the transform can be modified to shift white colors (e.g., highlights) towards blue colors and to shift dark colors (e.g., shadows) towards red and brown colors. Different embodiments modify the transform to shift other and/or additional colors towards other colors.

Next, the process 700 determines (at 730) transforms for matching a set of characteristics of each color in the set of colors in the target image to a corresponding set of characteristics of the color in the source image. Different embodiments of these transforms match different combinations of characteristics of each color in the set of colors in the images. Examples of characteristics include the average color value of the color in the image, the average color value of dark portions in the image with the color, the average color value of bright portions of the image with the color, the average saturation value of the color in the image, the contrast of the color in the image, among other characteristics.

Finally, the process 700 applies (at 740) the transforms to the target image in order to match the colors of the target image to the colors of the source image. In some embodiments, the transforms determined at operation 710 are applied to the target image so that the set of characteristics of the target image is matched to the corresponding set of characteristics of the source image. In some embodiments, the transforms determined at operation 730 are applied to the target image so that the set of characteristics of each color in the set of colors of the target image is matched to the corresponding set of characteristics of the color of the source image.

While the process 700 illustrates the transforms determined at the operations 710 and 730 applied to the target image at the operation 740, some embodiments of the process 700 apply the transforms determined at the operation 710 before the operation 720, and apply the transforms determined at the operation 730 at the operation 740.

The GUI 100 and the GUI 400 illustrated in FIGS. 1 and 4, respectively, both include a preview display area (e.g., the preview display area 155) for displaying a target image in some embodiments.

As mentioned above, some embodiments provide a preview of a color matching operation applied to a target media clip before invoking the color matching operation to modify the target media clip so that a user can see how the target media clip would look with the color matching operation applied without actually applying the color matching operation to the target media clip. Some of these embodiments provide a preview of a color matching operation applied to a target media clip and a preview of the unmodified target clip in the same preview display area.

Figure 8:
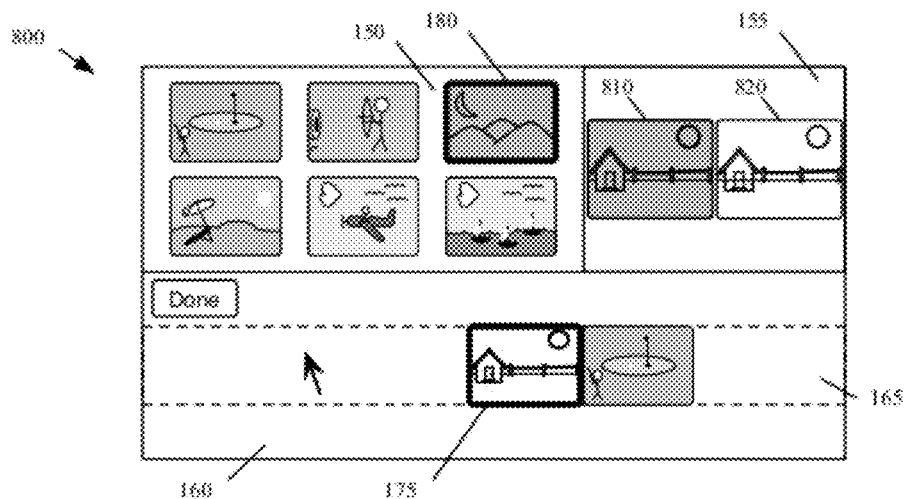
FIG. 8 illustrates an example preview display area of a graphical user interface of a media-editing application of some embodiments.

FIG. 8 illustrates an example preview display area of a GUI 800 of a media-editing application. As shown, the GUI 800 is similar the GUI 100, but the preview display area 155 provides a preview 810 of a color matching operation applied to a target media clip (e.g., the media clip 175 in this example) and a preview 820 of the unmodified target clip. This example illustrates the GUI 800 at a stage after a color matching tool is activated and a source media clip (e.g., the media clip 180 in this example) has been selected. In some embodiments, the media-editing application provides the previews 810 and 820 when the media-editing application receives a selection of a source media clip.

Figure 9:
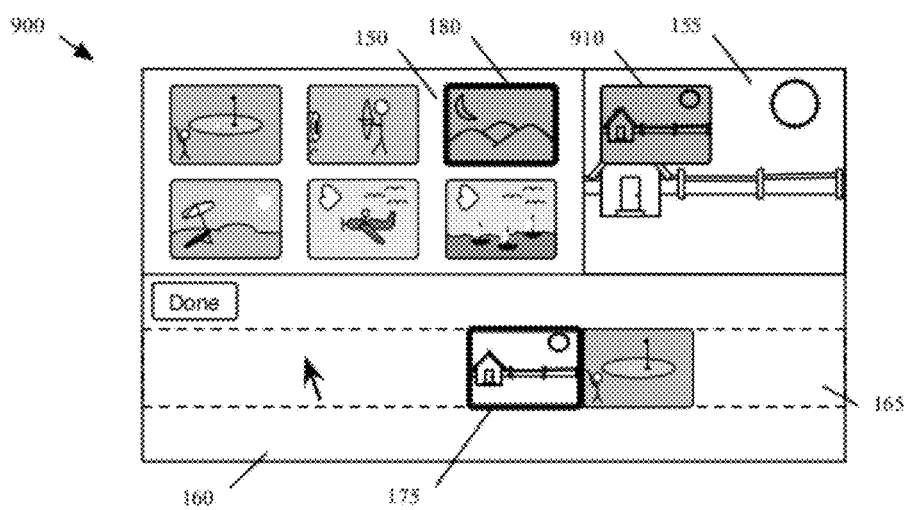
FIG. 9 illustrates another example preview display area of a graphical user interface of a media-editing application of some embodiments.

In addition, some embodiments of the media-editing application provide a first preview display area for displaying an unmodified target clip and a second preview display area for displaying a preview of a color matching operation applied to a target media clip. For instance, some embodiments provide the second preview display area as part of a picture-in-picture arrangement with the first preview display area. FIG. 9 illustrates an example of such picture-in-picture arrangement.

FIG. 9 illustrates another example preview display area of a GUI 900 of a media-editing application. The GUI 900 is similar to the GUI 800 except the preview display area 155 and another preview display area 910 are arranged in a picture-in-picture manner. Specifically, the preview display area 155 is the main picture of the picture-in-picture arrangement and the preview display area 910 is the inset picture of the picture-in-picture arrangement. As shown, the preview display area 155 provides a preview of the unmodified target clip (e.g., the media clip 175 in this example) and a preview of a color matching operation applied to a target media clip. This example illustrates the GUI 900 at a stage after a color matching tool is activated and a source media clip (e.g., the media clip 180 in this example) has been selected. In some embodiments, the media-editing application provides the picture-in-picture arrangement when the media-editing application the color matching tool is activated.

Several different techniques for matching colors of a target image to colors of a source image are described above. However, different embodiments may employ different combinations of these techniques to match the images' color. For example, some embodiments may match the images' colors based on the images' hues and then use the color segmentation technique to further match the images' colors (or vice versa). Other combinations are possible.

Different types of applications may provide the method of automatically matching colors of a target image to colors of a source image. As described above, some embodiments provide such features in a media-editing application (e.g., Final Cut Pro® and iMovie®) in order to match the colors of an image or video clip to the colors of another image or video clip. In some embodiments, image-editing applications (e.g., Aperture®), image organizers, image viewers, and any other type of image application provide the automatic color matching functionality of some embodiments to match the colors of an image to the colors of another image. Furthermore, the color matching functionality may be provided by an operating system of a computing device (e.g., a desktop computer, tablet computer, laptop computer, smartphone, etc.) in some embodiments.

Several more detailed embodiments of the invention are described in the sections below. Section I provides a conceptual description of matching colors of images based on the images' luma. Next, Section II conceptually describes matching colors of images based on the images' hues. Section III follows this with a description of matching colors of images using a color segmentation of some embodiments. Next, Section IV describes the software architecture of a media editing application that provides a color matching tool of some embodiments. Finally, Section V describes a computer system that implements some embodiments of the invention.

I. Color Matching Based on Luma

The numerous figures and examples above illustrate a variety of different techniques that a color matching tool of some embodiments might utilize to match the colors of an image to the colors of another image in a media-editing application. One of those techniques utilizes a luma-based approach to match the colors of one image to the colors of another image. The following sections will describe many examples and embodiments of this luma-based technique.

A. Determining Transforms

Some embodiments of a color matching tool match the colors of an image to the colors of another image by determining transforms that modify the colors of an image to match the colors of another image. The transforms, in some embodiments, are mathematical operations that are applied to the pixel values of an image in order to modify the pixel values. For example, some embodiments, as described with respect to the process 300, match colors of a target image to colors of a source image by determining a set of transforms for matching the images' colors based on the images' luma. The following FIG. 10 conceptually illustrates a process 1000 of some embodiments for determining transforms for color matching images based on the images' luma. As noted above, the process 1000 is performed by the process 300 of some embodiments (e.g., at the operation 330).

The process 1000 begins by determining (at 1010) the luma component values of pixels in the target image and the luma component values of pixels in the source image. Different embodiments determine the luma component values of pixels in an image differently. For example, some such embodiments convert the target image and the source image to a color space that uses a luma component to represent pixels. A Y'CbCr color space is an example of such a color space. As mentioned above, in a Y'CbCr color space of some embodiments, the color and brightness of pixels in an image are represented using a luma component value, a blue-difference component value, and a red-difference component value. Some embodiments apply a transform to the pixels of the image based on the color space in which the image is defined in order to determine the pixels' luma component values.

Figure 11:
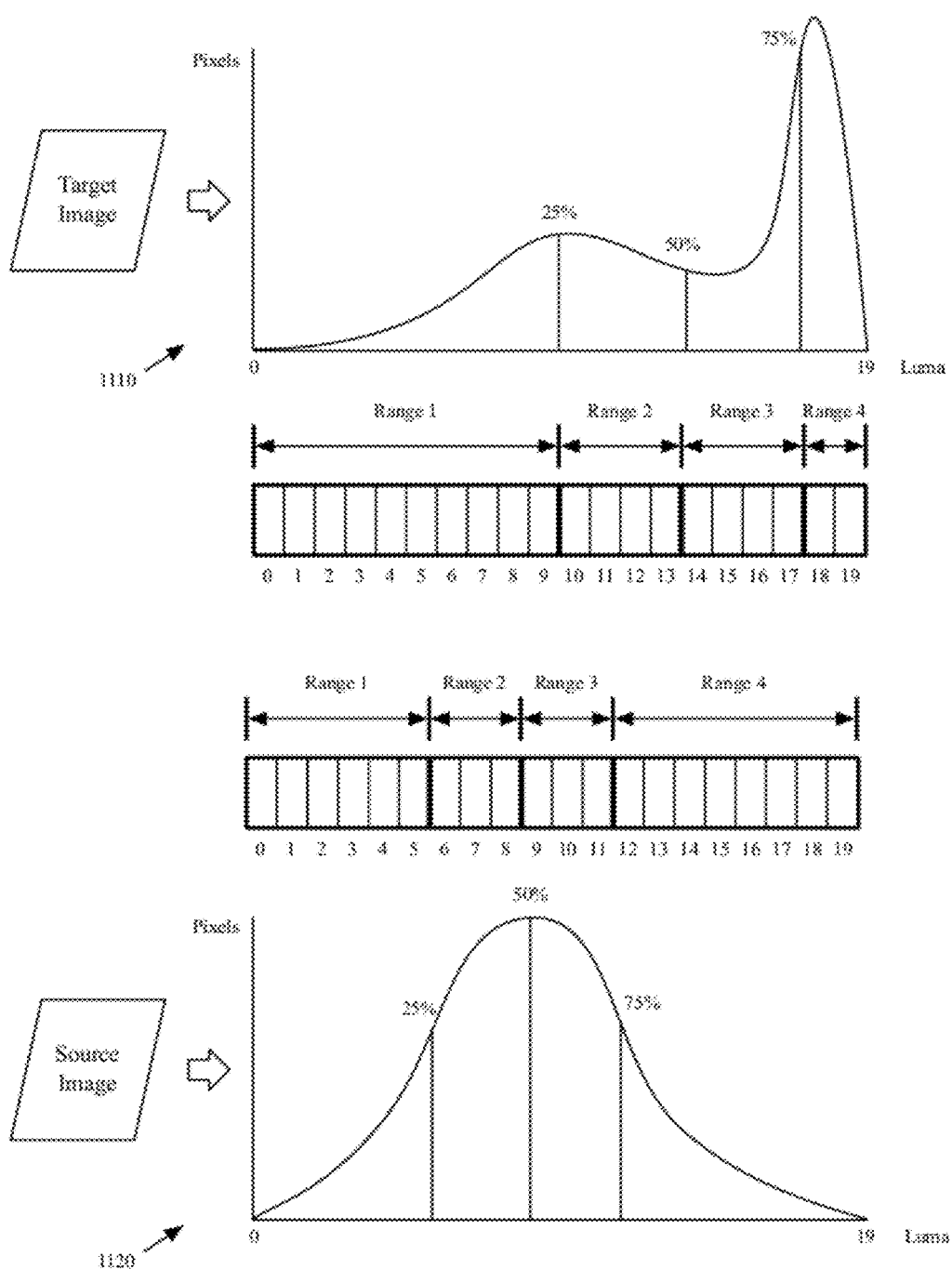
FIG. 11 illustrates histograms of example distributions of luma component values of pixels for a target image and a source image.

Next, the process 1000 determines (at 1020) the distribution of luma component values of pixels in the target image and the distribution of luma component values of pixels in the source image. FIG. 11 illustrates histograms 1110 and 1120 of example distributions of luma component values of pixels in a target image and pixels in a source image, respectively. As shown, the horizontal axis of the histogram 1110 represents different luma levels. In this example, the luma component value of the pixels in the target image can have twenty different levels of luma (i.e., 0-19). The left side of the histogram 1110 (i.e., the low luma levels) represents pixels in the target image that do not have any brightness or have a low amount of brightness (e.g., black pixels and dark pixels). The right side of the histogram 1110 (i.e., high luma levels) represents pixels in the target image that have a high amount of brightness or have a full amount of brightness (e.g., light pixels and pure white pixels). The middle of the histogram 1110 represents pixels that have a medium amount of brightness (e.g., medium gray pixels) Different embodiments define the luma component to represent a different number of luma levels. For example, the luma component of some embodiments can be defined to represent 256 different luma levels (e.g., 0-255). The luma component can be defined to represent any number of luma levels in other embodiments. The vertical axis of the histogram 1110 represents the number of pixels in the target image that have a particular luma component value.

As shown by the distribution curve of the histogram 1110, the target image has a number of dark (e.g., low brightness) pixels and a larger number of bright pixels. Specifically, approximately 25 percent of the pixels have a luma component value of between 0-9, 25 percent of the pixels have a luma component value between 10-13, 25 percent of the pixels have a luma component value between 14-17, and 25 percent of the pixels have a luma component value between 18 and 19, as shown by the indicated percentiles.

The histogram 1120 illustrates the distribution of luma component values of the source image using the same graphing scale. The distribution curve of the histogram 1120 indicates that the source image has a number of dark and bright pixels and a larger number of pixels that are between dark and bright (e.g., medium brightness). As illustrated by the indicated percentiles, approximately 25 percent of the pixels have a luma component value of between 0-5, 25 percent of the pixels have a luma component value between 6-8, 25 percent of the pixels have a luma component value between 9-11, and 25 percent of the pixels have a luma component value between 12-19.

Figure 12:
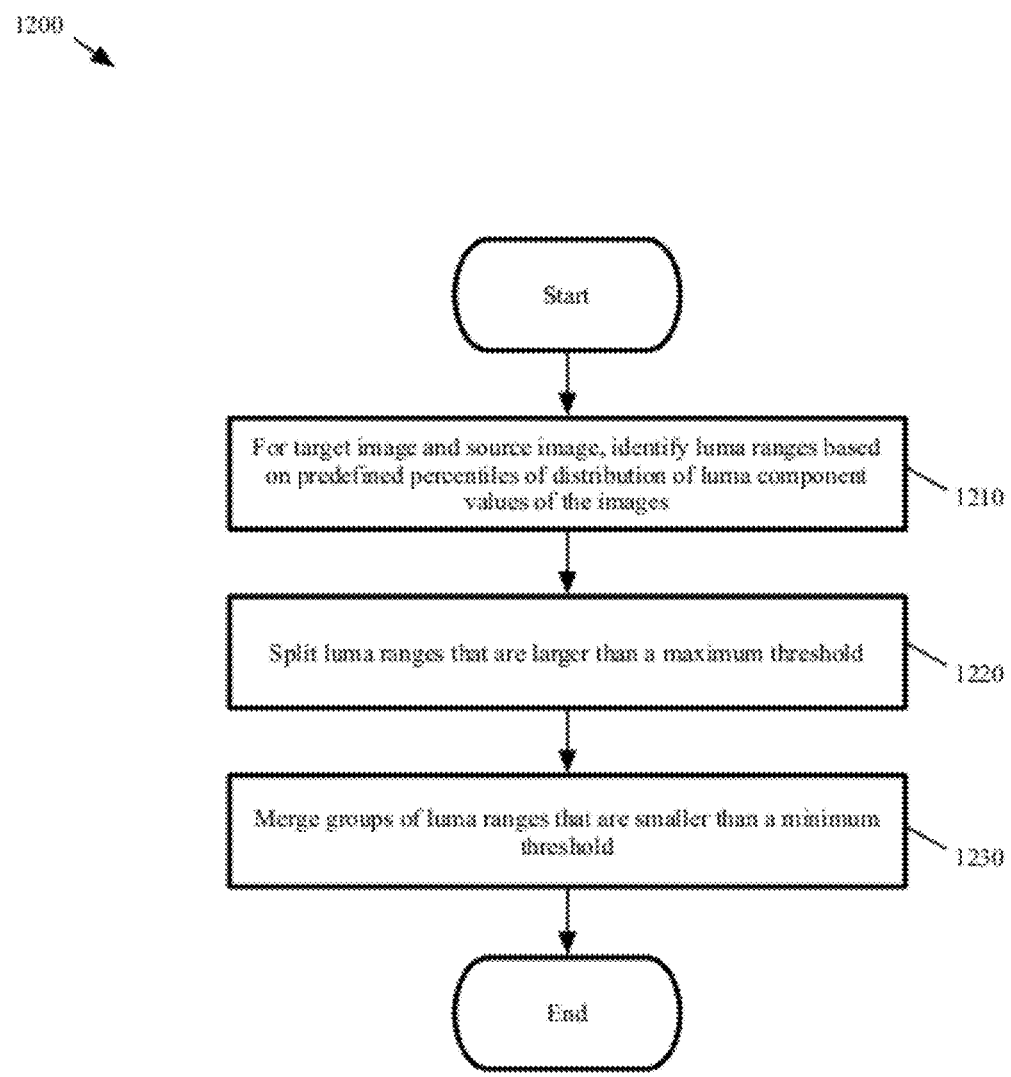
FIG. 12 conceptually illustrates a process of some embodiments for identifying luma ranges for a target image and corresponding luma ranges for a source image.

Returning to FIG. 10, the process 1000 identifies (at 1030) luma range for the target image based on the distribution of the luma component values of the target image. In addition, the process 1000 identifies (at 1030) corresponding luma ranges for the source image based on the distribution of the luma component values of the source image. The luma ranges of an image are identified in some embodiments based on percentiles (e.g., 25 percent, 50 percent, and 75 percent or 20 percent, 40 percent, 60 percent, and 80 percent) of the distribution of luma component values of pixels in the image. FIG. 12, which is described in further detail below, conceptually illustrates an example of such a process of some embodiments.

Referring again to FIG. 11, the identified luma ranges of the target image and the source image based on the respective distributions of luma component values of the target image and the source image are illustrated in this figure. As shown, the luma ranges identified for the target image and the source image is based on the 25 percent, 50 percent, and 75 percent percentiles of the respective distributions of luma component values of the target image and the source image. Thus, each luma range represents the luma range of 25 percent of the pixels in the image.

Figure 16:
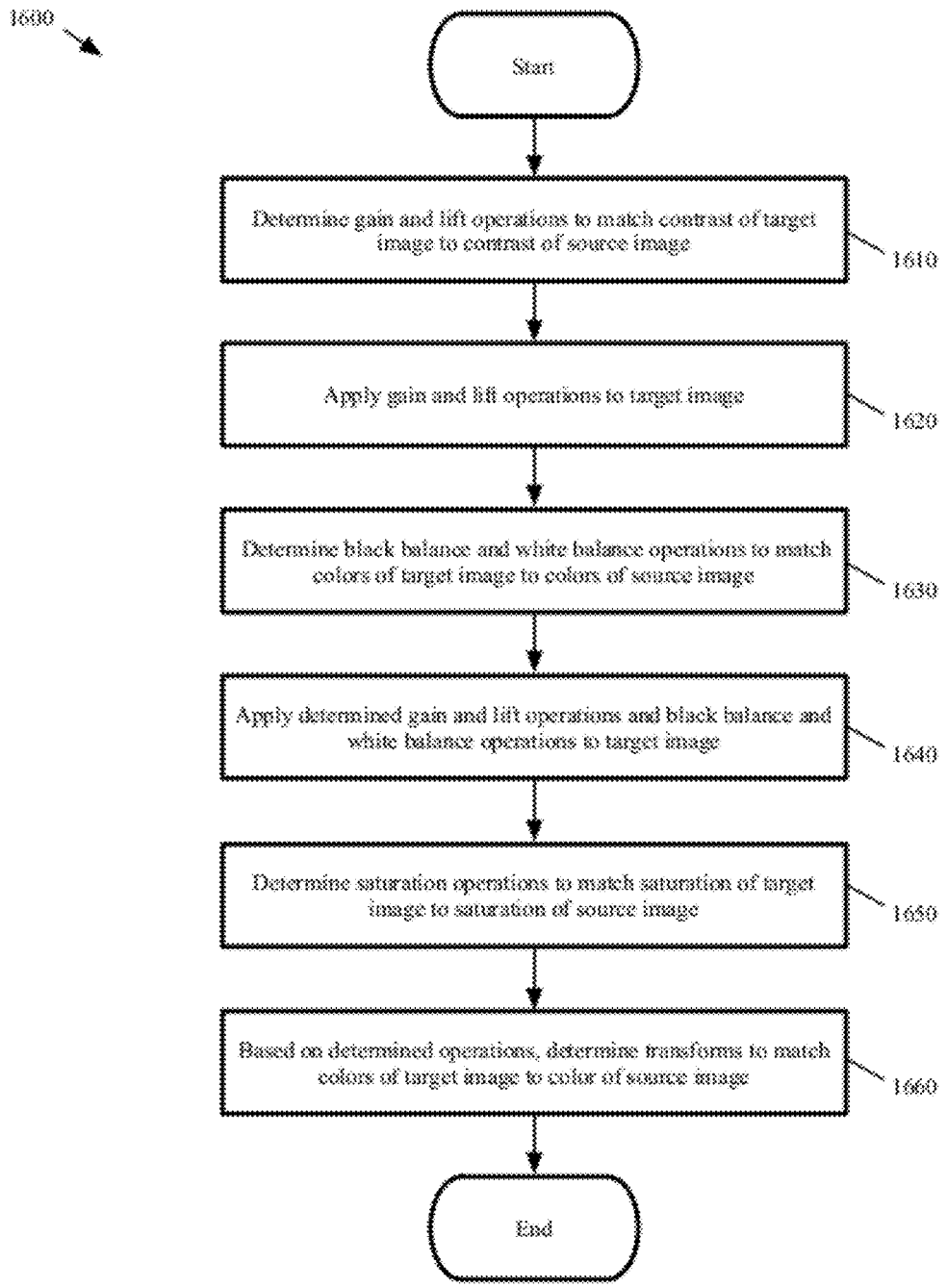
FIG. 16 conceptually illustrates a process of some embodiments for determining transforms for matching colors of a target image to colors of a source image.

The process 1000 then determines (at 1040) transforms for matching colors of the target image to the colors of the source image. In some embodiments, a set of transforms is determined for each identified luma range of the target image. Each set of transforms is for matching the colors of pixels in the target image that have luma component values within the luma range of the target image to the colors of the pixels in the source image that have luma component values within the corresponding luma range of the source image. FIG. 16, which will be described in more detail below, conceptually illustrates a process of some embodiments for determining transforms for matching colors of the target image to colors of the source image. Referring to FIG. 11 as an example, a set of transforms determined for the first luma range of the target image is for matching the colors of the pixels in the target image that have luma component values within the first luma range of the target image (i.e., 0-9) to the colors of the pixels in the source image that have luma component values within the first luma range of the source image (i.e., 0-5).

Finally, the process 1000 performs (at 1050) a blending operation on the determined transforms. As described with respect to the process 300, some embodiments determine a set of transforms for each a luma range of the target image. As such sharp transitions may exist among transforms of luma levels near the border of luma ranges. Referring again to FIG. 11 as an example, a sharp transition may exist between the transform of last luma level (luma level 9) in the first luma range and the first luma level (luma level 10) in the second luma range. As such, some embodiments blend these sharp transitions. For instance, some embodiments employ a neighbor-averaging technique, such as the one described in further detail below by reference to FIG. 28, to blend sharp transitions among the transforms. Other blending techniques are possible in other embodiments.

i. Identifying Luma Ranges

As noted above, some embodiments determine transforms for each luma range of several luma ranges of a target image. Different embodiments may identify these luma ranges of the target image differently. For instance, some embodiments identify luma ranges for the target image based on the distribution of the luma component values of the target image and identify corresponding luma ranges for the source image based on the distribution of the luma component values of the source image.

The following FIG. 12 conceptually illustrates a process 1200 of some embodiments for identifying luma ranges for the target image and corresponding luma ranges for the source image. As mentioned above, the process 1200 is performed by the process 1000 of some embodiments (e.g., at the operation 1030). The process 1200 will be described by reference to FIG. 13, which illustrates different stages 1310-1330 of an example of identifying luma ranges according to some embodiments of the invention.

The process 1200 starts by identifying (at 1210) luma ranges for the target image based on predefined (e.g., default) percentiles of the distribution of luma component values of target image. The process 1200 also identifies corresponding luma ranges for the source image based on the predefined percentiles of the distribution of luma component values of source image. Different embodiments define different numbers of different percentiles of distribution. For instance, quartile distributions are predefined as the percentiles of distribution in some embodiments. Any number of quantiles (e.g., tertiles, quintiles, sextiles, etc.) can be predefined as the percentiles of distribution in other embodiments. As shown, the first stage 1310 of FIG. 13 illustrates luma ranges of the target image and the source image that are identified based on quartiles of the distribution of luma component values of the images that are illustrated in FIG. 11.

Figure 14:
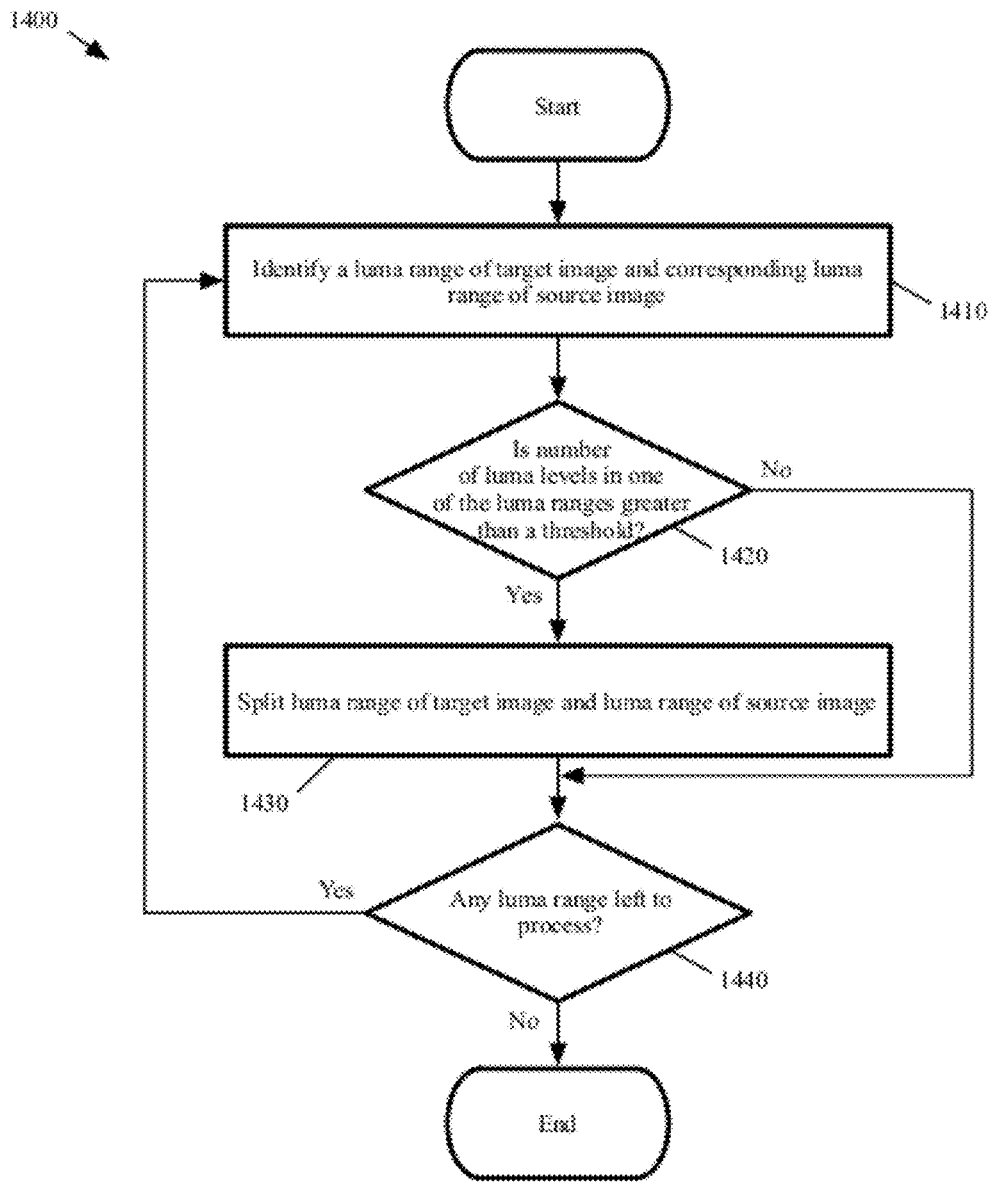
FIG. 14 conceptually illustrates a process of some embodiments for splitting luma ranges.

Next, the process 1200 splits (at 1220) groups of luma ranges that are larger than a maximum threshold. Some embodiments examine the luma ranges of the target image to determine whether to perform a split operation while other embodiments examine the luma ranges of the source image to determine whether to perform a split operation. In addition, some embodiments examine the luma ranges of the target image and the source image to determine whether to perform a split operation. FIG. 14, which is described in more detail below, illustrates a process that examines luma ranges of the target image and the source image to determine whether to perform a split operation.

Different embodiments define a maximum threshold differently. For instance, some embodiments define the threshold in terms of an amount of luma levels (e.g., five luma levels, ten luma levels, etc.) while other embodiments define the threshold in terms of a percentage (e.g., 30 percent, 40 percent, 50 percent, etc.) of all possible luma levels. Other ways of defining the threshold are possible.

Figure 13:
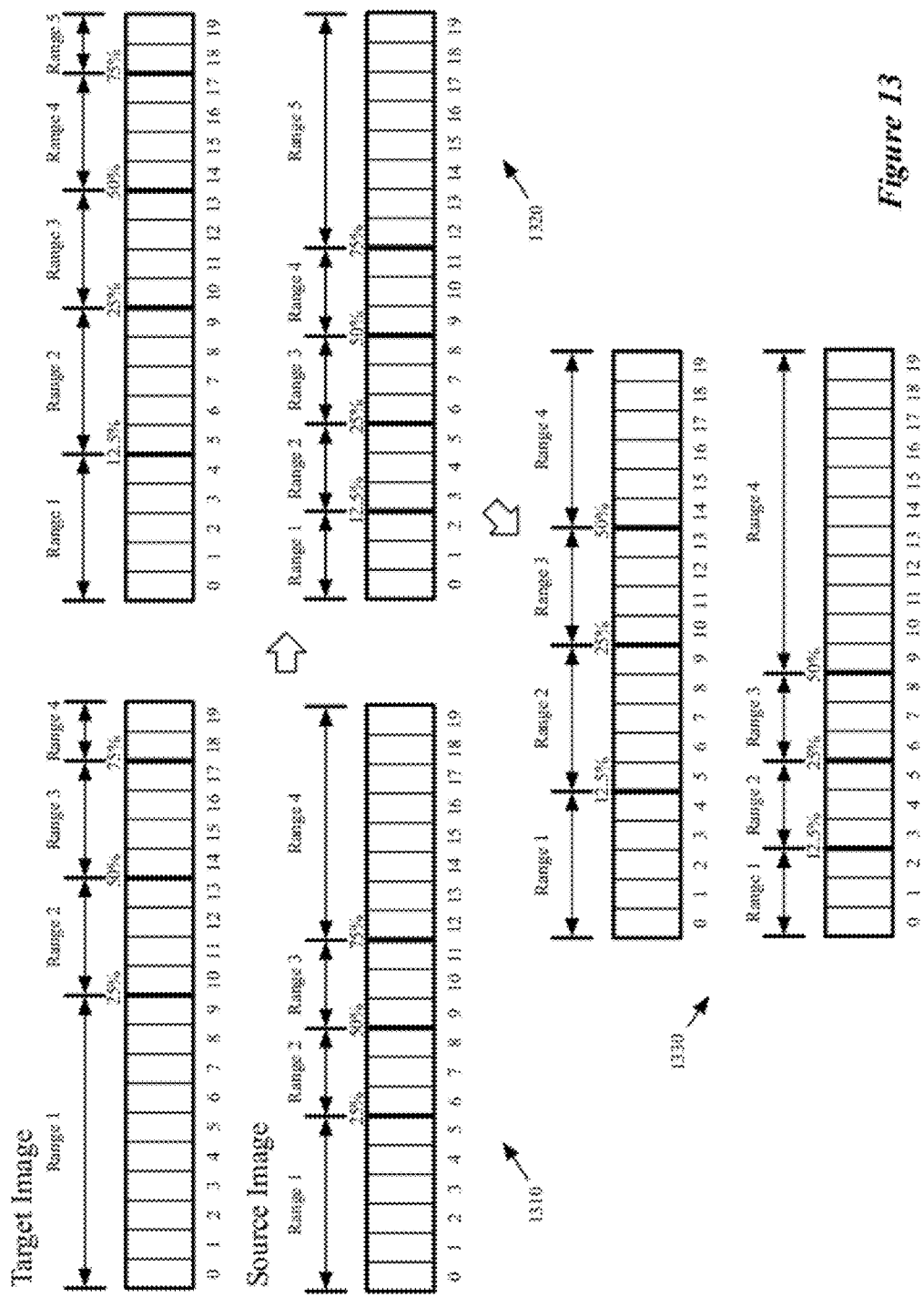
FIG. 13 illustrates the luma ranges illustrated in FIG. 11 after a split operation has been performed according to some embodiments of the invention.

Referring to FIG. 13, the second stage 1320 illustrates the luma ranges illustrated in the first stage 1310 after operation 1220 has been performed. For this example, a percentage threshold of 40 percent is defined as the threshold used to determine whether to perform a split operation. That is, a split operation is performed on a luma range in the target/source image and its corresponding luma range in the source/target image when the number of luma levels in the luma range of either the target image or the source image is greater than eight.

As shown in second stage 1320, since the number of luma levels in first luma range of the target image is greater than eight (i.e., nine), the first luma range of the target image and the source image illustrated in the first stage 1310 are each split into two equal ranges. Specifically, the first luma range of luma levels 0-9 of the target image is split into a luma range of luma levels 0-4 and a luma range of luma levels 5-9. The corresponding first luma range of luma levels 0-5 of the source image is also split into a luma range of luma levels 0-2 and a luma range of luma levels 3-5. A split operation is not performed on any of the other luma ranges (i.e., the second, third, and fourth luma ranges of the target image and source image) because none of other luma ranges have a number of luma levels that is greater than eight.

Figure 15:
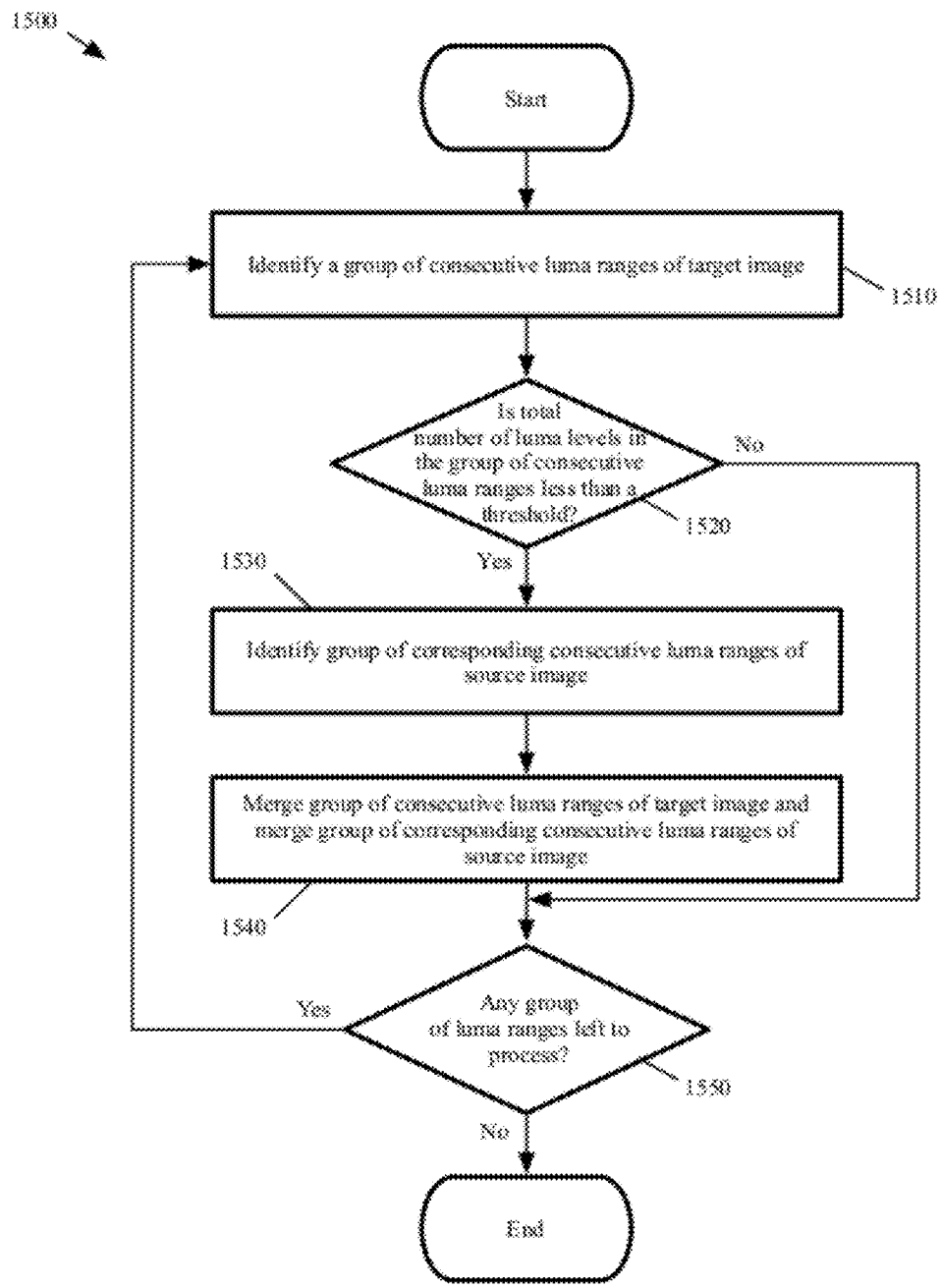
FIG. 15 conceptually illustrates a process of some embodiments for merging luma ranges.

After splitting luma ranges, the process 1200 then merges (at 1230) groups of consecutive luma ranges that are smaller than a minimum threshold. The luma ranges of the target image are examined to determine whether to perform a merge operation in some embodiments where the luma ranges of the source image are examined to determine whether to perform a merge operation in other embodiments. FIG. 15, which is described in further detail below, illustrates a process that examines luma ranges in the target image to determine whether to perform a merge operation. Still, some embodiments examine the luma ranges of the target image and the source image to determine whether to perform a split operation.

Different embodiments define a minimum threshold differently. For example, some embodiments define the threshold in terms of an amount of luma levels (e.g., five luma levels, ten luma levels, etc.) whereas other embodiments define the threshold in terms of a percentage (e.g., 30 percent, 40 percent, 50 percent, etc.) of all possible luma levels. Other ways of defining the threshold are possible as well.

Referring back to FIG. 13, the third stage 1330 illustrates the luma ranges illustrated in the second stage 1320 after operation 1230 has been performed. In this example, a percentage threshold of 35 percent is defined as the threshold used to determine whether to perform a merge operation. Thus, a merge operation is performed on a group of consecutive luma ranges in the target/source image and its corresponding luma ranges in the source/target image when the total number of luma levels in the group of consecutive luma ranges is less than seven.

As illustrated in the third stage 1330, the first and second luma ranges are not merged because the total number of luma levels of first and second luma ranges is greater than or equal to seven (i.e., ten). Similarly, the second and third luma ranges and the third and fourth luma ranges are not merged. However, the fourth and fifth luma ranges are merged because the total number of luma levels of fourth and fifth luma ranges is less than seven (i.e., six). The third stage 1330 illustrates that the fourth luma range of luma levels 14-17 and the fifth luma range of luma levels 18 and 19 of the target image have been merged into a single luma range of luma levels 14-19. The corresponding fourth luma range of luma levels 9-11 of the source image has also been merged with the fifth luma range of luma levels 12-19 to create a single luma range of luma levels 9-19.

After merging groups of consecutive luma ranges, the process 1200 ends. As shown in FIG. 12, the merging operation is performed after the splitting operation. However, in some cases, the merging operation creates luma ranges that would otherwise have been split in the splitting operation (e.g., the number of luma levels of the merged luma range is larger than the maximum threshold). For example, the fourth luma range of the source image illustrated in third stage 1330 of FIG. 13 is the result of the merging of the fourth and fifth luma ranges of the source image shown in the second stage 1320. The fourth luma range of the source image in the third stage 1330 would otherwise have been split (the fourth luma range includes eleven luma levels) in the splitting operation. Thus, in some embodiments, the process 1200 performs the merge operation before the split operation. However, the splitting operation may create luma ranges that would otherwise have been merged in the merging operation (e.g., the number of luma levels of the split luma ranges is less than the minimum threshold). Therefore, the process 1200 of some embodiments repeats operations 1220 and 1230 until the luma ranges are no longer split or merged. In other embodiments, the process 1200 repeats operations 1220 and 1230 a defined number of times.

FIG. 14 conceptually illustrates a process 1400 of some embodiments for splitting luma ranges. As mentioned above, the process 1400 is performed by the process 1200 of some embodiments (e.g., at the operation 1220). The process 1400 begins by identifying (at 1410) a luma range of the target image and the corresponding luma range of the source image.

The process 1400 then determines (at 1420) whether the number of luma levels in the luma range of the target image or the number of luma levels in the luma range of the source image is greater than a threshold. As described above, some embodiments define the threshold in terms of an amount of luma levels while other embodiments define the threshold in terms of a percentage of all possible luma levels. Some embodiments define multiple different types of thresholds (e.g., a threshold of an amount of luma levels and a threshold of a percentage of all possible luma levels) as well.

When the process 1400 determines that the number of luma levels in the luma range of either the target image or the source image is greater than the threshold, the process 1400 splits (at 1430) the luma range of the target/source image and the corresponding luma range of the source/target image. In some embodiments, the process 1400 splits the luma ranges into a set (e.g., two, three, five, etc.) of luma ranges that each has the same number of luma levels. In other embodiments, the process 1400 splits the luma ranges into a set of luma ranges that have different numbers of luma levels. For example, some embodiments split the luma range of the target image into a set of luma ranges such that each luma range in the set of luma ranges includes the same distribution of luma component values and, accordingly, split the luma range of the source image into the set same set of corresponding luma ranges. Rather than splitting the luma ranges based on the distribution of luma component values of the target image's luma range, some embodiments split the luma range of the source image into a set of luma ranges so that each of the luma ranges in the set of luma ranges includes the same distribution of luma component values and split the luma range of the target image into the set same set of corresponding luma ranges.

When the process 1400 determines that the number of luma levels in the luma range of either the target image or the source image is not greater than the threshold, the process 1400 then determines (at 1440) whether any luma range is left to process. When the process 1400 determines that there is a luma range to process, the process 1400 returns to the operation 1410 to process any remaining luma ranges. Otherwise, the process 1400 ends.

FIG. 15 conceptually illustrates a process 1500 of some embodiments for merging groups of consecutive luma ranges. As mentioned above, the process 1500 is performed by the process 1200 of some embodiments (e.g., at the operation 1230). The process 1500 begins by identifying (at 1510) a group (two in this example) of consecutive luma ranges of the target image. For instance, referring to FIG. 13, the first and second luma ranges are a group of consecutive luma ranges, the second and third luma ranges are a group of consecutive luma ranges, the third and fourth luma ranges are a group of consecutive luma ranges, and the fourth and fifth luma ranges are a group of consecutive luma ranges.

The process 1500 then determines (at 1520) whether the total number of luma levels included in the group of consecutive luma ranges is less than a threshold. As mentioned above, some embodiments define the threshold in terms of an amount of luma levels while other embodiments define the threshold in terms of a percentage of all possible luma levels. Some embodiments define multiple different types of thresholds (e.g., a threshold of an amount of luma levels and a percentage threshold of all possible luma levels) as well.

When the process 1500 determines that the total number of luma levels in the group of consecutive luma ranges of the target image is not less than the threshold, the process 1500 proceeds to operation 1550. When the process 1500 determines that the number of luma levels in the group of consecutive luma ranges of the target image is less than the threshold, the process 1500 identifies (at 1530) the group of corresponding consecutive luma ranges of source image.

Next, the process 1500 merges (at 1540) the group of consecutive luma ranges of the target image into a single luma range and merges the group of corresponding consecutive luma ranges of the source image into a single luma range.

At 1550, the process 1500 determines whether any group of consecutive luma ranges of the target image is left to process. When the process 1500 determines that there is a group of consecutive luma ranges to process, the process 1500 returns to the operation 1510 to process the remaining groups of consecutive luma ranges. When the process 1500 determines that there is not a group of consecutive luma ranges left to process, the process 1500 ends. As described above, the process 1500 examines luma ranges of the target image in order to determine whether to merge a group of consecutive luma ranges. However, some embodiments of the process 1500 also examine luma ranges of the source image in order to determine whether to merge a group of consecutive luma ranges.

ii. Operations for Determining Color Matching Transforms

After identifying the luma ranges of the target image and the corresponding luma ranges of the source image, some embodiments determine transforms for matching the colors of the target image to the colors of the source image. As described below, some of these embodiments determine the transforms for the luma ranges on a luma-range-by-luma-range basis. FIG. 16 conceptually illustrates a process 1600 of some embodiments for determining transforms to match the colors of the target image to the colors of the source image. In some embodiments, the process 1600 is performed by the process 1000 (e.g., at the operation 1040), as described above.

The process 1600 starts by determining (at 1610) gain and lift operations to match the contrast of the target image to the contrast of the source image. In some embodiments, a lift operation uniformly lightens or darkens (e.g., increases or decreases luma) an image by adjusting shadows, midtones, and highlights by the same amount. A gain operation, in some embodiments, adjusts contrast by raising or lowering the white point (e.g., the point at which solid white occurs) of an image while leaving the black point (e.g., the point at which solid black occurs) pinned in place, and scaling the midtones between the new white point and the black point.

Figure 20:
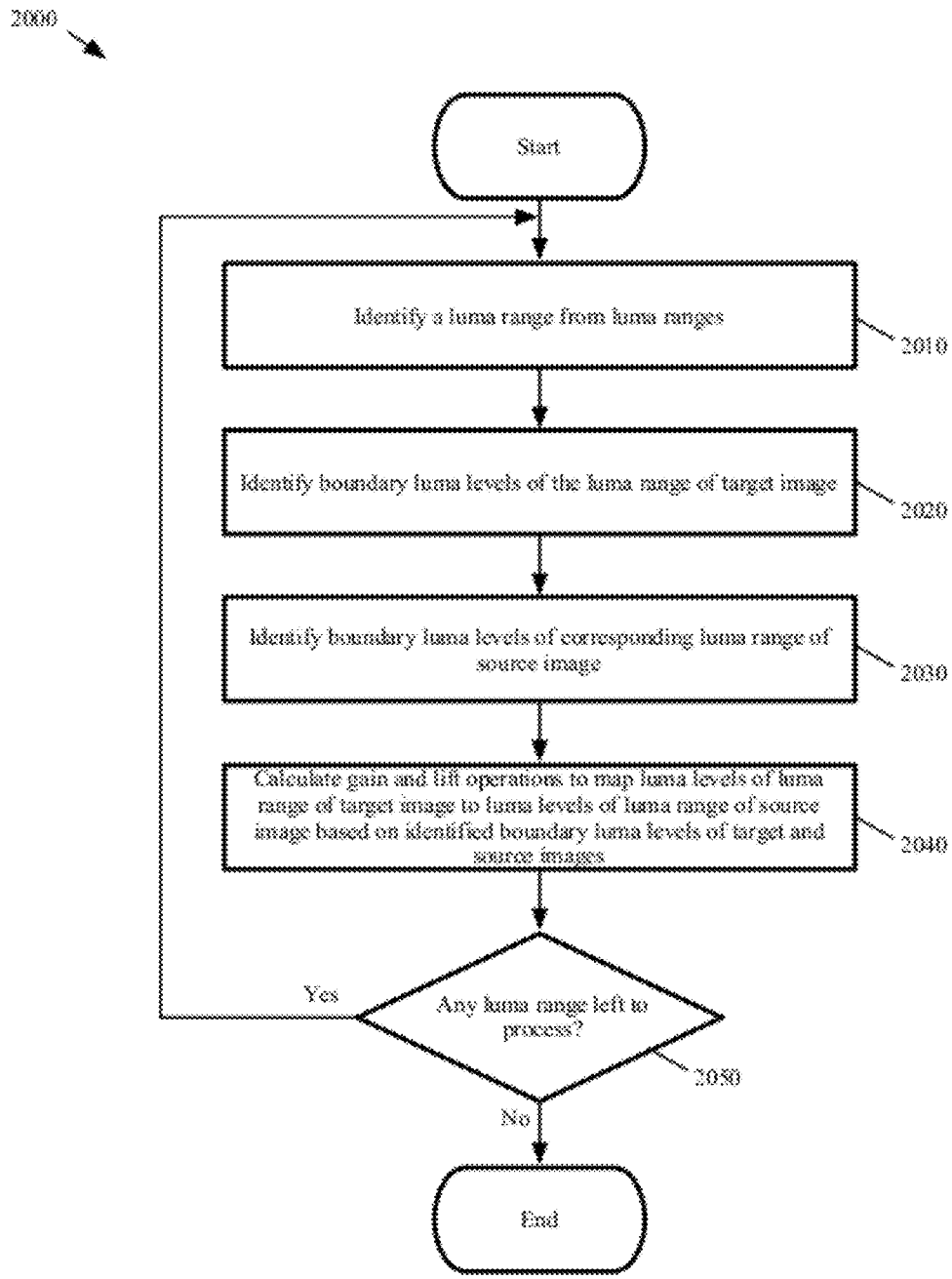
FIG. 20 conceptually illustrates a process of some embodiments for determining gain and lift operations.

In some embodiments, gain and lift operations map luma levels of the target image to luma levels of the source image in order to match the contrast of the target image to the contrast of the source image. FIG. 20, which will be described in more detail below, illustrates a process of some embodiments for determining such gain and lift operations. The gain and lift operations of some embodiments are represented by a transformation matrix.

Figure 21:
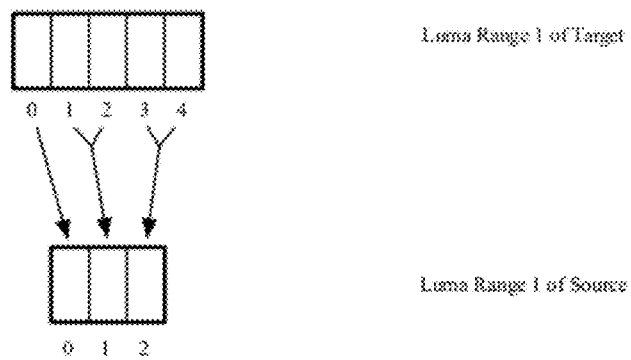
FIG. 21 illustrates an example mapping of luma levels of a luma range of a target image to luma levels of a source image according to some embodiments of the invention.
Figure 22:
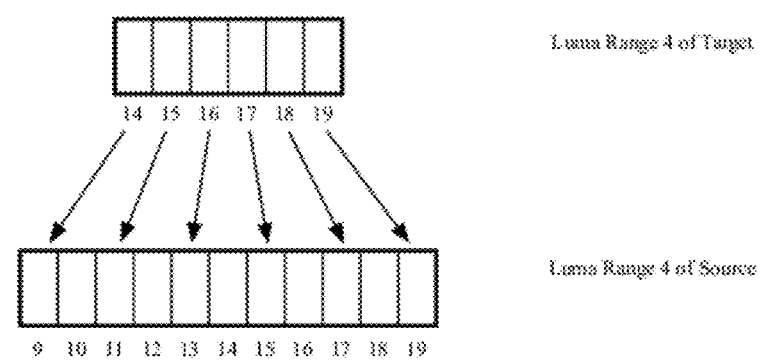
FIG. 22 illustrates another example mapping of luma levels of a luma range of a target image to luma levels of a source image according to some embodiments of the invention.

Next, the process 1600 applies (at 1620) the determined gain and lift operations to the target image (or a copy of the target image). By applying the gain and lift operations to the target image, the contrast of the target image and the contrast of the source image are matched. The gain and lift operations of some embodiments match the contrast of the target image to the contrast of the source image by mapping luma levels of the target image to luma levels of the source image in order to match the distribution of the luma of pixels in the target image to the distribution of the luma of pixels in the source image. In other words, each of the luma ranges of the target image has the same range of luma levels as the corresponding luma range of the source image after such gain and lift operations have been applied to the target image. Examples of such mapping of luma levels are illustrated in FIGS. 21 and 22, which are described in below by reference to FIG. 20. As noted above, some embodiments use a transformation matrix to represent the gain and lift operations. In such embodiments, the gain and lift operations are applied to the target image by applying the transformation matrix to the target image.

Figure 17:
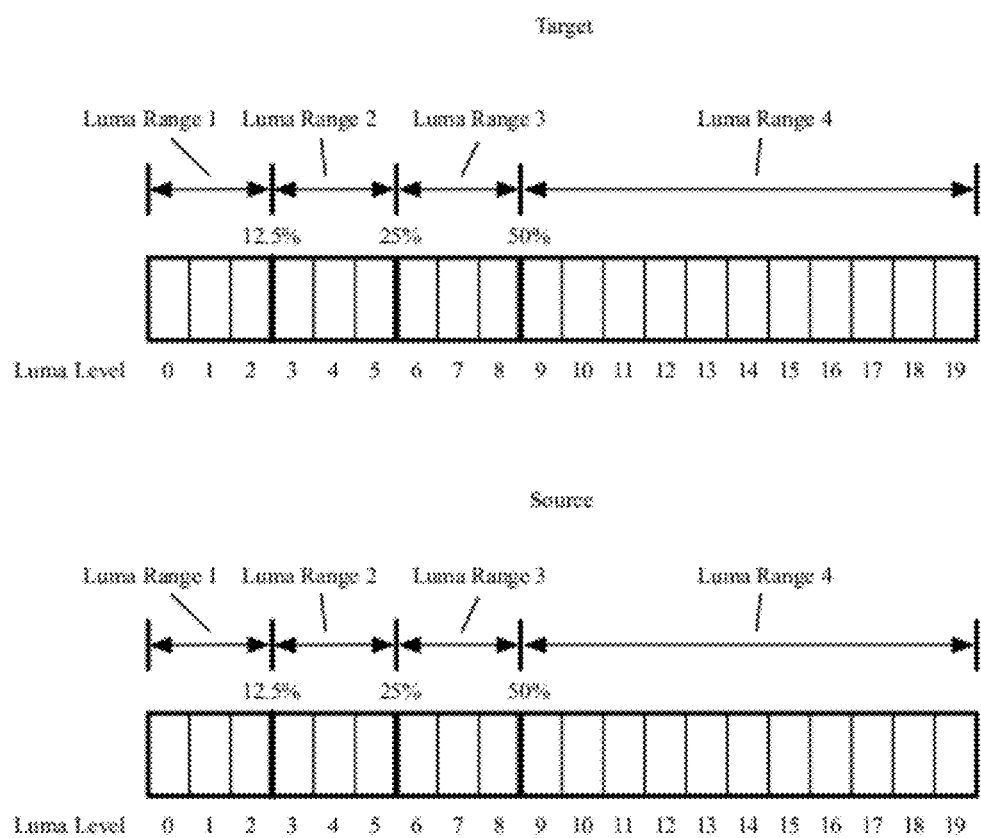
FIG. 17 conceptually illustrates the luma ranges illustrated in FIG. 13 after gain and lift operations have been applied to the target image according to some embodiments of the invention.

FIG. 17 conceptually illustrates the luma ranges of the target image and source image illustrated in FIG. 13 after gain and lift operations have been applied to the target image. As shown, the distribution of the luma of pixels in the target image matches the distribution of the luma of pixels in the source image. That is, 12.5 percent of the pixels in the target image and in the source image each have luma component values of 0-2, 12.5 percent of the pixels in the target image and in the source image each have luma component values of 3-5, 25 percent of the pixels in the target image and in the source image each have luma component values of 6-8, and 50 percent of the pixels in the target image and in the source image each have luma component values of 9-19.

The process 1600 then determines (at 1630) black balance and white balance operations to match the colors of the target image (to which the determined gain and lift operations have been applied at operation 1620) to the colors of the source image. In some embodiments, the white balance operation matches the average color (e.g., chrominance in a Y'CbCr color space) of pixels in the target image that have luma component values equal to the top of a luma range to the average color of pixels in source image at the same luma level. In such embodiments, the black balance operation matches the average color (e.g., chrominance in a Y'CbCr color space) of pixels in the target image that have luma component values equal to the bottom of a luma range to the average color of pixels in source image at the same luma level. Further, the process illustrated in FIG. 23, which will be described in further detail below, is used to determine black balance and white balance operations in some embodiments. The black balance and white balance operations of some embodiments are represented by a transformation matrix.

Next, the process 1600 applies (at 1640) the determined gain and lift operations and the determined black balance and white balance operations to the original target image (or a copy of the original target image). In some embodiments, the process 1600 applies just the determined black balance and white balance operations to the target image (or a version of the target image) used to determine the black balance and white balance operations since the determined gain and lift operations are already applied to that target image. As mentioned above, some embodiments use a transformation matrix to represent the black balance and white balance operations. The black balance and white balance operations are applied to the target image by applying the transformation matrix to the target image, in such embodiments.

Figure 26:
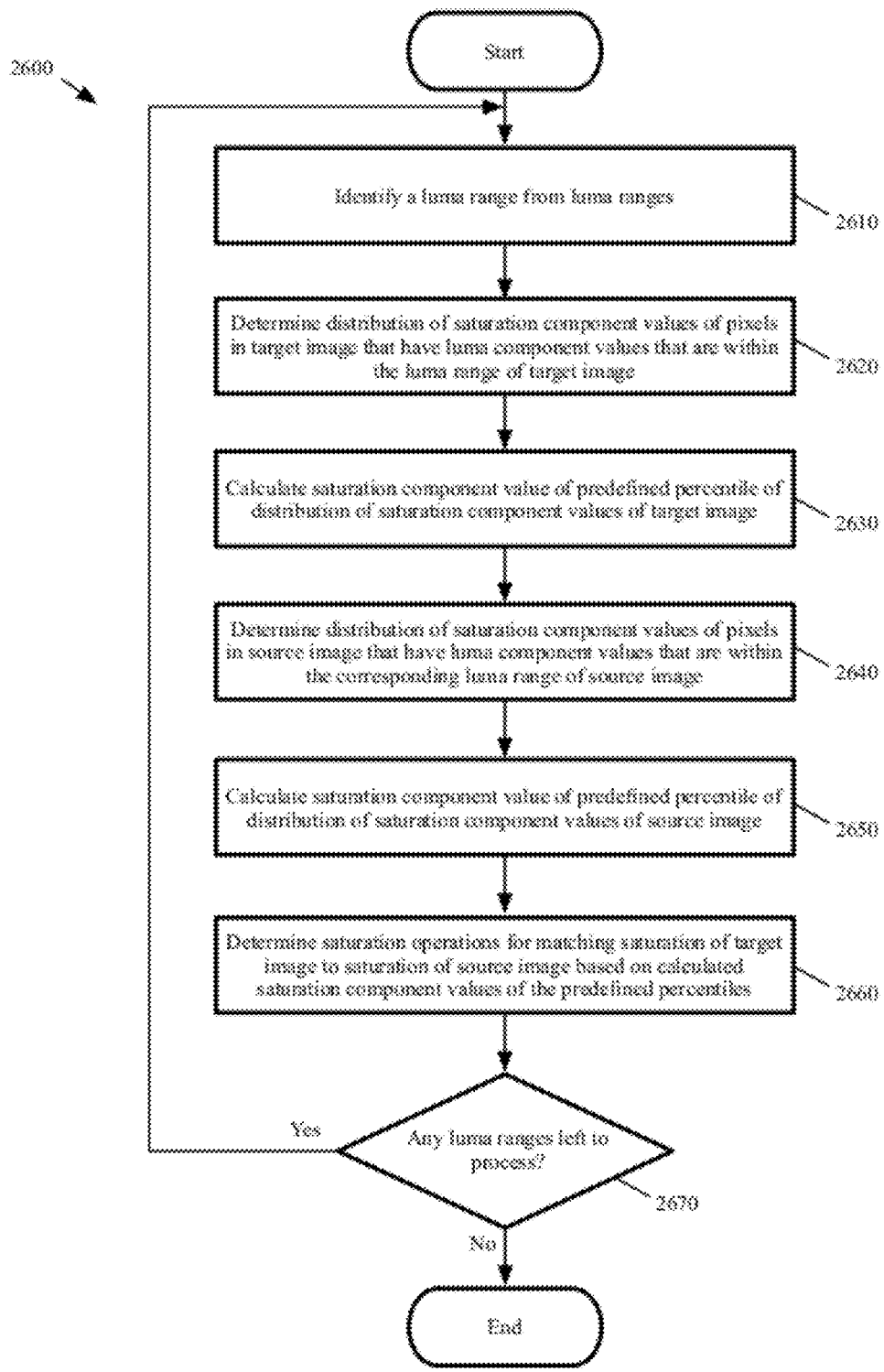
FIG. 26 conceptually illustrates a process of some embodiments for determining saturation operations.

At 1650, the process 1600 determines saturation operations to match the saturation of the target image (to which the determined gain and lift operations and the determined black balance and white balance operations have been applied) to the saturation of the source image. In some embodiments, the saturation is the intensity of a specific color. In some embodiments, saturation is the colorfulness of a specific color relative to its own brightness. The saturation operations of some embodiments match the saturation level at a percentile of the distribution of saturation levels of pixels in the target image to the saturation level at the corresponding percentile of the distribution of saturation levels of pixels in the source image. FIG. 26, which will be described in more detail below, illustrates a process of some embodiments for determining such saturation operations.

Finally, the process 1600 determines (at 1660) transforms to match colors of target image to color of source image based on the determined gain and lift operations, black balance and white balance operations, and saturation operation. As mentioned above, some embodiments determine a set of transforms for each luma range of the target image. In this fashion, the colors of the target image are matched to the colors of the source image on a luma range-by-luma range basis.

Figure 18:
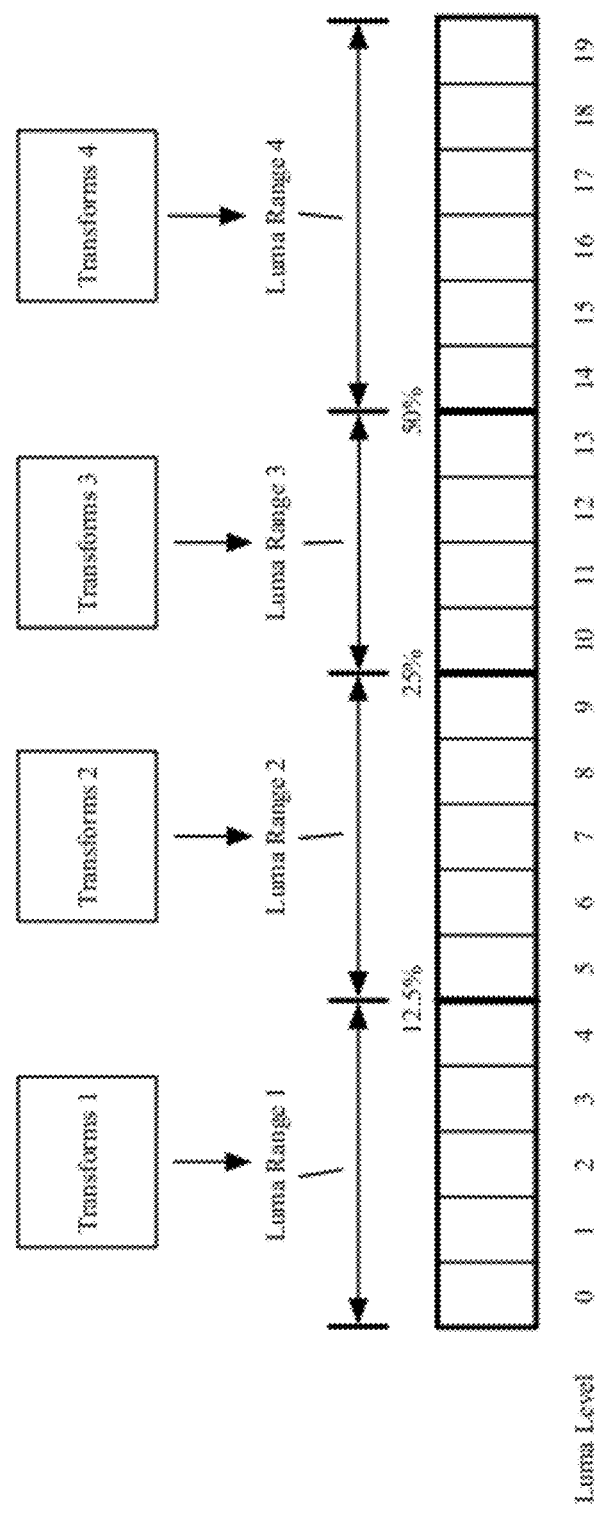
FIG. 18 illustrates an example of a set of transforms that is generated for each luma range of a target image illustrated in FIG. 13 according to some embodiments of the invention.

FIG. 18 illustrates an example of a set of transforms that is determined for each luma range of the target image illustrated in the third stage 1330 of FIG. 13 according to some embodiments of the invention. As shown, the first set of transforms is associated with the first luma range (and each luma level in the first luma range), the second set of transforms is associated with the second luma range (and each luma level in the second luma range), the third set of transforms is associated with the third luma range (and each luma level in the third luma range), and the fourth set of transforms is associated with the fourth luma range (and each luma level in the fourth luma range).

In some embodiments, a transformation matrix is used to represent the set of transforms (e.g., the determined operations) determined for each luma range. In other words, the determined operations for a luma range are incorporated into a transformation matrix to match the colors of the target image to the colors of the source image for pixels in the target image that have luma component values in the luma range. For example, the gain and lift operations, black balance and white balance operations, and saturation operations may each be represented by a transformation matrix in some embodiments. In such embodiments, the transformation matrices of each operation are multiplied together in order to incorporate the operations into a single transformation matrix. Different embodiments define different transformation matrices with different dimensions to represent the set of transforms for a luma range. For instance, some embodiments define a single 3×4 transformation matrix to represent the set of transforms for a luma range. Other embodiments define a transformation matrix with different dimensions to represent the set of transforms for a luma range.

Figure 19:
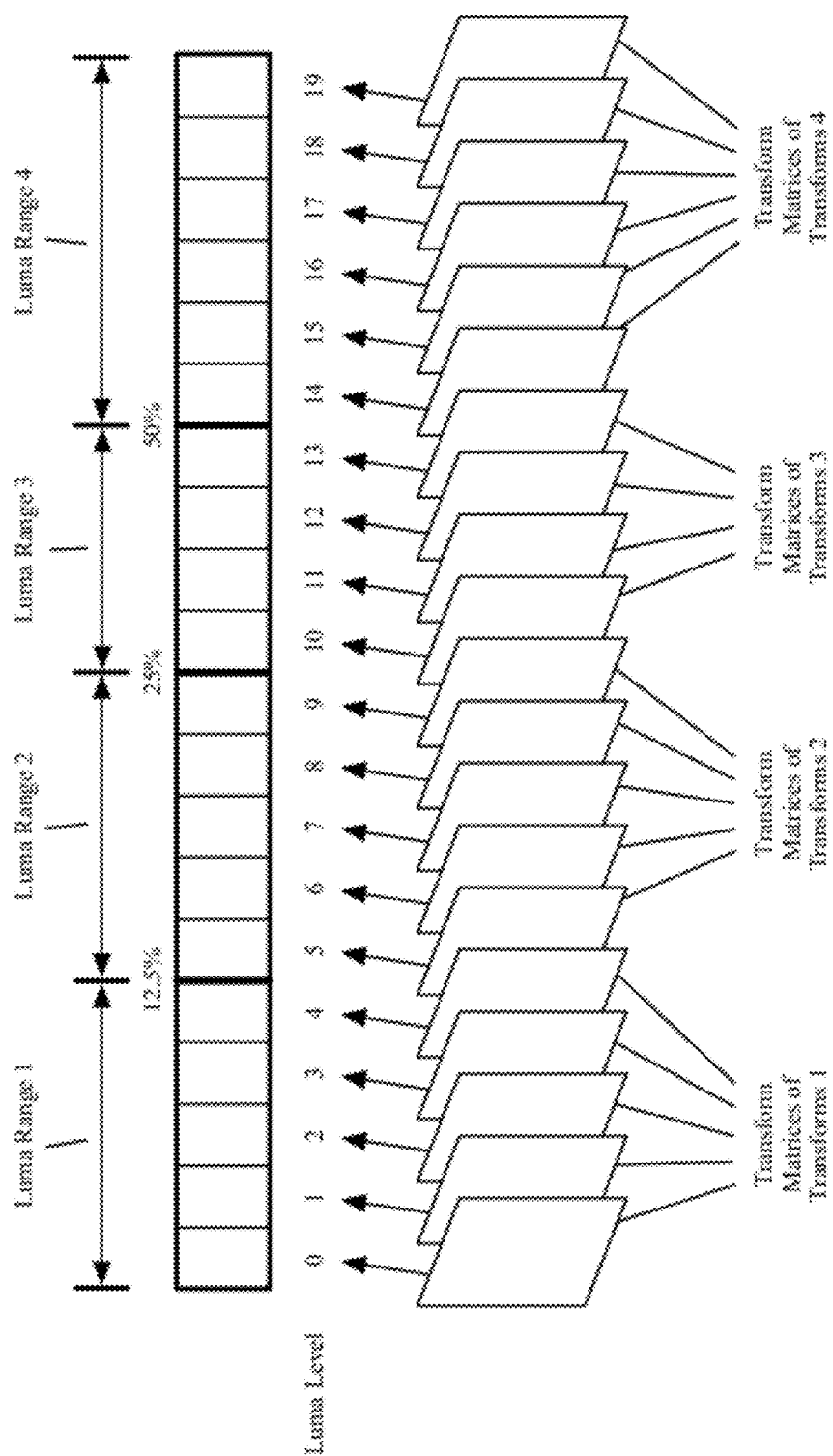
FIG. 19 illustrates an example of a transformation matrix associated with each luma level of the target image illustrated in FIG. 18 according to some embodiments of the invention.

Furthermore, some embodiments associate a transformation matrix with each luma level of the target image. FIG. 19 illustrates an example of a transformation matrix associated with each luma level of the target image illustrated in FIG. 18 according to some embodiments of the invention. As shown, the transforms determined for each luma range of the target image (i.e., transforms 1, transforms 2, transforms 3, and transforms 4) are the same as the ones illustrated in FIG. 18. FIG. 19 also illustrates a transformation matrix associated with each of the 20 luma levels (i.e., luma levels 0-19), as indicated by the arrows associating a transformation matrix with a luma level.

Since a set of transforms determined for a luma range, the transformation matrices associated with luma levels in the luma range are the same (i.e., have the same values). For example, the transformation matrices associates with luma levels 0-4 are the same, the transformation matrices associates with luma levels 5-9 are the same, the transformation matrices associates with luma levels 10-13 are the same, and the transformation matrices associates with luma levels 14-19 are the same.

1. Determining Gain and Lift Operations

As described above by reference to the process 1600, some embodiments determine gain and lift operations as part of the process for determining the transforms for matching the colors of a target image to the colors of a source image. In some embodiments, the gain and lift operations map luma levels of the target image to luma levels of the source image in order to match the contrast of the target image to the contrast of the source image. FIG. 20 conceptually illustrates a process 2000 of some embodiments for determining such gain and lift operations. As described above, the process 2000 is performed by the process 1600 of some embodiments (e.g., at the operation 1610). The process 2000 will be described by reference to the third stage 1330 of FIG. 13, which illustrates luma ranges of a target image and corresponding luma ranges of a source image determined by the process 1200 of some embodiments.

The process 2000 begins by identifying (at 2010) a luma range of the target image. In some embodiments, the luma range is a luma range identified by the process 1200, which is previously described above by reference to FIG. 12.

The process 2000 then identifies (at 2020) boundary luma levels of a luma range of the target image. In some embodiments, the boundary luma levels of a luma range are the bottom and top luma levels of the luma range. Referring to the third stage 1330 of FIG. 13, the boundary luma levels of the first luma range of the target image are luma level 0 (i.e., the bottom) and luma level 4 (i.e., the top), the boundary luma levels of the second luma range of the target image are luma level 5 (i.e., the bottom) and luma level 9 (i.e., the top), the boundary luma levels of the third luma range of the target image are luma level 10 (i.e., the bottom) and luma level 13 (i.e., the top), and the boundary luma levels of the fourth luma range of the target image are luma level 14 (i.e., the bottom) and luma level 19 (i.e., the top).

Next, the process identifies (at 2030) boundary luma levels of the corresponding luma range of the source image. Referring again to the third stage 1330 of FIG. 13, the boundary luma levels of the first luma range of the source image are luma level 0 (i.e., the bottom) and luma level 2 (i.e., the top), the boundary luma levels of the second luma range of the source image are luma level 3 (i.e., the bottom) and luma level 5 (i.e., the top), the boundary luma levels of the third luma range of the source image are luma level 6 (i.e., the bottom) and luma level 8 (i.e., the top), and the boundary luma levels of the fourth luma range of the source image are luma level 9 (i.e., the bottom) and luma level 19 (i.e., the top).

The process 2000 then calculates (at 2040) gain and lift operations to map luma levels of the identified luma range of the target image to the luma levels of the identified luma range of the source image based on the identified boundary luma levels of the target image and the source image. In some embodiments, the gain and lift operations are represented by a linear equation. In some such embodiments, the gain operation is expressed as the slope of the equation and the lift operation is expressed as the y-intercept. The following is an example of such an equation:

$$y = \frac{\text{luma level of } source_{top} - \text{luma level of } source_{bottom}}{\text{luma level of } target_{top} - \text{luma level of } target_{bottom}} x + b \quad (1)$$

where x is a luma level of the luma range of the target image, y is the corresponding luma level of the source image to which luma level x is mapped, and b is the lift operation. The following equation is an example of applying the above equation (1) with respect to the first luma ranges illustrated in the third stage 1330 of FIG. 13.

$$y = \frac{2-0}{4-0}x + b = \frac{1}{2}x + b \quad (2)$$
$$b = 2 - \frac{1}{2}(4) = 0$$
$$y = \frac{1}{2}x$$

In some embodiments, the linear equation does not directly map a luma level of the target image to a luma level of the source image. For instance, the linear equation determined for the first luma ranges of the third stage 1330 of FIG. 13 maps luma level 1 of the target image to luma level 0.5 of the source image and maps luma level 3 of the target image to luma level 1.5 of the source image. In such cases, some embodiments utilize a rounding up method to map a luma level of the target image to a luma level of the source image.

An example of such rounding up method is illustrated in FIG. 21, which illustrates an example mapping of luma levels of a luma range of the target image to luma levels of the corresponding luma range of the source image according to some embodiments of the invention. Specifically, FIG. 21 illustrates the mapping of the luma levels of the first luma ranges illustrated in the third stage 1330 of FIG. 13 based on the above equation (2). As shown, luma level 1 of the target image is rounded up from 0.5 to 1 and mapped to luma level 1 of the source image. Similarly, luma level 3 of the target image is rounded up from 1.5 to 2 and mapped to luma level 2 of the source image. Luma levels 0, 2, and 4 of the target image are mapped to luma levels 0, 1, and 2 of the source image, respectively, because the above linear equation directly maps such levels to luma levels of the source image. Although FIG. 21 illustrates a rounding up method, other embodiments use different methods, such as a rounding down method.

The following equation is an example of applying the above equation (1) with respect to the fourth luma ranges illustrated in the third stage 1330 of FIG. 13.

$$y = \frac{19-9}{19-14}x + b = 2x + b \quad (3)$$
$$b = 19 - 2(19) = -19$$
$$y = 2x - 19$$

FIG. 22 illustrates another example mapping of luma levels of a luma range of the target image to luma levels of the corresponding luma range of the source image according to some embodiments of the invention. In particular, this figure shows the mapping of the luma levels of the fourth luma ranges illustrated in the third stage 1330 of FIG. 13 based on the above equation (3). As shown, luma level 14 of the target image is mapped to luma level 9 of the source image, luma level 15 of the target image is mapped to luma level 11 of the source image, luma level 16 of the target image is mapped to luma level 13 of the source image, luma level 17 of the target image is mapped to luma level 15 of the source image, luma level 18 of the target image is mapped to luma level 17 of the source image, and luma level 19 of the target image is mapped to luma level 19 of the source image. In this example, each of the luma levels of the target image is mapped directly to a luma level in the source image. Thus, no rounding up or down was required.

In some embodiments, the gain and lift operations determined for a luma range are represented by a transformation matrix that matches the contrast of the luma range of the target image to the contrast of the luma range of the source image.

Returning to FIG. 20, the process 2000 determines (at 2050) whether any luma range (e.g., a luma range of the target image) is left to process. When the process 2000 determines that there is a luma range to process, the process 2000 returns to the operation 2010 to process any remaining luma ranges. Otherwise, the process 2000 ends.

2. Determining Black Balance and White Balance Operations

In addition to matching the luma of the target image to the luma of the source image, some embodiments also match the colors of the target image to the colors of the source image. As described with respect to process 1600, some embodiments determine black balance and white balance operations to match the colors of the target image to the colors of the source image. In some embodiments, gain and lift operations are applied to the target image before it is used to determine the black balance and white balance operations. That is, the distribution of the luma of pixels in the target image that is used in such embodiments matches the distribution of the luma of pixels in the source image, and each of the luma ranges of the target image has the same range of luma levels as the corresponding luma range of the source image.

Figure 23:
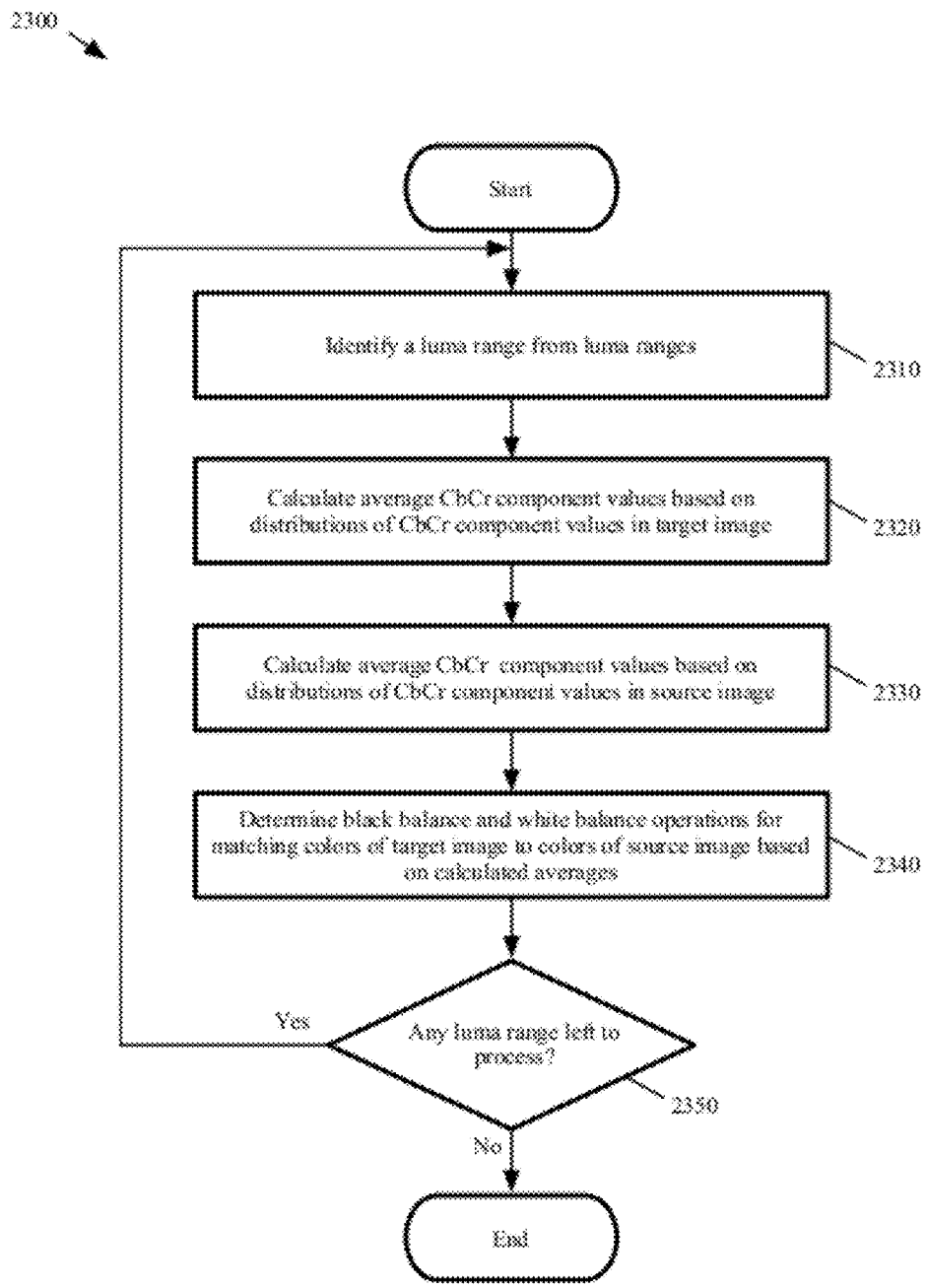
FIG. 23 conceptually illustrates a process of some embodiments for determining black balance and white balance operations.

FIG. 23 conceptually illustrates a process 2300 of some embodiments for determining such black balance and white balance operations. As mentioned above, the process 2300 is performed by the process 1600 of some embodiments (e.g., at the operation 1630). The process 2300 starts by identifying (at 2310) a luma range of the target image. In some embodiments, the luma range is a luma range identified by the process 1200, which is previously described above by reference to FIG. 12.

Next, the process 2300 calculates (at 2320) average CbCr component values based on distributions of CbCr (i.e., chrominance) component values of pixels of the target image that have CbCr component values within a luma range of the target image. In some embodiments, the process 2300 determines a distribution of CbCr component values of pixels in the target image that have luma component values equal to the bottom luma level of the luma range and a distribution of CbCr component values of pixels in the target image that have luma component values equal to the top luma level of the luma range. The distribution of the bottom luma level is for determining the black balance operation. The distribution of the top luma level is for determining the white balance operation.

Figure 24:
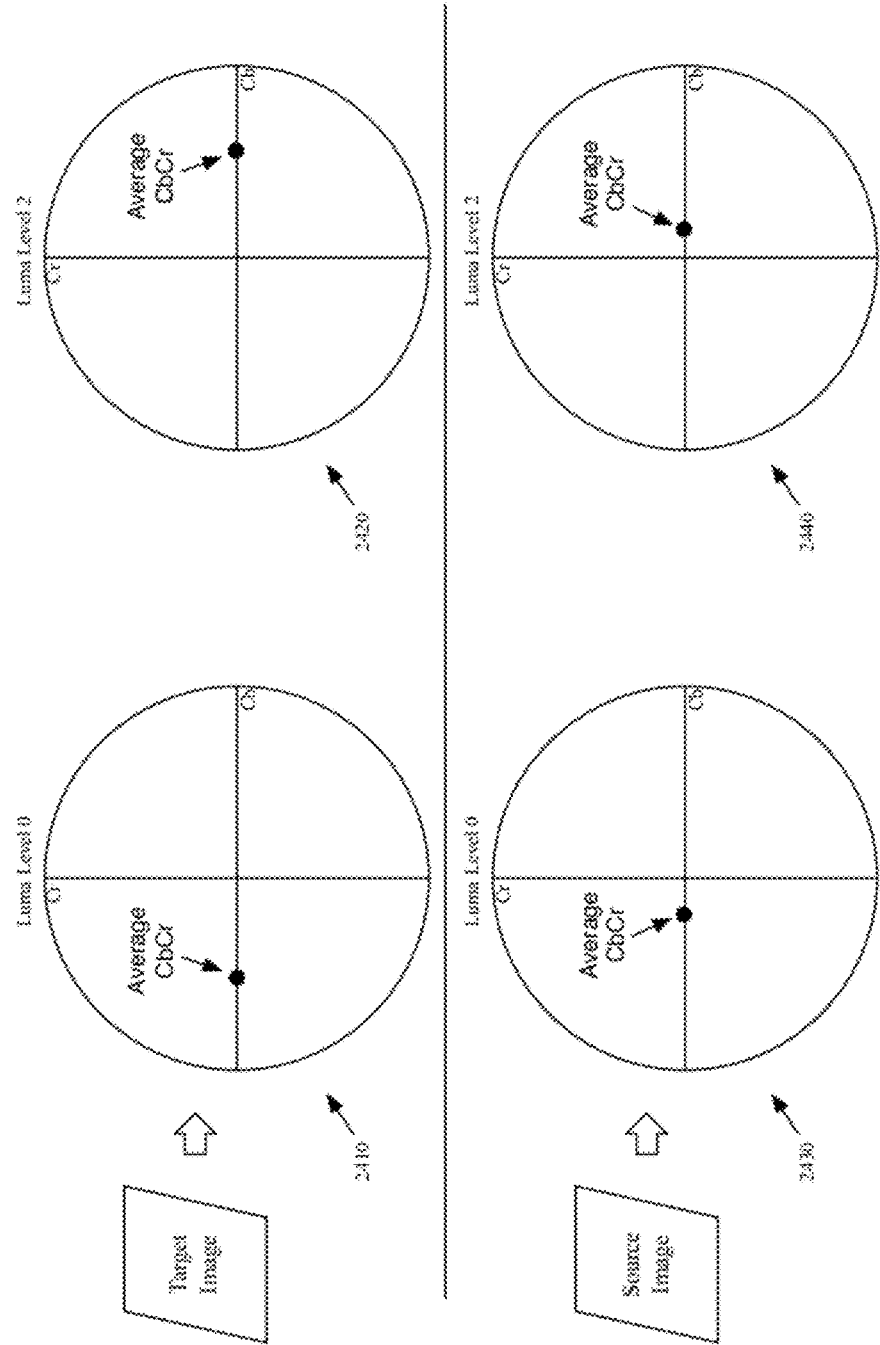
FIG. 24 illustrates examples of average CbCr component values based on histograms of example distributions of CbCr component values of a target image and a source image.

FIG. 24 illustrates two-dimensional CbCr planes 2410 and 2420 that indicate example average CbCr component values of the target image. In this example, the CbCr plane 2410 illustrates an average CbCr component value, indicated by a black dot, based on an example distribution (not shown) of pixels in the target image that have luma component values equal to the bottom luma level (i.e., luma level 0) of the first luma range of the target image shown in FIG. 17. The CbCr plane 2420 shows a CbCr component value, also indicated by a black dot, based on an example distribution (not shown) of pixels in the target image that have luma component values equal to the top luma level (i.e., luma level 2) of the first luma range of the target image illustrated in FIG. 17.

For this example, the horizontal axis of the CbCr plane 2410 represents different Cb component values (not shown) and the vertical axis of the CbCr plane 2410 represents different Cr component values (not shown). Different embodiments define the Cb and Cr components to each represent a different number of Cb and Cr component values. For example, some of these embodiments define the Cb and Cr components to each represent 256 possible Cb and Cr component values (e.g., 0-255, −127 to 128, etc.), respectively. Other embodiments define the Cb and Cr components to each represent any number of possible Cb and Cr component values.

The process 2300 then calculates (at 2330) average CbCr component values based on distributions of CbCr (i.e., chrominance) component values of pixels of the source image that have CbCr component values within the corresponding luma range of the source image. In some embodiments, the process 2300 determines a distribution of CbCr component values of pixels in the source image that have luma component values equal to the bottom luma level of the luma range and a distribution of CbCr component values of pixels in the source image that have luma component values equal to the top luma level of the luma range. As mentioned above, the distribution of the bottom luma level is for determining the black balance operation, and the distribution of the top luma level is for determining the white balance operation.

Returning to FIG. 24, this figure further illustrates two-dimensional CbCr planes 2430 and 2440 that indicate example average CbCr component values of the source image. As shown, CbCr planes 2430 and 2440 are similar to the CbCr planes 2410 and 2420. That is, the horizontal axis of the CbCr planes 2420 and 2440 represents different Cb component values (not shown) and the vertical axis of the CbCr planes 2430 and 2440 represents different Cr component values (not shown). The CbCr plane 2430 illustrates an average CbCr component value, indicated by a black dot, based on an example distribution (not shown) of pixels in the source image that have luma component values equal to the bottom luma level (i.e., luma level 0) of the first luma range of the source image shown in FIG. 17. The CbCr plane 2440 shows a CbCr component value, also indicated by a black dot, based on an example distribution (not shown) of pixels in the source image that have luma component values equal to the top luma level (i.e., luma level 2) of the first luma range of the source image illustrated in FIG. 17.

The process 2300 then determines (at 2340) black balance and white balance operations for matching the colors of the target image to the colors of the source image based on the calculated averages. In some embodiments, the black balance and white balance operations are represented by a shear transformation for matching the colors of the target image to the colors of the source image. In some such embodiments, a shear transformation matches the colors of the target image to the colors of the source image by shifting the average CbCr component value of the pixels in the target image that have luma component values equal to the bottom of the luma range of the target image towards the average CbCr component value of the pixels in the source image that have luma component values equal to the bottom of the corresponding luma range of the source image. In addition, the shear transformation matches the colors of the target image to the colors of the source image by shifting the average CbCr component value of the pixels in the target image that have luma component values equal to the top of the luma range of the target image towards the average CbCr component value of the pixels in the source image that have luma component values equal to the top of the corresponding luma range of the source image.

Figure 25:
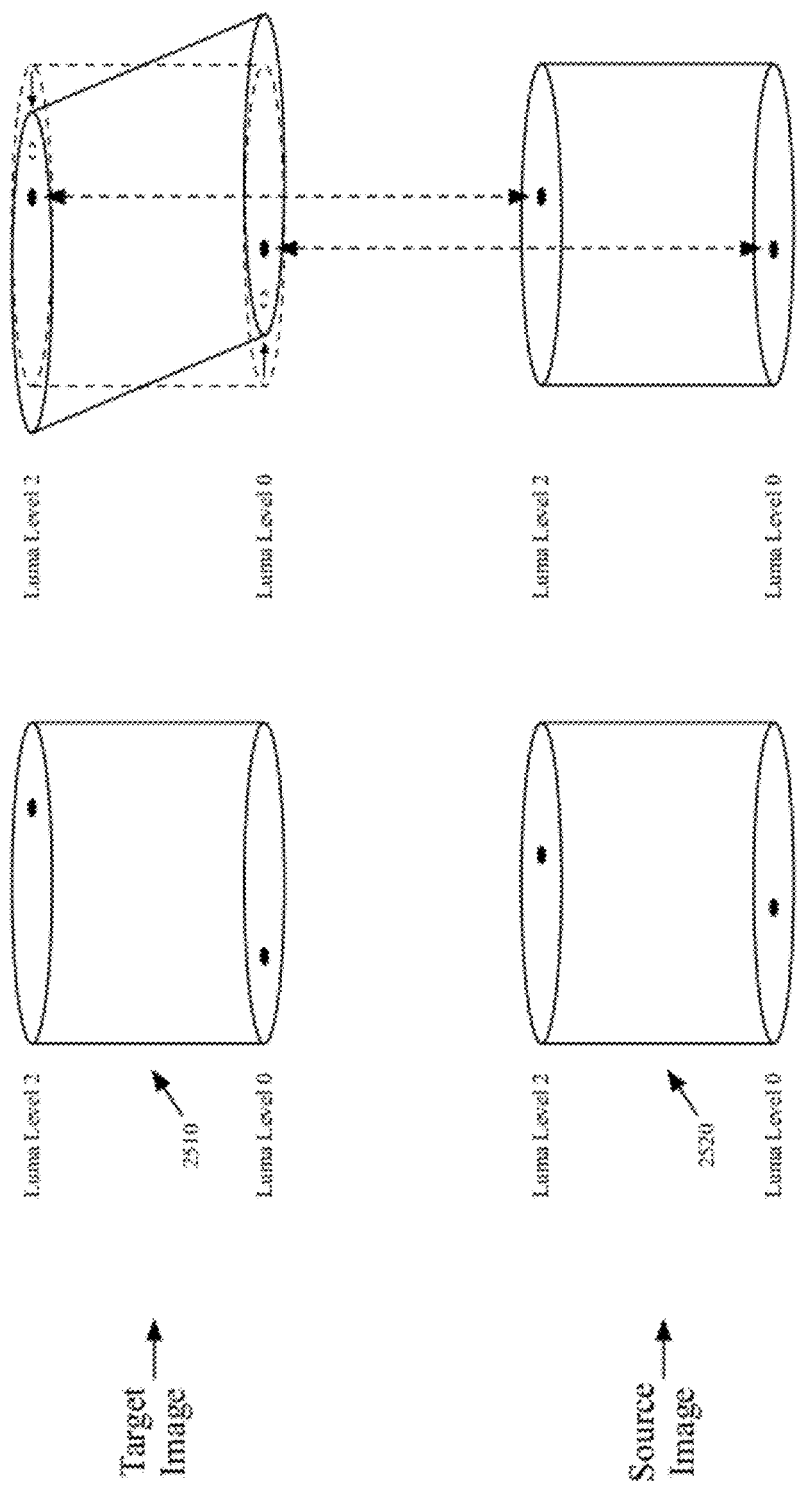
FIG. 25 illustrates an example of black balance and white balance operations that match the colors of the target image to the colors of the source image.

FIG. 25 illustrates an example of black balance and white balance operations that match the colors of the target image to the colors of the source image based on a shear transformation. Specifically, this figure conceptually illustrates the CbCr planes 2410-2440 illustrated in FIG. 24 in a three-dimensional Y'CbCr color space. As shown on the left side of FIG. 25, the CbCr plane 2410 is illustrated at the top of a three-dimensional representation 2510 of the colors in the first luma range of the target image. In addition, the CbCr plane 2420 is illustrated at the bottom of the three-dimensional representation 2510. The left side of FIG. 25 also shows the CbCr plane 2430 at the top of a three-dimensional representation 2520 of the colors in the first luma range of the source image and the CbCr plane 2440 at the bottom of the three-dimensional representation 2520.

The right side of FIG. 25 conceptually illustrates an example black balance and white balance operation that matches the colors of the target image to the colors of the source image for the first luma ranges illustrated in FIG. 17. In particular, the right side of FIG. 25 illustrates a shear transformation that is applied to the three-dimensional representation 2510 of the colors of the target image. As noted above, a three-dimensional shear transformation, in some embodiments, maintains a fixed plane and shifts all planes parallel to the fixed plane by a distance proportional to their perpendicular distance from the fixed plane. As illustrated in this figure, a three-dimensional shear transformation is applied to the three-dimensional representation 2510 such that the average CbCr component value of luma level 0 of the target image matches the average CbCr component value of luma level 0 of the source image and the average CbCr component value of luma level 2 of the target image matches the average CbCr component value of luma level 2 of the source image. This matching is shown by the vertical dashed arrows indicating that the average CbCr component values of the corresponding luma levels are the same. As shown, the shear transformation also shifts luma levels in between the top and bottom luma levels (luma level 1 in this example) of the first luma range accordingly.

In some embodiments, the black balance and white balance operations determined for a luma range are represented by a transformation matrix that matches the black balance of the luma range of the target image to the black balance of the luma range of the source image and matches the white balance of the luma range of the target image to the white balance of the luma range of the source image. For instance, the embodiments that use a shear transformation described above can represent the shear transformation by a transformation matrix that matches black balance and white balance of the target image to the black balance and white balance of the source image.

Finally, the process 2300 determines (at 2350) whether any luma range (e.g., a luma range of the target image) is left to process. When the process 2300 determines that there is no luma range to process, the process 2300 ends. When the process 2300 determines that there is a luma range to process, the process 2300 returns to the operation 2310 to process any remaining luma ranges. Some embodiments use some or all of the calculations of the previously processed luma ranges when processing (e.g., determining the black balance and white balance operations) remaining luma ranges. For example, since the luma level at (or near) the top level of a particular luma range is the same or similar to a luma level at (or near) the bottom level of another adjacent luma range, some embodiments use the white balance operation (e.g., the calculated average CbCr component value) determined for the particular luma range as the black balance operation for the other luma range.

Referring to FIG. 17 as an example, some embodiments might calculate an average CbCr component value based on pixels in the target image that have luma component values equal to 2.5 (i.e., between luma level 2 and luma level 3). Since this luma level is at (or near) the top of luma range 1 and at (or near) the bottom of luma range 2, some embodiments use the calculated average CbCr component value for luma level 2.5 as the white balance of luma range 1 and the black balance of luma range 2.

As mentioned, the process 2300 determines the black balance operation based on the distribution of CbCr component values of pixels that have luma component values equal to the bottom of a luma range and white balance operations based on the distribution of CbCr component values of pixels that have luma component values equal to the top of the luma range. However, in some embodiments, the black balance operation is determined based on the distribution of CbCr component values of pixels that have luma component values near the bottom of a luma range and white balance operations is determined based on based on the distribution of CbCr component values of pixels that have luma component values near the top of the luma range.

For instance, some embodiments determine such operations based on the distribution of CbCr component values of pixels that have luma component values within 2 luma levels of an end of a luma range. Referring to FIG. 17, such embodiments determine the white balance operation of the first luma range (and/or black balance operation of the second luma range) based on the distribution of CbCr component values of pixels that have luma component values in luma levels 1-4, the white balance operation of the second luma range (and/or black balance operation of the third luma range) based on the distribution of CbCr component values of pixels that have luma component values in luma levels 4-7, and the white balance operation of the third luma range (and/or black balance operation of the fourth luma range) based on the distribution of CbCr component values of pixels that have luma component values in luma levels 7-10.

While FIGS. 23 and 24 illustrate determining black balance and white balance operations based on CbCr component values of pixels, some embodiments determine such operations based on other types of component values of the pixels that represent the pixels' colors. For instance, some such embodiments of the process 2300 determine black balance and white balance operations based on a hue component value while other such embodiments of the process 2300 determine the operations based on red, green, and blue component values.

3. Determining Saturation Operations

As mentioned above, some embodiments determine saturation operations to match the saturation of the target image to the saturation of the source image. As described with respect to process 1600, gain and lift operations and black balance and white balance operations are applied to the target image before it is used to determine the saturation operations in some embodiments. Thus, at this point, each of the luma ranges of the target image has the same range of luma levels as the corresponding luma range of the source image.

FIG. 26 conceptually illustrates a process 2600 of some embodiments for determining saturation operations. As noted above, the process 2600 is performed by the process 1600 of some embodiments (e.g., at the operation 1650). The process 2600 begins by identifying (at 2610) a luma range of the target image. In some embodiments, the luma range is a luma range identified by the process 1200, as described above by reference to FIG. 12.

Figure 27:
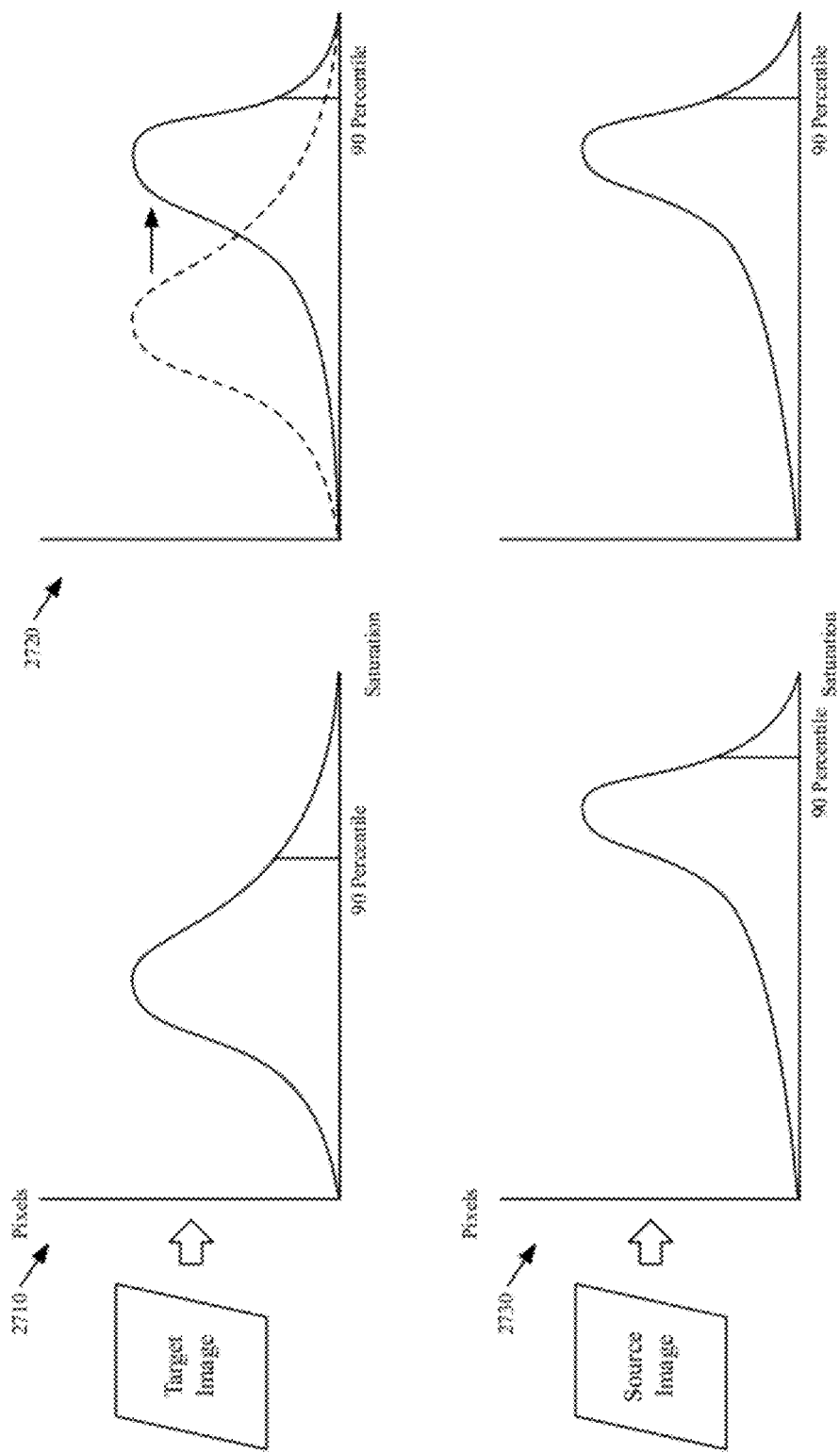
FIG. 27 illustrates an example of saturation operations that match the saturation of the target image to the saturation of the source image.

The process 2600 then determines (at 2620) the distribution of saturation values of pixels in the target image that have luma component values that are within a luma range of the target image. FIG. 27 illustrates histograms 2710 and 2720 of example distributions of saturation values. Specifically, this figure illustrates the histogram 2710 of an example distribution of saturation component values of pixels in the target image that have luma component values within the luma range. For this example, the horizontal axis of the histogram 2710 represents different saturation component values. Different embodiments define the saturation component value of an image to represent a different number of saturation component values. For example, some of these embodiments define the saturation component to represent 256 possible saturation component values (e.g., 0-255, −127 to 128, etc.). Other embodiments define the saturation component to represent any number of possible saturation component values. Furthermore, the vertical axis of the histogram 2710 represents the number of pixels in the target image that have a particular saturation component value.

Next, the process 2600 calculates (at 2630) the saturation component value associated with a predefined percentile of the distribution of the saturation component values determined at operation 2610. In some embodiments, the predefined percentile is 90 percent. However, other embodiments can define the predefined percentile to be any number of different percentiles (e.g., 70 percent, 80 percent, 95 percent, etc.).

Continuing with the example illustrated in FIG. 27, the calculated predefined percentile of the distribution of saturation component values displayed in the histogram 2710 is indicated in the histogram 2710. For this example, the predefined percentile is 90 percent. As such, 90 percent of the pixels in the target image have saturation component values that are less than or equal to the saturation component value (not shown) indicated in the histogram 2710.

The process 2600 then determines (at 2640) the distribution of saturation values of pixels in the source image that have luma component values that are within the corresponding luma range of the source image. Referring to FIG. 27, this figure further illustrates the histogram 2730 of an example distribution of saturation component values of pixels in the source image that have luma component values within the corresponding luma range. Similar to the histogram 2710, the horizontal axis of the histogram 2730 represents different saturation component values, and the vertical axis of the histogram 2730 represents the number of pixels in the source image that have a particular saturation component value.

Next, the process 2600 calculates (at 2650) the saturation component value associated with the predefined percentile of the distribution of the saturation component values determined at operation 2630. Continuing with the example illustrated in FIG. 27, the calculated predefined percentile of the distribution of saturation component values indicated in the histogram 2720. As noted above, the predefined percentile is 90 percent in this example. Thus, 90 percent of the pixels in the source image have saturation component values that are less than or equal to the saturation component value (not shown) indicated in the histogram 2730.

The process 2600 then determines (at 2660) the saturation operations for matching the saturation of target image to the saturation of source image based on the calculated saturation component values of the predefined percentiles. In some embodiments, the saturation operations match the saturation of the target image to the saturation of the source image by adjusting the saturation component values of pixels in the target image that have luma component values within the luma range by an amount such that the saturation component value associated with the predefined percentile of the distribution of the saturation component values of pixels in the target image matches the saturation component value associated with the predefined percentile of the distribution of the saturation component values of pixels in the source image. In addition, some embodiments represent the saturation lift operations determined for a luma range using a transformation matrix that matches the contrast of the luma range of the target image to the contrast of the luma range of the source image.

Referring back to FIG. 27, this figure further illustrates an example of saturation operations that match the saturation of pixels in a luma range of the target image to the saturation of pixels in the luma range of the source image. In particular, FIG. 27 illustrates increasing the saturation of pixels of a luma range of a target image to match the saturation component value associated with the 90 percentile of the target image to the saturation component value associated with the 90 percentile of the source image, as indicated by an arrow in the histogram 2720.

Finally, the process 2600 determines (at 2670) whether any luma range (e.g., a luma range of the target image) is left to process. When the process 2600 determines that there is a luma range to process, the process 2600 returns to the operation 2610 to process any remaining luma ranges. Otherwise, the process 2600 ends.

iii. Blending of Transforms

Figure 28:
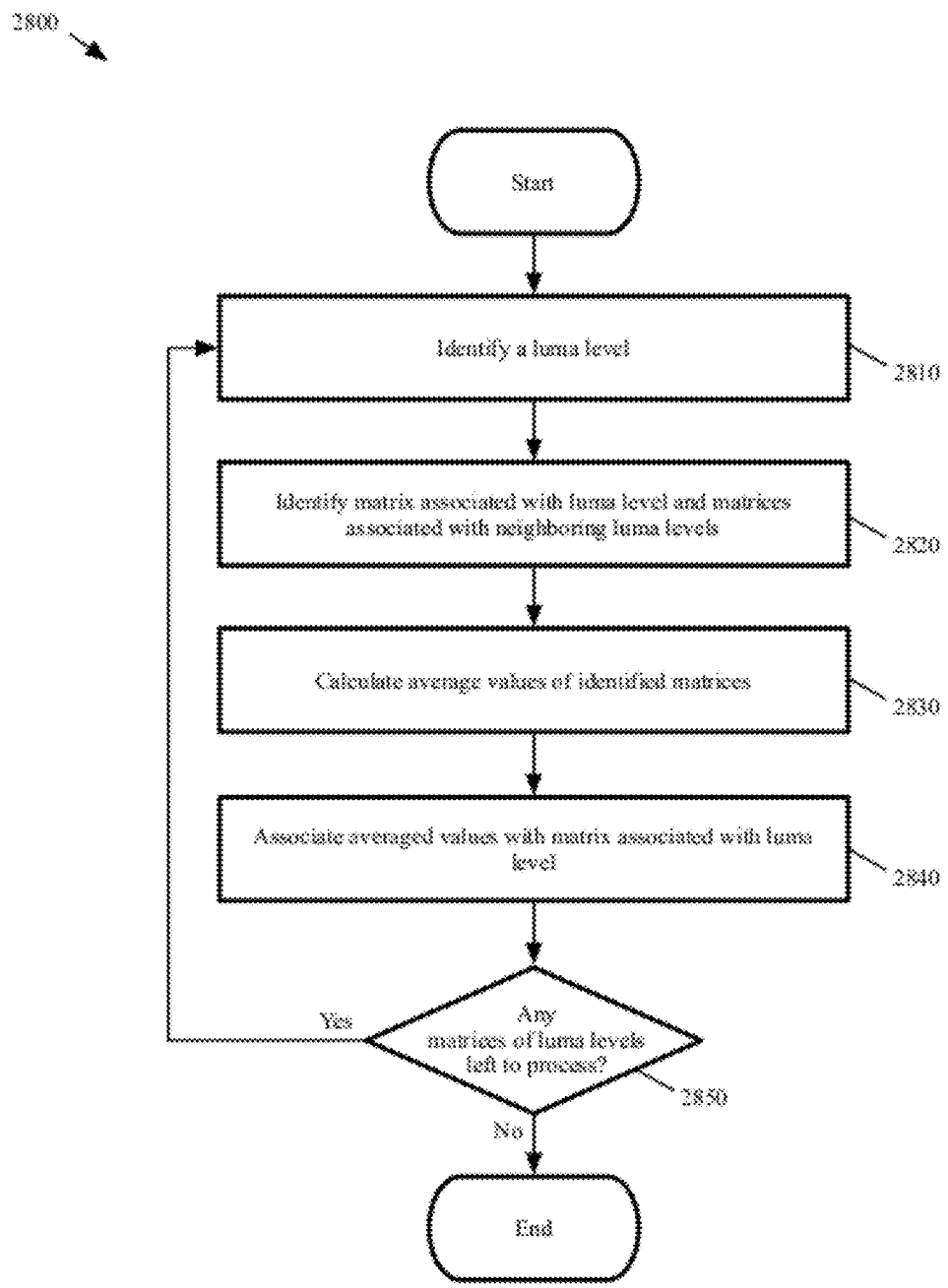
FIG. 28 conceptually illustrates a process of some embodiments for blending transforms.
Figure 29:
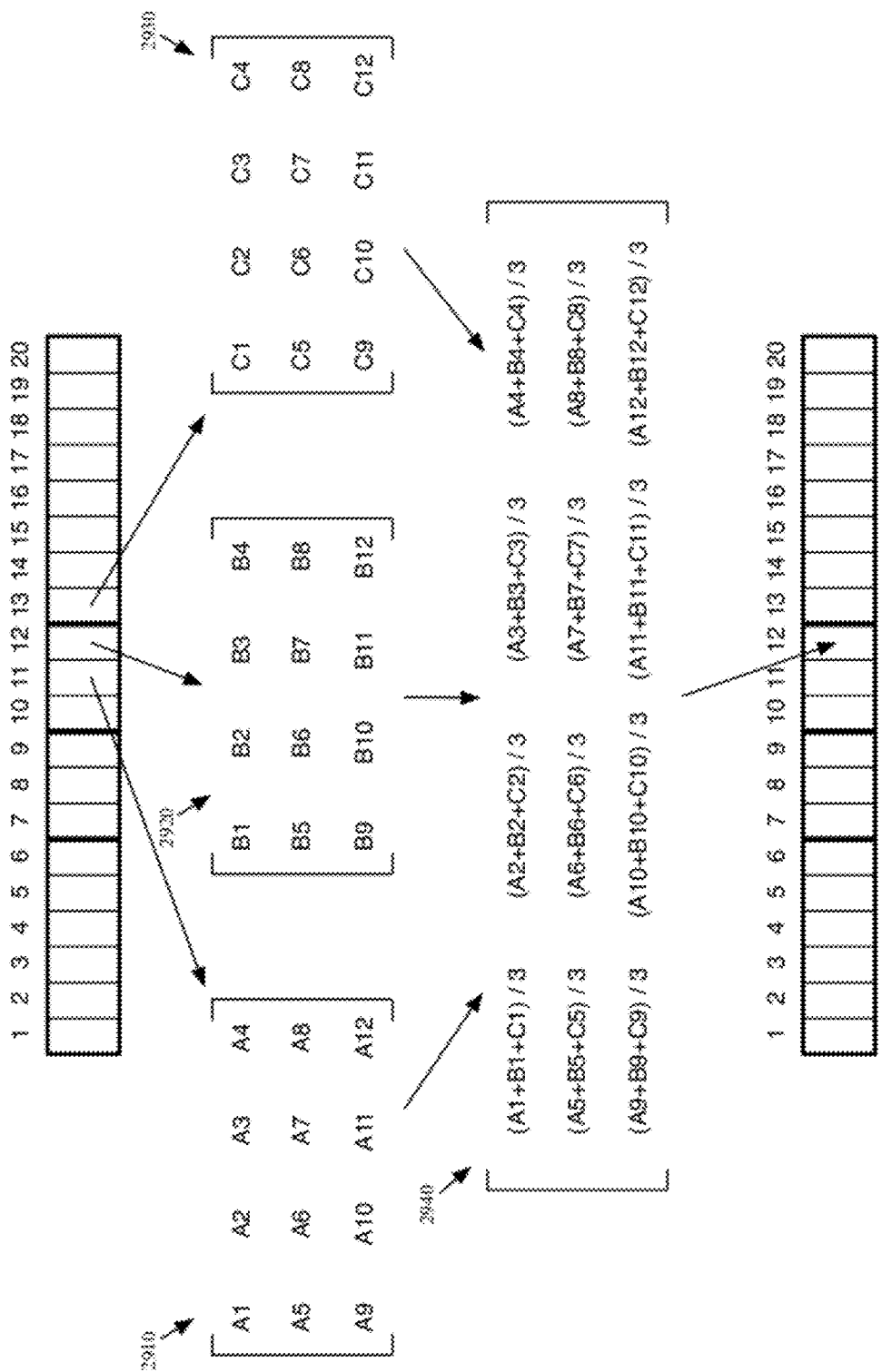
FIG. 29 illustrates an example of blending a transform associated with a luma level of a target image.

To reduce or eliminate sharp transitions among transforms of luma levels near the border of luma ranges, some embodiments blend transforms in order to smooth out these sharp transitions. As described with respect to the process 1000, some embodiments perform a blending operation on transforms after the transforms are determined. FIG. 28 conceptually illustrates a process 2800 of some embodiments for blending transforms. As described above, the process 2800 is performed by the process 1000 of some embodiment (e.g., at the operation 1050). The process 2800 will be described by reference to FIG. 29, which illustrates an example of blending a transform associated with a luma level of the target image. In this example, a transformation matrix is associated with each luma level, similar to the example described above by reference to FIG. 19. As shown, transformation matrix 2910 is associated with luma level 11, transformation matrix 2920 is associated with luma level 12, and transformation matrix 2930 is associated with luma level 13. Furthermore, 3×4 transformation matrices are used to represent the transforms in this example, as shown in FIG. 29.

The process 2800 begins by identifying (at 2810) a luma level of the target image. Referring to FIG. 29, luma level 12 of the target image is the luma level identified for this example. Since luma level 12 and luma level 13 are each part of different luma ranges, in some embodiments, the transformation matrices are also different and, thus, include different values. In addition, the transformation matrix 2910 associated with luma level 11 might include different values than the values of the transformation matrix 2920 associated with luma level 12. For instance, the transformation matrix 2910 associated with luma level 11 might have been previously blended (e.g., with the transformation matrices associated with luma level 10 and luma level 12).

Next, the process 2800 identifies (at 2820) matrix associated with the identified luma level and the transformation matrices associated with neighboring luma levels. In this example, the neighboring luma levels are luma level 11 and luma level 13. As shown, the 3×4 transformation matrix 2910 associated with luma level 11 includes the values A1-A12, the 3×4 transformation matrix 2920 associated with luma level 12 includes the values B1-B12, and the 3×4 transformation matrix 2930 associated with luma level 13 includes the values C1-C12.

The process 2800 then calculates (at 2830) the average of the values of the identified matrices. Referring to FIG. 29, the average of the values of the identified matrices are calculated by adding the corresponding values of each matrix and dividing by the number of matrices (three in this example). For instance, the blended transformation matrix 2940 illustrates that the average value of the values in the first column and first row of the transformation matrices is A1+B1+C1/3. As shown, the average values of the other values in the transformation matrices are calculated in a similar manner for the blended transformation matrix 2940.

After calculating the average values of the identified matrices, the process 2800 associates (at 2840) the calculated average values with the transformation matrix associated with the identified luma level. For the example illustrated by FIG. 29, the calculated average values are associated with the blended transformation matrix 2940, which is associated with luma level 12. As such, the calculated average values are now the values of the transformation matrix associated with luma level 12.

Finally, the process 2800 determines (at 2850) whether any luma range of the target image is left to process. When the process 2800 determines that there is a luma range to process, the process 2800 returns to the operation 2810 to process any remaining luma ranges. Otherwise, the process 2800 ends.

By averaging the values of the transformation matrix of a luma level with the transformation matrices of the luma level's neighboring luma levels, any sharp transitions (e.g., near the borders of luma ranges) among the transformation matrices is reduced by smoothing out the values of the transformation matrices. Further, some embodiments even repeat the process 2800 a predefined number of times to smooth the transitions among the transformation matrices even further.

For instance, some of these embodiments repeat the process 2800 a predefined 32 times. The predefined number of times to repeat the process 2800 can be defined as any number in other embodiments.

While the example illustrated by FIG. 29 and described with respect to the process 2800 shows averaging the values of the transformation matrix of the identified luma level with the transformation matrices of the luma levels immediately neighboring the identified luma level, different embodiments average the values of the transformation matrix of the identified luma level with the transformation matrices of a different number of neighboring luma levels. For instance, some embodiment average the values of the transformation matrix of the identified luma level with the transformation matrices of luma levels within two neighbors on each side of the identified luma level. Referring to FIG. 29, some such embodiments would average the values of the transformation matrix of luma level 12 with the transformation matrices of luma levels 10, 11, 13, and 14.

Furthermore, some embodiments might not perform the operations 2810-2840 for each luma level of the target image. Instead, some embodiments perform the operations 2810-2840 for a number of luma levels near the border of adjacent luma ranges. For instance, some such embodiments perform the operations 2810-2840 for luma levels immediately adjacent to a border of adjacent luma ranges. Referring to FIG. 29 as an example, these embodiments would perform the operations 2810-2840 for luma levels 6, 7, 9, 10, 12, and 13. Other embodiments perform the operations 2810-2840 for luma levels within a defined number of luma levels (e.g., 2, 3, 4) from the border of adjacent luma ranges. For instance, in embodiments where the luma component is defined to represent 256 different luma levels (e.g., 0-255), these embodiments would blend the transformation matrix associated with a particular level with the transformation matrixes of 4 neighboring luma levels (e.g., 2 below and 2 above the particular luma level). In such cases, the transformation matrix associated with the particular luma level would not blend with transformation matrices associated with luma levels across multiple luma ranges as might be the case in the example illustrated in FIG. 29.

B. Matching Colors of Images

As described with respect to the process 300, some embodiments apply transforms to the target image after the transforms for matching the colors of the target image to the colors of the source image are determined. FIG. 30 conceptually illustrates a process 3000 of some such embodiments for applying transforms to a target image to match the colors of the target image to the colors of the source image. As mentioned above, the process 3000 is performed by the process 300 of some embodiment (e.g., at the operation 340). The process 3000 starts by identifying (at 3010) a pixel in the target image.

Next, the process 3000 determines (at 3020) the luma component value of the identified pixel. As mentioned above, for an image defined in a Y'CbCr color space, some embodiments represent the brightness of pixels in an image using a luma (Y') component value (and chrominance values for representing the pixel's chrominance). In such embodiments, the luma component value of the identified pixel is already determined. However, for an image defined in other color spaces, such as an RGB color space, some embodiments apply a transform to determine the luma component value of a pixel in the image. In other embodiments, the image is converted to a color space that uses a luma component value (e.g., a Y'CbCr color space) before starting the process 3000.

The process 3000 then identifies (at 3030) the transformation matrix associated with the determined luma component value. As described above by reference to FIG. 19, a transformation matrix is associated with each luma level of the target image in some embodiments.

After identifying the transformation matrix, the process 3000 applies (at 3040) the transformation matrix to the identified pixel to modify its color and brightness based on the transformation matrix. FIG. 31 illustrates an example of determining new values for a pixel of a target image. For this example, the pixels of the target image are defined in an RGB color space. As such, each pixel in the target image includes a red component value, a blue component value, and a green component value, as mentioned above. As shown, the transformation matrix in this example is a 3×4 transformation matrix. The transformation matrix and a 4×1 matrix that includes the red, green, and blue component values of the pixel and a constant, K, are multiplied. In some embodiments, K is defined as 1. In other embodiments, K is defined as another value (e.g., −1, 0, etc.). In addition, the calculation of the new value of each of the red, green, and blue components is also shown in FIG. 31.

Finally, the process 3000 determines (at 3050) whether any pixel in the target image is left to process. When the process 3000 determines that there is a pixel in the target image left to process, the process 3000 returns to the operation 3010 to process any remaining pixels in the target image. When the process 3000 determines that there is not a pixel in the target image left to process, the process 3000 ends. At this point, the colors of the target image are matched to the colors of the source image.

II. Color Matching Based on Hue

The sections above describe various examples and embodiments of a technique for matching colors of a target image to colors of a source image based on the images' luma. Another technique mentioned above employs a hue-based approach to match the colors of a target image to the colors of a source image. In particular, some embodiments of this hue-based technique identify the dominant hues in the target image and the source image and match the colors of the target image to the colors of the source image based on these identified dominant hues. The following sections will illustrate various examples and embodiments of a color matching tool that matches colors of a target image to colors of a source image based on the images' hues.

A. Matching Hue Ranges

Figure 32:
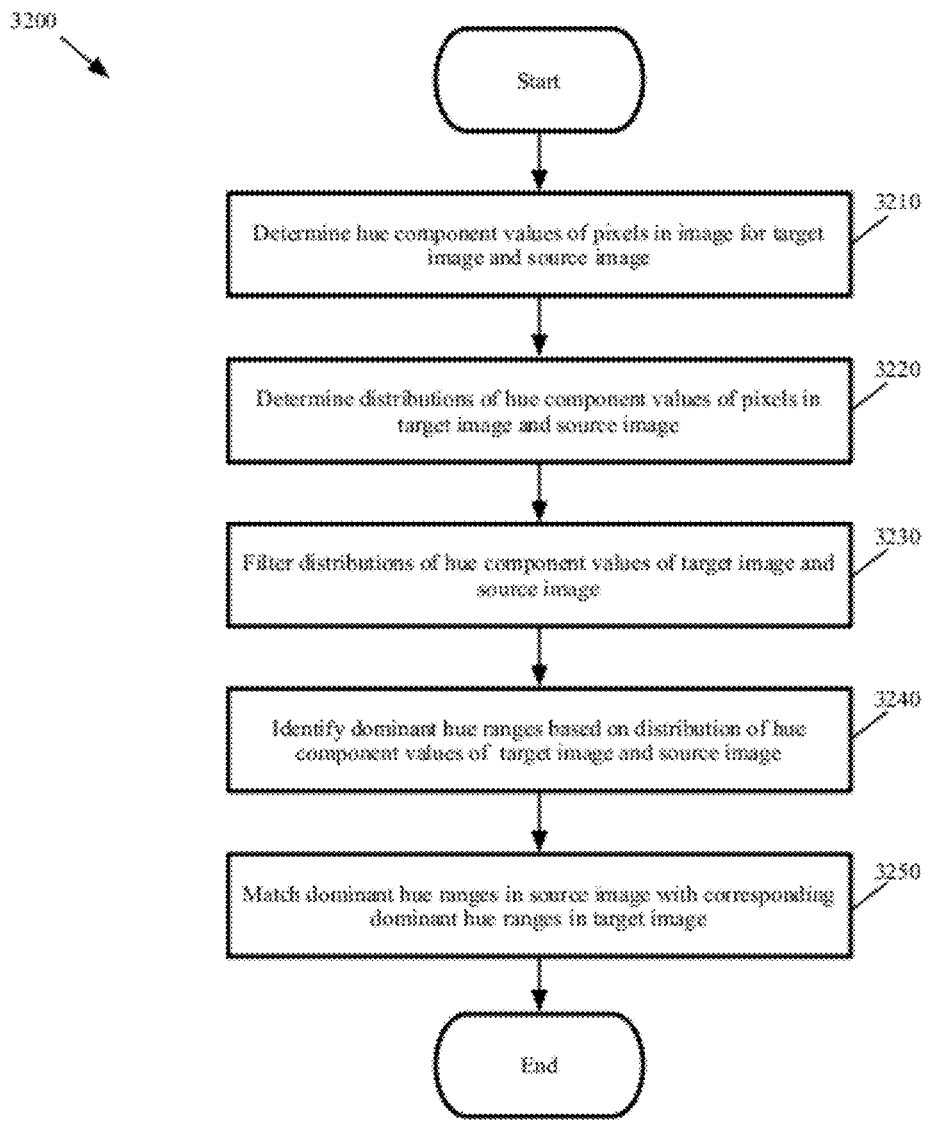
FIG. 32 conceptually illustrates a process of some embodiments for analyzing the target image and the source image based on the images' hues.

As described by reference to process 600, some embodiments analyze the images based on the images' hues in order to identify matching dominant hues in the images. FIG. 32 conceptually illustrates a process 3200 of some embodiments for analyzing the target image and the source image based on the images' hue in order to identify matching dominant hues in the images.

The process 3200 begins by determining (at 3210) the hue component values of pixels in the target image and the hue component values of pixels in the source image. Different embodiments determine the hue component values of pixels in an image differently. For instance, some embodiments convert the target image and the source image to a color space that uses a hue component to represent pixels. Examples of such color spaces include a hue, saturation, and lightness (HSL or HLS) color space and a hue, saturation, and brightness (HSB) color space, among other types of color spaces. In other embodiments, a transform or equation is applied to the pixels of the image based on the color space in which the image is defined in order to determine the pixels' hue component values.

Figure 33:
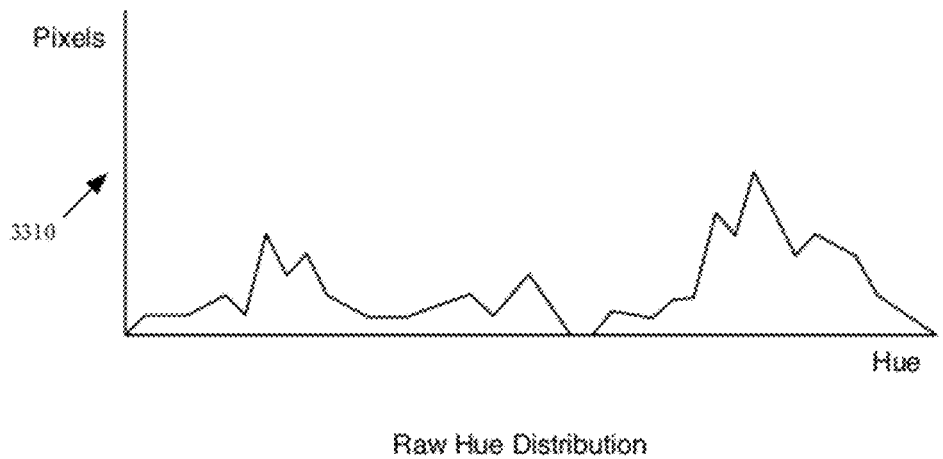
FIG. 33 illustrates a histogram of an example distribution of hue component values of pixels in an image.

Next, the process 3200 determines (at 3220) the distribution of hue component values of pixels in the target image and the distribution of hue component values of pixels in the source image. FIG. 33 illustrates a histogram 3310 of an example distribution of hue component values of pixels in an image. For this example, the horizontal axis of the histogram 3310 represents different hue levels (not shown). Different embodiments define the hue component to represent a different number of hue component values. For example, some embodiments define the hue component to represent 256 possible hue component values (e.g., 0-255, −127 to 128, etc.). In other embodiments, the hue component is defined to represent any number of possible hue component values. In addition, the vertical axis of the histogram 3310 represents the number of pixels in the image that have a particular hue component value.

Figure 34:
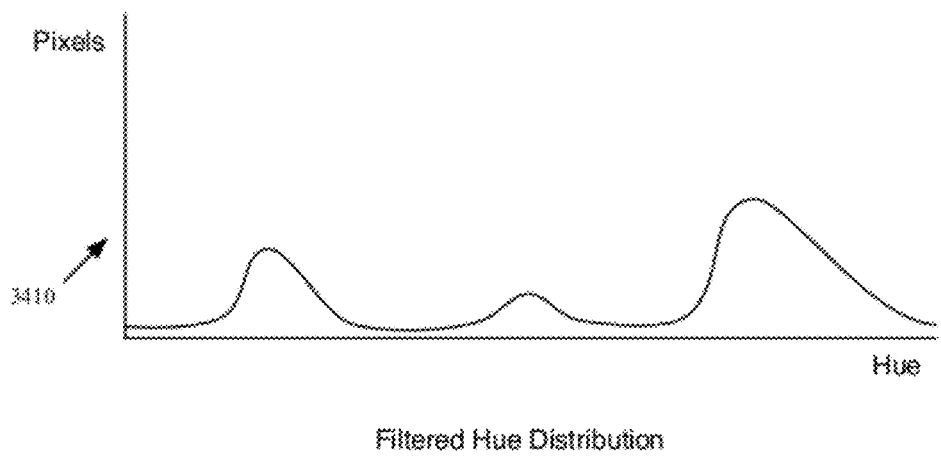
FIG. 34 illustrates an example of the distribution of hue component values illustrated in FIG. 33 after the distribution has been filtered according to some embodiments of the invention.
Figure 35:
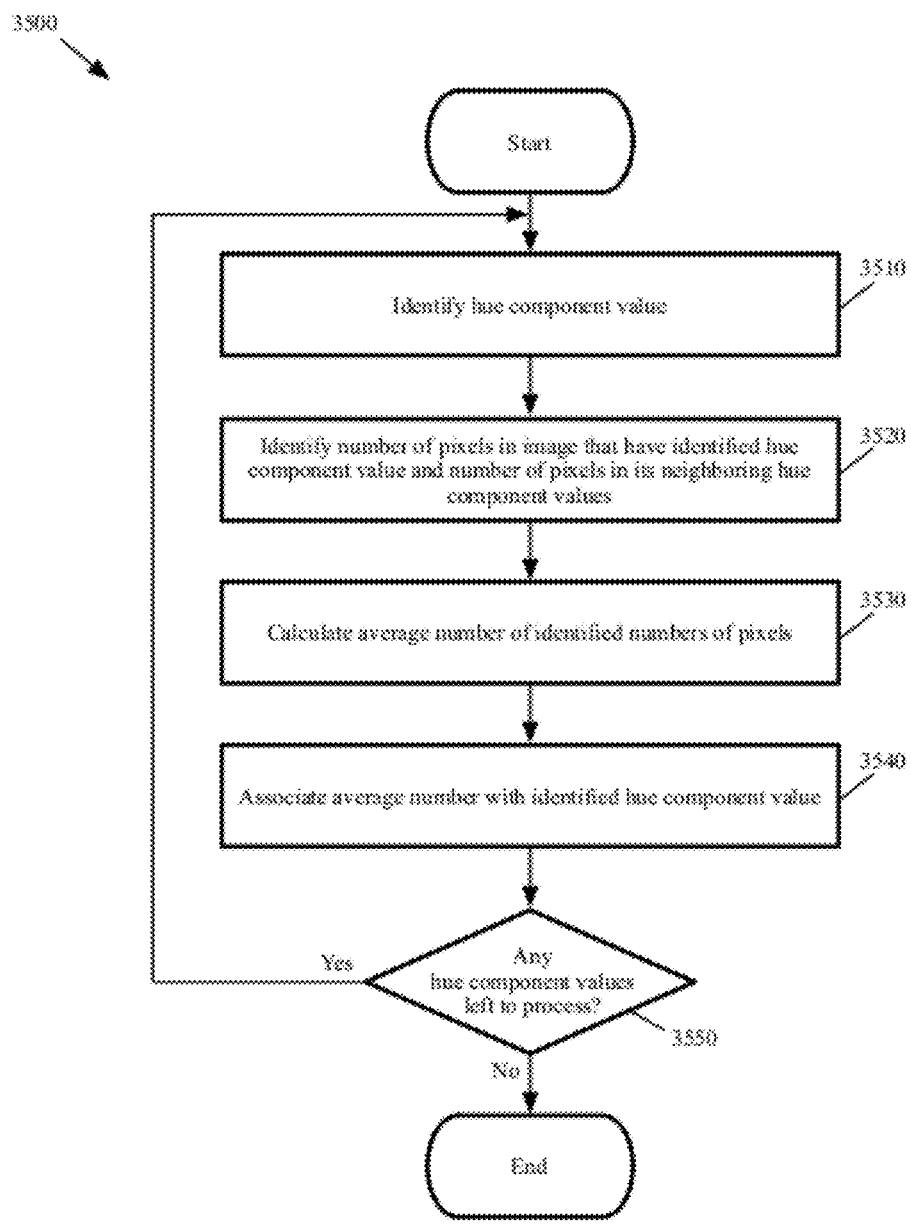
FIG. 35 conceptually illustrates a process of some embodiments for filtering a distribution of hue component values of an image.

The process 3200 then filters (at 3230) the distribution of the hue component values of the target image and the source image. In some embodiments, the distribution of the hue component values is filtered because the distribution may be uneven and/or have sharp transitions along different hue component values of the distribution. For example, FIG. 33 illustrates a histogram 3310 of an example distribution of hue component values that is uneven and has such sharp transitions. Some embodiments filter the distribution of the hue component values by performing a neighbor-averaging technique to the distribution. FIG. 35, which is described in further detail below, conceptually illustrates a process of some embodiments that performs such neighbor-averaging technique. FIG. 34 illustrates a histogram 3410 of the example distribution of hue component values illustrated in FIG. 33 after the distribution has been filtered according to some embodiments of the invention. As shown, the distribution of hue component values is smoother and no longer has sharp transitions as shown in FIG. 33.

Figure 37:
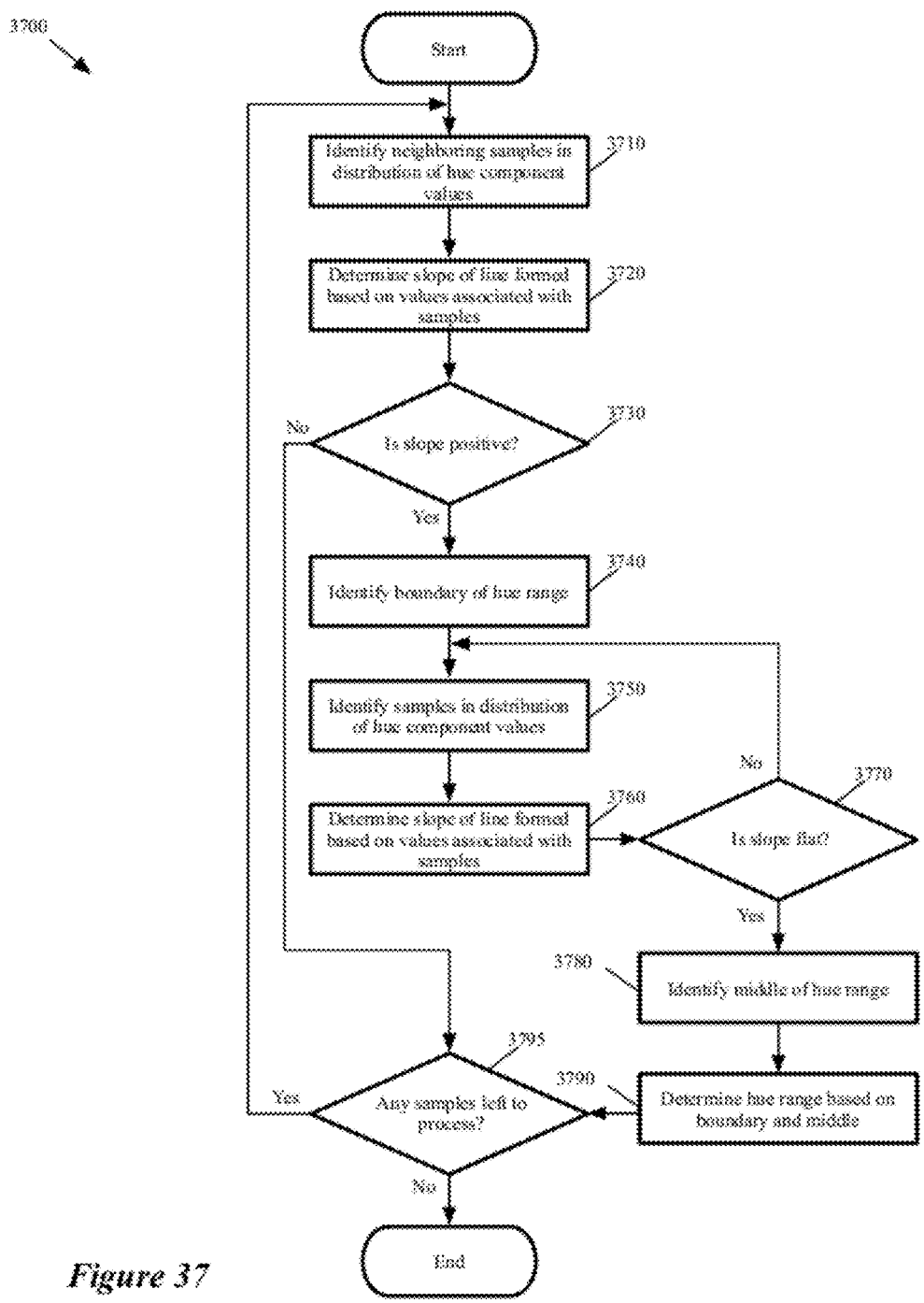

After filtering the distributions, the process 3200 identifies (at 3240) dominant hue ranges (e.g., ranges of hue component values) based on the filtered distributions of hue component values of the target image and the source image. In some embodiments, a range of hue component values that has a relatively large distribution of pixels is identified as a dominant hue range. FIG. 37, which will be described in more detail below, conceptually illustrates a process of some embodiments for identifying dominant hue ranges.

Figure 40:
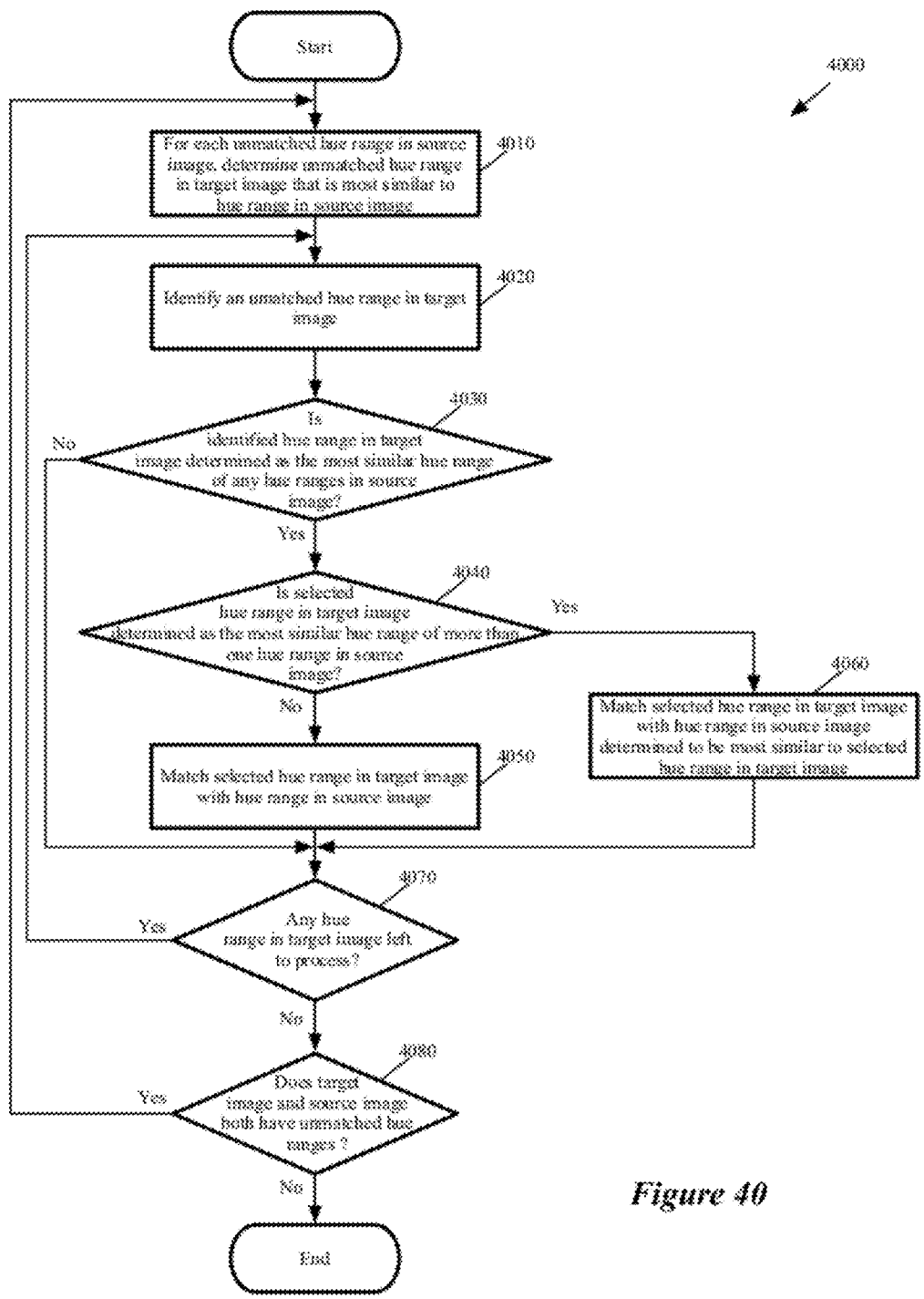
FIG. 40 conceptually illustrates a process of some embodiments for identifying dominant hue ranges in a source image that match dominant hue ranges in a target image.

Finally, the process 3200 matches (at 3250) dominant hue ranges in the source image with dominant hue ranges in the target image that are similar to the dominant hue ranges in the source image. Differently embodiments match dominant hue ranges in the images based on different factors. For instance, some embodiments match dominant hue ranges in the images based on similarities between the height of the hue ranges, the width of the hue ranges, and the amount of common hue component values that are included in the dominant hue ranges. Other embodiments use different and/or additional factors when matching dominant hue ranges in the source image with dominant hue ranges in the target image. FIG. 40, described in further detail below, conceptually illustrates a process of some embodiments for matching dominant hue ranges in the source image and the target image.

i. Filtering Distributions of Hue

In some instances, a distribution of hue component values of an image might have sharp transitions or unevenness along the distribution. As mentioned above, some embodiments filter the distributions of hue component values of the target image and the source image in order to reduce any unevenness and/or sharp transitions to smooth out the distributions. For instance, some of these embodiments use a neighbor-averaging technique to filter the distributions of the images. FIG. 35 conceptually illustrates a process 3500 of some embodiments that performs such filtering. In some embodiments, the process 3500 is performed by the process 3200 (e.g., at the operation 3230), as mentioned above by reference to FIG. 32. For instance, some such embodiments perform the process 3500 on the distribution of hue component values of target image and on the distribution of hue component values of source image. The process 3500 starts by identifying (at 3510) a hue component value. As mentioned above, a hue component value represents a hue or color in some embodiments.

Figure 36:
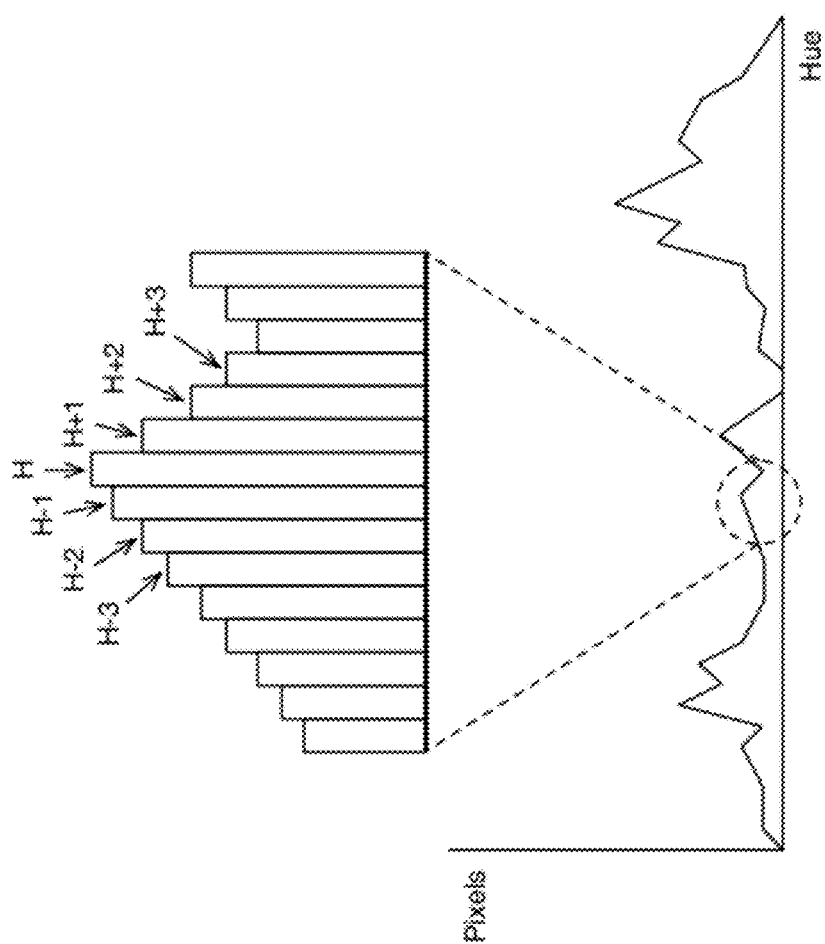
FIG. 36 illustrates an example of an identified hue component value and the hue component values that neighbor the identified hue component value FIG. 37 conceptually illustrates a process of some embodiments for identifying dominant hue ranges in an image.

Next, the process 3500 identifies (at 3520) the number of pixels in the distribution that have the identified hue component value. The process 3500 also identifies (at 3520) the number of pixels in the distribution that have hue component values that neighbor the identified hue component value. FIG. 36 illustrates an example of an identified hue component value and the hue component values that neighbor the identified hue component value. In particular, FIG. 36 illustrates the histogram 3310 of the example distribution of hue component values illustrated in FIG. 33, but further illustrates an enlarged portion of the histogram 3310. As shown, the enlarged portion includes the distributions of pixels along several hue component values. For this example, the identified hue component value is H. Thus, the neighbors of the identified hue component value are H−3, H−2, H−1, H+1, H+2, H+3, etc.

Different embodiments identify a different number of distributions of neighboring hue component values. For example, some embodiments identify two distributions of neighboring hue component values. Referring to FIG. 36 for this example, these embodiments would identify the number of pixels in the distribution at hue component value H, the number of pixels in the distribution at hue component value H−1, and the number of pixels in the distribution at hue component value H+1.

The process 3500 then calculates (at 3530) the average number of identified numbers of pixels. Continuing with the example, the average of the number of pixels in the distribution at hue component values H−1, H, and H+1 is calculated.

Next, the process 3500 associates (at 3540) the calculated average number of pixels with the identified hue component value. That is, the number of pixels at the identified hue component value is now the calculated average number of pixels (e.g., instead of the actual number of pixels in the image that have the identified hue component value).

At 3550, the process 3500 determines whether any hue component value in the distribution of pixels in the image is left to process. When the process 3500 determines that there is a hue component value to process, the process 3500 returns to the operation 3510 to process any remaining hue component values. When the process 3500 determines that there is not a hue component value left to process, the process 3500 ends.

After filtering the distribution of hue component values of the image, the distribution is smoother and less uneven. Some embodiments further smooth the distribution by repeating the process 3500 a predefined number of times. For instance, some such embodiments perform the process 3500 on the target image 32 times and on the source image 32 times. Other embodiments may repeat the process 3500 on the images any number of different times.

Although the example illustrated by FIG. 36 and described with respect the process 3500 averages the number of pixels in the distribution that have the identified hue component value with the number of pixels in two distributions of neighboring hue component values, other embodiments average the number of pixels in the distribution that have the identified hue component value with a different number of distributions of neighboring hue component values. For example, some embodiment average the number of pixels in the distribution that have the identified hue component value with four distributions of neighboring hue component values. Referring to FIG. 36 again, the number of pixels in the distributions at hue component values H−2, H−1, H, H+1, and H+2 are averaged.

ii. Identifying Dominant Hues

In order to match dominant hues of a target image to dominant hues of a source image, some embodiments identify dominant hue ranges of the images. Different embodiments identify dominant hue ranges in an image differently. For example, some embodiments identify dominant hue ranges in an image based on the distribution of hue component values of pixels in the image. The following FIG. 37 illustrates an example of identifying dominant hue ranges in an image based on the distribution of hue component values of pixels in the image. In particular, FIG. 37 conceptually illustrates a process 3700 of some embodiments for identifying dominant hue ranges in a distribution of hue component values in an image. In some embodiments, the process 3700 is performed by the process 3200 (e.g., at the operation 3240), as described above by reference to FIG. 32. The process 3700 will be described by reference to FIG. 38, which illustrates examples of different stages of identifying dominant hue ranges in the histogram 3410 of the filtered distribution illustrated in FIG. 34.

The process 3700 begins by identifying (at 3710) samples of distributions of hue component values of an image (e.g., the target image or the source image). In some embodiments, the process 3700 identifies two samples of distributions at two neighboring hue component values. Referring to FIG. 36 as an example, process 3700 of such embodiments identifies the distributions at hue component values H and H+1. In other embodiments, the process 3700 identifies a different number of samples of distributions of neighboring hue component values (e.g., distributions at hue component values H, H+1, and H+2).

Next, the process 3700 determines (at 3720) the slope of a line formed by the distribution values associated with the identified samples. Referring to FIG. 36 again, the slope of line formed by the distribution values associated with the distributions at hue component values H and H+1 has a negative slope. As another example, the slope of line formed by the distribution values associated with the distributions at hue component values H−3 and H−2 has a positive slope.

The process 3700 then determines (at 3730) whether the slope is positive. When the process 3700 determines that the slop is positive, the process continues to operation 3740. Otherwise, the process proceeds to operation 3795.

Figure 38:
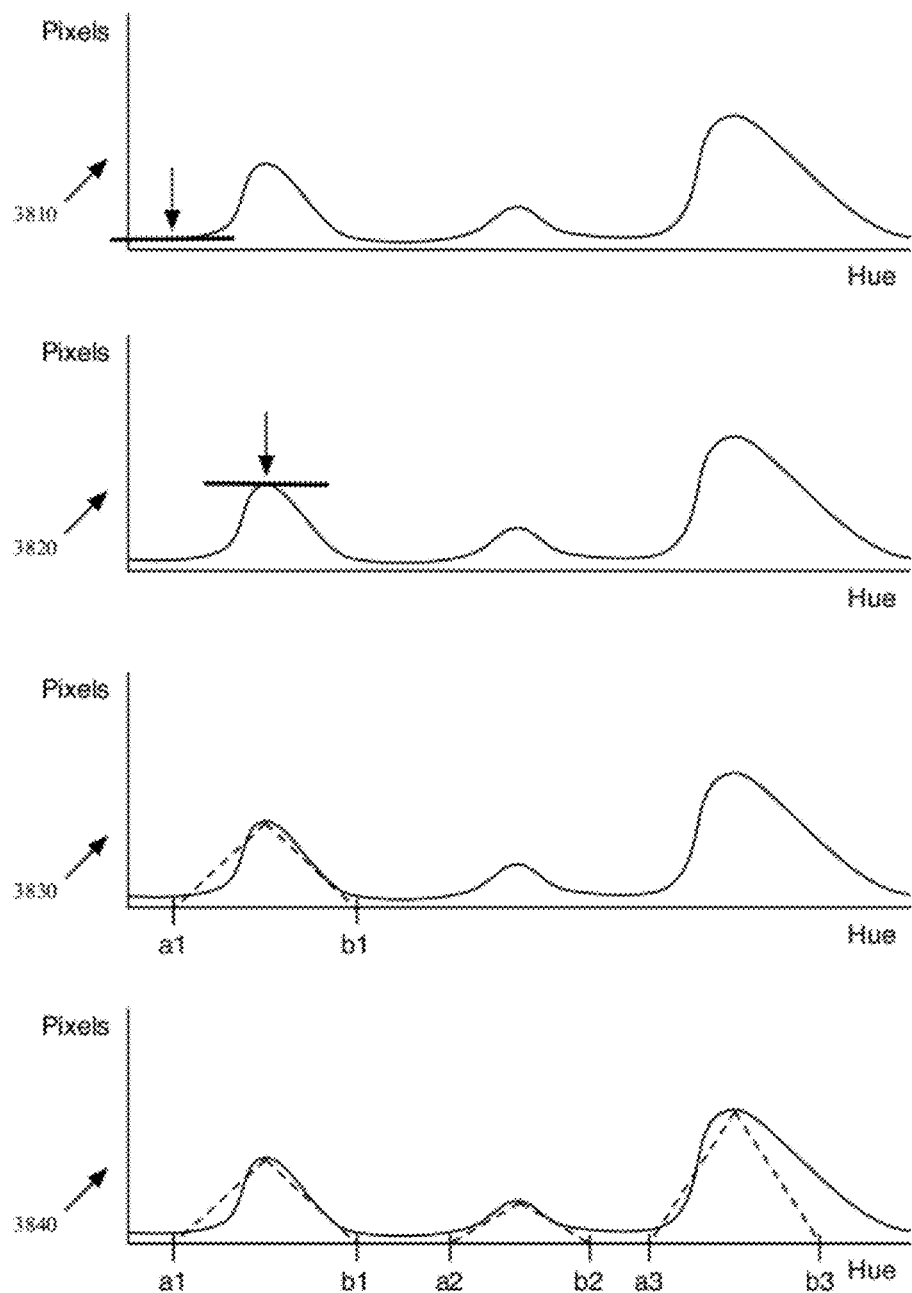
FIG. 38 illustrates examples of identifying dominant hue ranges in the histogram of the filtered distribution illustrated in FIG. 34.

As shown, FIG. 38 illustrates examples of identifying dominant hue ranges in an image based on the histogram 3410 at four different stages 3810-3840. The first stage 3810 illustrates a portion of the filtered distribution of the histogram 3410 where samples have been identified, as indicated by an arrow. In this stage, a line formed based on the samples is determined to be positive.

At 3740, the process 3700 identifies the boundary of a dominant hue range based on the samples. Some embodiments use the hue component value of one of the identified samples. Referring to FIG. 36 as an example, when the identified samples being processed are the distributions at hue component values H and H+1, some embodiments use the hue component value H as the boundary of the dominant hue range while other embodiments use the hue component value H+1 as the boundary of the dominant hue range. Referring back to the first stage 3810, the boundary of a dominant hue range (e.g., a hue component value) is identified near the location at which the arrow indicates.

Next, the process 3700 identifies (at 3750) samples of distributions of hue component values of an image. The operation 3750 is similar to the operation 3710 except the operation 3750 traverses the distribution of hue component values and identifies the next samples of distributions of hue component values. Referring to FIG. 36, when the operations 3710 identifies the distributions at hue component values H and H+1, then the operation 3750 of some embodiments identifies the distributions at hue component values H+1 and H+2.

The process 3700 then determines (at 3760) the slope of the line formed based on the values associated with the samples identified at operation 3750. Operation 3760 is the same or similar to the operation 3720 described above. At this operation, the process 3700 determines the slope of a line formed by the distribution values associated with the samples identified at operation 3750.

At 3770, the process 3700 determines whether the slope is flat. In some embodiments, the slope of the line is flat when the line has a slope of zero. In other embodiments, the slope is flat when the slope of the line is within a predefined threshold (e.g., −0.1 to 0.1). When the process 3700 determines that the slope of the line is not flat, the process 3700 returns to the operation 3750 to continue traversing the distribution of hue component values and identifying samples of distributions of hue component values until the slope of the line of samples is determined to be flat. Referring to FIG. 38, the second stage 3820 shows a portion of the filtered distribution of the histogram 3410 where the line formed by samples, indicated by an arrow, is flat.

When the process 3700 determines that the slope of the line is flat, the process 3700 identifies (at 3780) the middle of the dominant hue range. Similar to operation 3740, some embodiments of operation 3780 use the hue component value of one of the identified samples as the middle of the dominant hue range. Referring to FIG. 38, the second stage 3820 illustrates the middle of the dominant hue range (e.g., a hue component value) is identified near the location at which the arrow indicates.

After identifying the middle of the dominant hue range, the process 3700 determines (at 3790) the dominant hue range based on the determined boundary and middle. In some embodiments, the dominant hue range is determined by determining the distance between the middle and the identified boundary (e.g., the left length) and then identifying the hue component level that is the same distance from the middle in the opposite direction in order to identify the other boundary of the dominant hue range. Referring to FIG. 38, the third stage 3830 illustrates a dominant hue range determined based on the boundary of the dominant hue range determined in the first stage 3810 and the middle of the dominant hue range determined in the second stage 3820. As shown, the third stage 3830 also illustrates a dashed triangle by sides extending from distribution of the middle of the hue region to the bottom of distributions of the boundaries a1 and b1. As such, the distances from hue component value of the middle of the hue region to the hue component value of the boundary a1 and the hue component value of the boundary b1 are approximately the same.

Finally, the process 3700 determines (at 3795) whether any samples are left to process. When the process 3700 determines that there are samples left to process, the process 3700 return to operation 37010 to traverses the distribution of hue component values and identify additional dominant hue ranges in the distribution of hue component values in the image. When the process 3700 determines that there are samples left to process, the process 3700 ends.

The fourth stage 380 illustrated in FIG. 38 shows the histogram 3410 after the process 3800 has identified dominant hue ranges. As shown, the identified dominant hue ranges have boundaries of a1 and b1, a2 and b2, and a3 and b3. A dashed triangle is illustrated in a similar fashion as described above by reference to the third stage 3830 for each of the dominant hue ranges.

While FIG. 37 illustrates determining a dominant hue range by determining the distance from a boundary to the middle of the hue range (e.g., the left length), some embodiments determine the dominant hue range by further determining the distance from the middle of the hue range to the other boundary of the hue range (e.g., the right length). For example, in such embodiments, the process 3700 continues to process samples along the distribution of hue component values until the slope of line formed by the samples transitions from negative to flat.

Referring to FIG. 38 as an example, the process 3700 in these embodiments processes the samples of the distribution of hue component values after the middle of the hue range is identified in the second stage 3820 to determine the distance from the middle of the hue range to the boundary on the right side of the hue range where the slope of line formed by the samples transitions from negative to flat. Some embodiments determine the hue range by determining the distance between the middle and the other identified boundary (e.g., the right length) and then identify the hue component level that is the same distance from the middle in the opposite direction in order to identify the other boundary of the dominant hue range. Other embodiments determine the hue range differently. For instance, the process 3700 of some of these embodiments averages the identified distances (e.g., the left length and the right length) while the process 3700 of other of these embodiments use a percentage of the averaged distances (e.g., 60 percent, 70 percent, 80 percent, etc.)

In some embodiments, the hue ranges identified by the process 3800 are further processed in order to filter out hue ranges that have a peak distribution of hue component values that is not greater than a predefined threshold. FIG. 39 illustrates an example of such filtering of dominant hue ranges based on an example predefined threshold. This figure shows the histogram 3910 illustrated in the fourth stage 3840 of FIG. 38 with a bolded line representing a predefined threshold in terms of a number of pixels. As shown, the peak (e.g., top) of the hue range with boundaries a1 and b1 is higher than the bolded line. As such, this hue range has a peak distribution of hue component values that is greater than the predefined threshold in this example. Similarly, the hue range with boundaries a3 and b3 has a peak distribution of hue component values that is greater than the predefined threshold. However, the peak of the hue range with boundaries a2 and b2 is not higher than the bolded line, as illustrated in FIG. 39. Thus, this hue range has a peak distribution of hue component values that is not greater than the predefined threshold and is filtered out. Histogram 3920 illustrates the histogram 3910 after filtering out hue ranges that have a peak distribution of hue component values that is not greater than the predefined threshold represented by the bolded line. While the example illustrated in FIG. 39 illustrates one predefined threshold, different embodiments define different values (e.g., a threshold number of pixels) for the predefined threshold.

iii. Identifying Matching Dominant Hues

After dominant hue ranges in the target image and the source image are identified, some embodiments identify matching dominant hues in the images, as noted above. In some embodiment matching dominant hues are hues in the target image that are determined to be similar to dominant hues in the source image. FIG. 40 conceptually illustrates a process 4000 of some embodiments for identifying dominant hue ranges in the source image that match dominant hue ranges in the target image. As mentioned above, the process 4000 is performed by the process 3200 of some embodiments (e.g., at the operation 3250).

Figure 41:
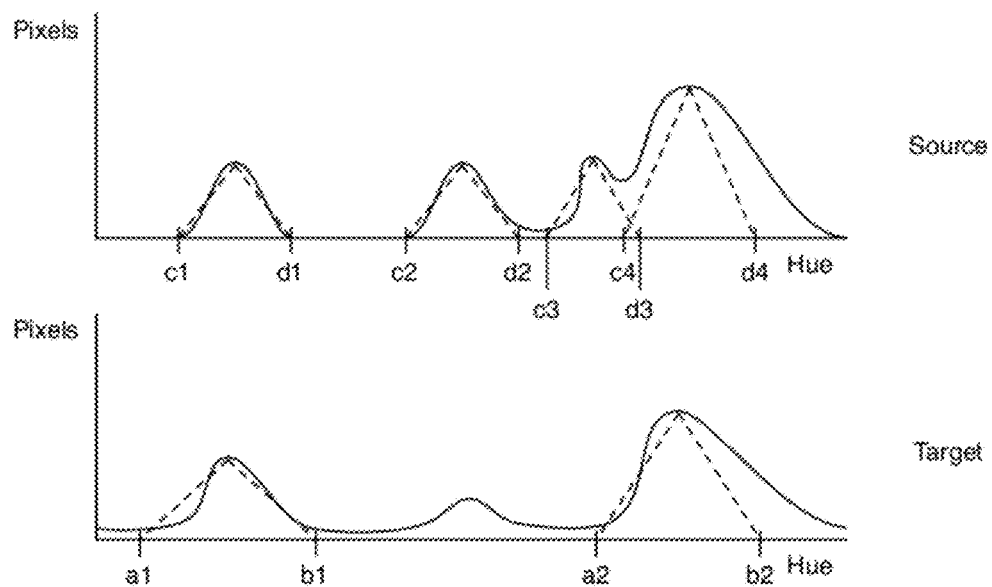
FIG. 41 illustrates an example of dominant hue ranges in a target image and a source image.
Figure 42:
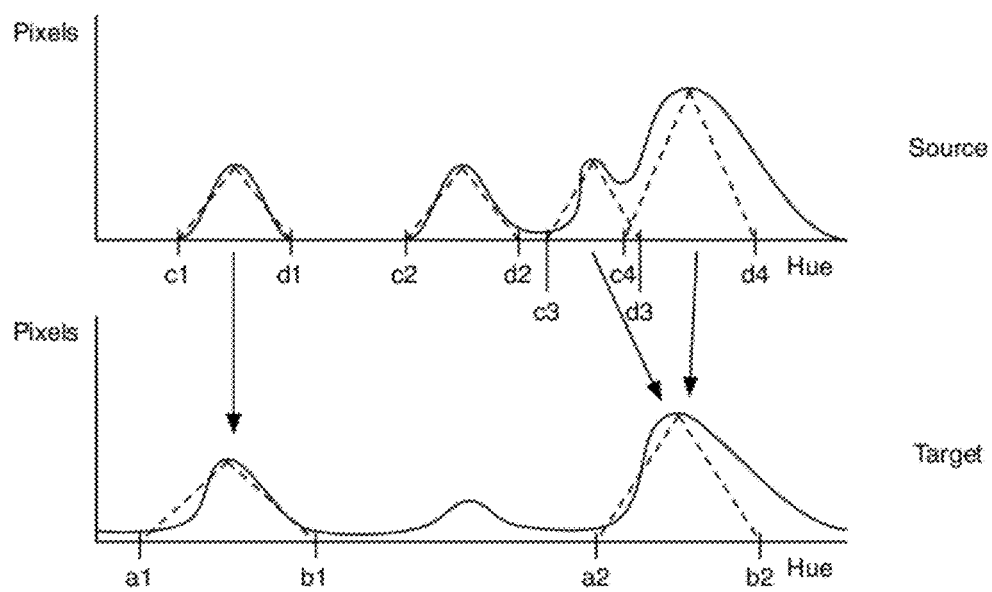
FIG. 42 illustrates a dominant hue range in a target image that is determined to be the most similar hue range of a dominant hue ranges in a source image, for each dominant hue range in the source image.
Figure 43:
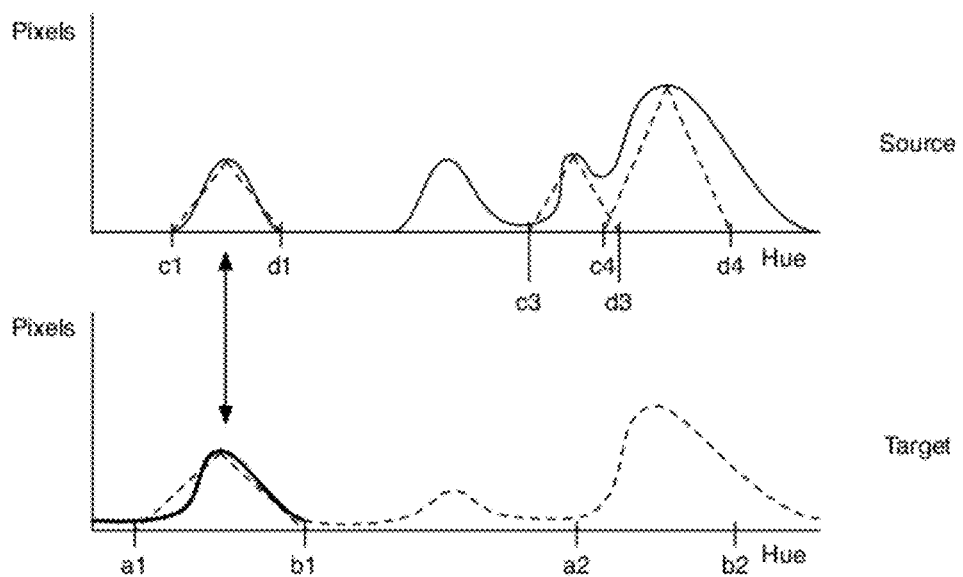
FIG. 43 illustrates an example of identifying a dominant hue range in a target image that matches a dominant hue range in a source image.
Figure 44:
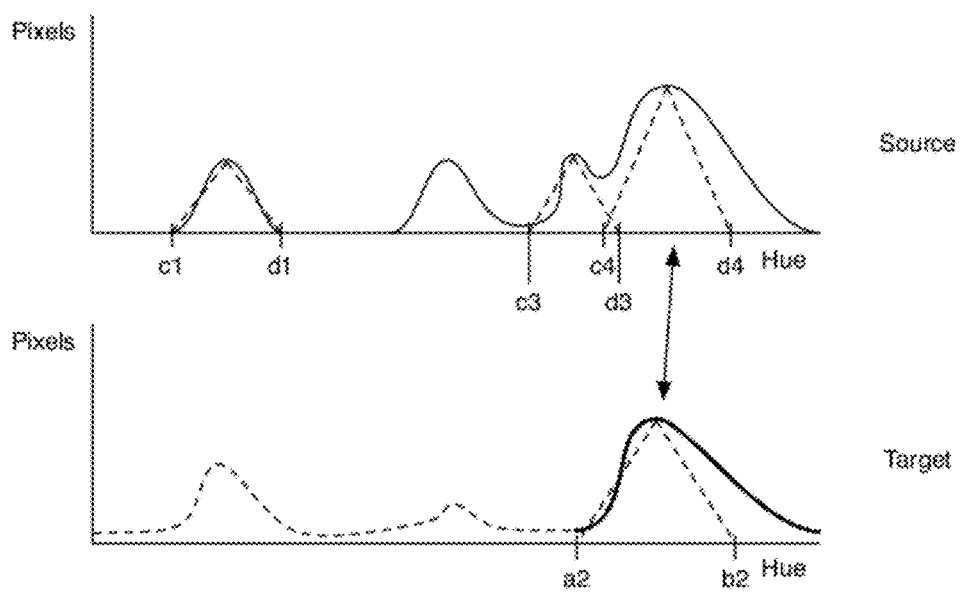
FIG. 44 illustrates another example of identifying a dominant hue range in a target image that matches a dominant hue range in a source image.
Figure 45:
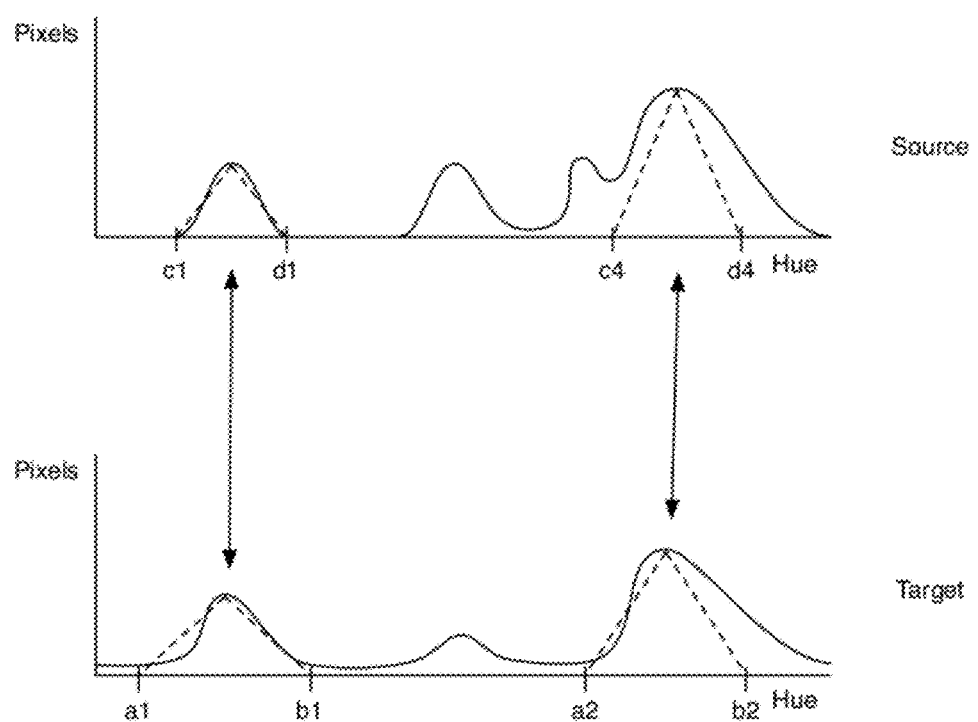
FIG. 45 illustrates an example of matching dominant hues in a target image and a source image that are identified by the process illustrated in FIG. 40 according to some embodiments of the invention.

The process 4000 will be described by reference to FIGS. 41-44, which illustrate several examples of identifying dominant hue ranges in the target image with dominant hue ranges in the source image. FIG. 41 illustrates an example of dominant hue ranges in a target image and in a source image. In particular, FIG. 41 illustrates four dominant hue ranges in a source image that are identified in some embodiments (e.g., by the processes illustrated by reference to FIGS. 38 and 39). This figure also shows the dominant hue ranges illustrated in FIG. 39 as dominant hue ranges of a target image. FIG. 42 illustrates the most similar dominant hue range in a target image of each dominant hue range in a source image. FIGS. 43 and 44 illustrate examples of identifying a dominant hue range in the source image that matches a dominant hue range in a target image. FIG. 45 illustrates an example of matching dominant hues in the target image and the source image that are identified by the process 4000.

Figure 46:
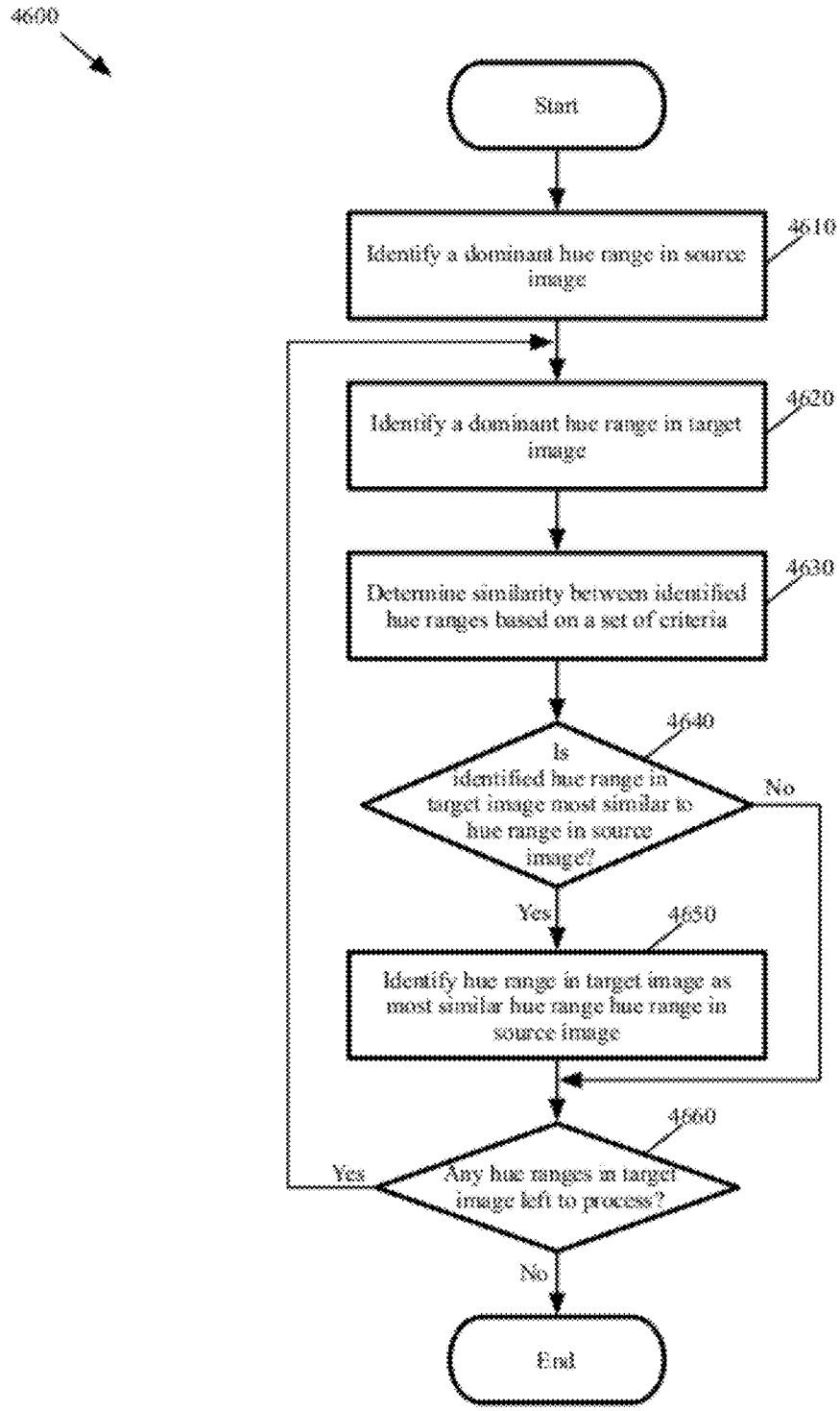
FIG. 46 conceptually illustrates a process of some embodiments for determining the similarity between a hue range in the target image and a hue range in the source image.

The process 4000 begins by determining (at 4010) the most similar unmatched dominant hue range in the target image for each unmatched dominant hue range in the source image. In some embodiments, when the process 4000 first begins, all the dominant hue ranges in the target image and source image are unmatched hue ranges. As noted above, some embodiments determine the similarity between a dominant hue range in the target image with a dominant hue range in the source image based on several criteria. For instance, some of these embodiments consider the peak distributions of pixels of the hue ranges (e.g., the height of the hue ranges), the number of different hue component values in the hue ranges (e.g., the width of hue ranges), and the amount of hue component values that the dominant hue ranges share (i.e., the intersection of the hue ranges). FIG. 46, which will be described in more detail below, conceptually illustrates a process of some embodiments for determining the similarity between a hue range in the target image and a hue range in the source image based on such criteria.

FIG. 42 illustrates an example of hue ranges in the target image illustrated in FIG. 41 that are determined (e.g., by the process described below by reference to FIG. 46) to be the most similar hue range of each dominant hue range in the source image illustrated in FIG. 41. As indicated by an arrow, the hue range in the target image with the range a1-b1 is determined as the most similar hue range of the hue range in the source image with the range c1-d1. In addition, the hue range in the target image with the range a2-b2 is determined as the most similar hue range of both the hue range in the source image with the range c3-d3 and the hue range in the source image with the range c4-d4, which are also indicated by arrows.

In some cases, none of the unmatched dominant hue ranges in the target image are determined to be similar to an unmatched dominant hue range in the source image. In such cases, the unmatched dominant hue range in the source image is not considered for the remainder of the process 4000. Referring to FIG. 42 as an example, none of the dominant hue ranges in the target image are determined (e.g., by the process described below by reference to FIG. 46) to be similar to the dominant hue range in the source image with the range c2-d2. For this example, this dominant hue range in the source image is not considered for the remainder of the process 4000.

Next, the process 4000 identifies (at 4020) an unmatched hue range in the target image. The process 4000 then determines (at 4030) whether the identified hue range in the target image is determined (at 4010) as the most similar hue range of any hue range in the source image. When the process 4000 determines that the identified hue range is not determined as the most similar hue range of any hue range in the source image, the process 4000 proceeds to operation 4070. Otherwise, the process 4000 continues to operation 4040.

At 4040, the process 4000 determines whether the identified hue range in the target image is determined (e.g., at 4010) as the most similar hue range of more than one hue range in the source image. When the process 4000 determines that the identified hue range in the target image is determined as the most similar hue range of one hue range in the source image, the process 4000 then matches (at 4050) the identified hue range in the target image with the hue range in the source image. After the identified hue range in the target image and the hue range in the source image are matched, they are not considered for the remainder of the process 4000.

FIG. 43 illustrates an example of an unmatched dominant hue range in the target image illustrated in FIG. 41 that is determined as the most similar hue range of one unmatched dominant hue range in the source image illustrated in FIG. 41. In this example, the hue range in the target image with the range a1-b1 is determined (e.g., by the process described below by reference to FIG. 46) as the most similar hue range of just the hue range in the source image with the range c1-d1. Therefore, these hue ranges in the target image and the source image are matched, as indicated by a two-way arrow, and then no longer considered.

When the process 4000 determines that the identified hue range in the target image is determined (e.g., at 4010) as the most similar hue range of more than one hue range in the source image, the process 4000 proceeds to operation 4060 to resolve the conflict of the identified hue range in the target image being the most similar hue range of multiple unmatched hue ranges in the source image.

At 4060, the process 4000 matches the identified hue range in the target with the hue range in the source image that is determined as the most similar to the identified hue range in the target image. In other words, while the identified hue range in the target image is determined as the most similar hue range of each of the hue ranges in the source image, the process 4000 determines (at operation 4060) the hue range in the source image that is the most similar to the identified hue range in the target image and matches that hue range in the source image with the identified hue range in the target image. Since the other hue ranges in the source image are not matched with the identified hue range in the target image, they are still unmatched hue ranges in the source image.

FIG. 44 illustrates an example of an unmatched dominant hue range in the target image illustrated in FIG. 42 that is determined to be the most similar hue range of the two unmatched dominant hue ranges in the source image illustrated in FIG. 42. As shown in FIG. 42, the hue range in the target image with the range a2-b2 is determined (e.g., by the process described below by reference to FIG. 46) as the most similar hue range of the hue range in the source image with the range c3-d3 and the hue range in the source image with the range c4-d4. For this example, the hue range in the source image with the range c4-d4 is determined (e.g., by the process described below by reference to FIG. 46) as the most similar (i.e., more similar than the hue range in the source image with the range c3-d3) hue range of the hue range in the target image with the range a2-b2. Therefore, the hue range in the target image with the range a2-b2 and the hue range in the source image with the range c4-d4 are matched, as illustrated in FIG. 44, and then no longer considered. Since the hue range in the source image with the range c3-d3 is not matched with the hue range in the target image with the range a2-b2, it is still an unmatched hue range in the source image.

Next, the process 4000 determines (at 4070) whether any hue range in the target image is left to process. When the process 4000 determines that there is a hue range in the target image left to process, the process 4000 returns to the operation 4020 to identify matches for any remaining hue ranges in the target image. Otherwise, the process 4000 continues to operation 4080.

Finally, the process 4000 determines (at 4080) whether both the target image and source image have unmatched hue ranges left to process. When the process 4000 determines that both the target image and source image have unmatched hue ranges left to process, the process 4000 returns to the operation 4010 to continue processing these unmatched hue ranges in the target image and the source image until there are no more unmatched hue ranges in the target image or there are no more unmatched hue ranges in the source image. When the process 4000 determines that both the target image and source image do not have unmatched hue ranges left to process, the process 4000 ends.

FIG. 45 illustrates an example of matching dominant hues in the target image and the source image illustrated in FIG. 41 that are identified by the process 4000. As shown, the hue range in the target image with the range a1-b1 is identified as matching the hue range in the source image with the range c1-d1, and the hue range in the target image with the range a2-b2 is identified as matching the hue range in the source image with the range c4-d4.

As described with respect to the process 4000, some embodiments determine the similarity between hue ranges in a target image and hue ranges in a source image based on several criteria. The following FIG. 46 conceptually illustrates a process 4600 of some embodiments for determining the similarity between a hue range in the target image and a hue range in the source image. As mentioned above, the process 4600 is performed by the process 4000 of some embodiment (e.g., at the operation 4010).

The process 4600 starts by identifying (at 4610) a dominant hue range in the source image. The process 4600 then identifies (at 4620) a dominant hue range in the target image. In some embodiments, the identified hue range in the source image and the identified hue range in the target image are unmatched hue ranges in a process that identifies matching hue ranges (e.g., the process described above by reference to FIG. 40) based on the similarity between the hue ranges.

Next, the process 4600 determines (at 4630) the similarity between the identified hue ranges in the source image and the target image based on a set of criteria. For example, some embodiments take into account the peak distribution of pixels of the hue ranges. The peak distribution of pixels of a hue range is, in some embodiments, the largest distribution of pixels that have a particular hue component value in the hue range. In some embodiments, this is referred to as the height of the hue range. Referring to FIG. 41 as an example, the peaks of the dominant hue ranges in the target image and the source image are indicated by the top of the respective dashed triangles.

The following is an equation that some such embodiments use to determine the similarity between the heights of two hue ranges:

$$\text{height similarity} = 1 - \frac{|height_{src} - height_{tar}|}{height_{largest}} \quad (4)$$

where the $height_{src}$ is the height of the hue range in the source image, the $height_{tar}$ is the height of the hue range in the target image, and the $height_{largest}$ is the height of the greater of the two heights. Based on equation (4), the height similarity is equivalent to 1 when the height of the hue ranges are the same, and the height similarity decreases to 0 as the difference between the hue ranges' heights increases.

As another example, some embodiments consider the number of hue component values in the hue ranges when determining the similarity between hue ranges. That is, these embodiments consider the range of hue component values of the hue ranges. In some embodiments, this is referred to as the width of the hue range. Referring again to FIG. 41 as an example, the range of hue component values of the dominant hue ranges in the target image and the source image are indicated by the vertical indicators and labels along the x-axes (e.g., c1-d1, c2-d2, a1-b1, etc.).

The following is an equation that some such embodiments use to determine the similarity between the widths of two hue ranges:

$$\text{width similarity} = 1 - \frac{|width_{src} - width_{tar}|}{width_{largest}} \quad (5)$$

where the $width_{src}$ is the width of the hue range in the source image, the $width_{tar}$ is the width of the hue range in the target image, and the $width_{largest}$ is the width of the greater of the two widths. According to equation (5), the width similarity is equivalent to 1 when the width of the hue ranges are the same, and the width similarity decreases to 0 as the difference between the hue ranges' widths increases.

Figure 47:
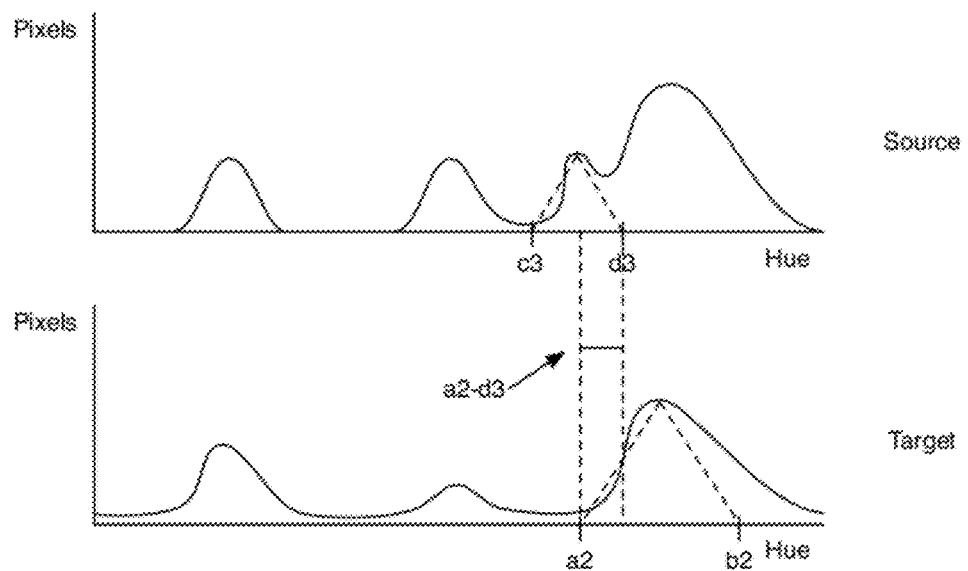
FIG. 47 illustrates an example an intersection between hue ranges.

As yet another example, some embodiments base the determination of the similarity between hue ranges on the amount of hue component values that the dominant hue ranges share. In some embodiments, this is referred to as the intersection between the hue ranges. FIG. 47 illustrates an example intersection between hue ranges. As illustrated in this figure, the intersection between the hue range in the source image with the range c3-d3 and the hue range in the target image with the range a2-b2 is the range of hue component values form a2 to d3 as indicated by the arrow.

The following equation is an equation that some such embodiments use to determine the similarity between the intersection of two hue ranges:

$$\text{intersection similarity} = \frac{|\text{intersection width}|}{width_{smallest}} \quad (6)$$

where the intersection width is the width of the intersection between the hue ranges, and the $width_{smallest}$ is the width of the smaller of the hue ranges' widths. Based on equation (6), the intersection similarity is equivalent to 1 when the intersection width of the hue ranges is the same as the width of the smaller of the hue ranges' widths, and the intersection similarity decreases to 0 as the intersection width between the hue ranges' widths decreases. In addition, some embodiments determine hue ranges as not similar when the intersection similarity is 0. That is, the hue ranges do not share any hue component values.

In determining the similarity between hue ranges based on a set of criteria, some embodiments apply weights to the different criteria. Using the criteria described above (i.e., height, width, and intersection of hue ranges) as an example, some such embodiments may apply equal weighting to such criteria. As such, the height similarity has a weight of 1, the width similarity has a weight of 1, and the intersection similarity has a weight of 1. However, other such embodiments may apply different weight amounts to the different criteria.

Furthermore, some embodiments apply a predefined similarity threshold when determining the similarity between hue ranges. In such embodiments, hue ranges are determined as not similar when a similarity value that represents the similarity between hue ranges that does not pass the predefined similarity threshold. For example, using the equations (4)-(6) for the criteria described above and an equal weighting of 1 for each criteria, the similarity between hue ranges is represented by a value ranging from 0-3. When a value of 1.2 is defined as the similarity threshold, hue ranges that have a similarity value less than 1.2 are determined as not similar. Other embodiments may use different ranges of similarity values and different similarity thresholds.

Returning to FIG. 46, the process 4600 then determines (at 4640) whether the identified hue range in the target image is the most similar hue range of the hue range in the source image. When process 4600 determines that the hue range in the target image is the most similar hue range of the hue range in the source image, the process 4600 identifies (at 4650) the hue range in the target image as the most similar hue range of the hue range in the source image. Otherwise, the process 4600 proceeds to operation 4660.

At 4660, the process 4600 determines whether any hue range in the target image is left to process. When the process 4600 determines that there is a hue range in the target image left to process, the process 4600 returns to the operation 4620 to determine the hue range in the target image that is the most similar hue range of the hue range in the source image. When the process 4600 determines that there is no hue range in the target image left to process, the process 4600 ends.

Figure 48:
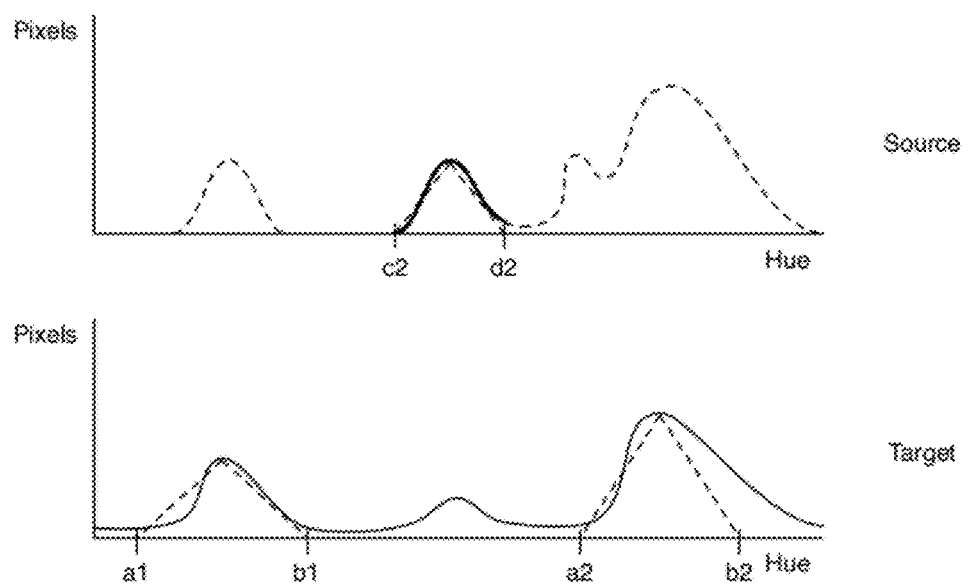
FIG. 48 illustrates an example of a dominant hue range in a source image that is not similar to any dominant hue range in a source image.

In some cases, the process 4600 determines that none of the unmatched dominant hue ranges in the target image are similar to an unmatched dominant hue range in the source image. FIG. 48 illustrates an example of such a dominant hue range in the source image. Specifically, FIG. 48 illustrates a dominant hue range in the source image illustrated in FIG. 41 that is not similar to any dominant hue range in the target image illustrated in FIG. 41. In this example, none of the dominant hue ranges in the target image are determined to be similar to the dominant hue range in the source image with the range c2-d2 because this hue range in the source image does not intersect with any of the hue ranges in the target image.

While FIG. 46 illustrates a process for determining the similarity between a hue range in the target image and a hue range in the source image based on the peak distributions of pixels of the hue ranges, the number of different hue component values in the hue ranges, and the amount of hue component values that the dominant hue ranges share, other embodiments may determine the similarity between the hue ranges based on different and/or additional criteria. For instance, some of these embodiments may determine the similarity between the hue ranges based on the width and height ratio of the hue ranges, the total of the distribution of pixels in the hue ranges (e.g., the integral of or the area under the distribution curve), etc.

iv. Determining Transforms

Figure 49:
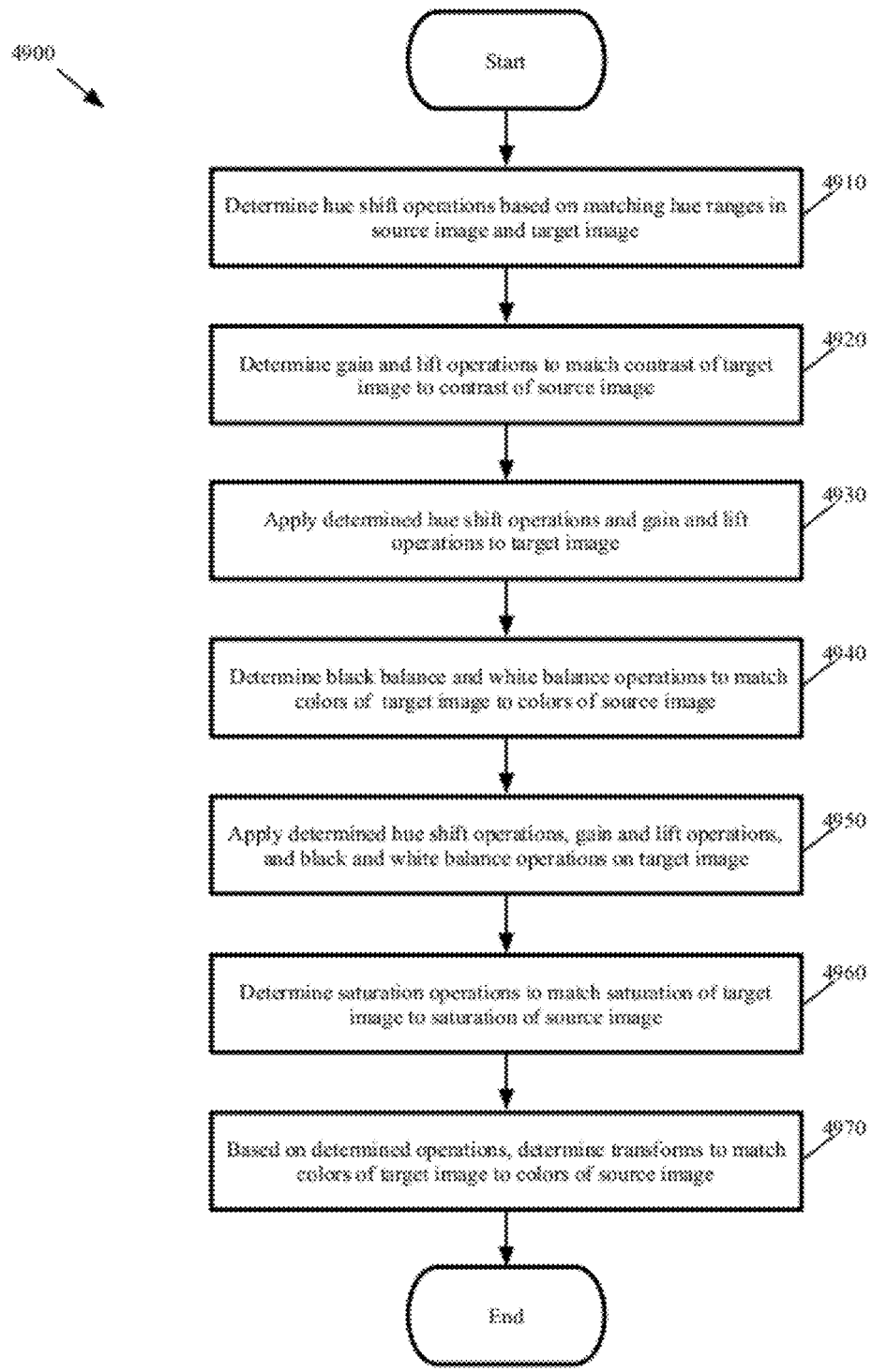
FIG. 49 conceptually illustrates a process of some embodiments for determining transforms for matching dominant hues of a target image to dominant hues of a source image.

After matching hue ranges in the target image and the source image are identified, some embodiments determine a set of transforms for matching the colors of the target image to the colors of the source image based on the identified matching hue ranges in the images. For instance, some embodiments match the colors of pixels in the target image that are within a dominant hue to the colors of pixels in the source image that are within the corresponding matching dominant hue. FIG. 49 conceptually illustrates a process 4900 of some embodiments for determining such transforms.

The process 4900 starts by determining (at 4910) hue shift operations based on the identified matching hue ranges in the target image and the source image. In some embodiments, the hue shift operations shift the hue ranges in the target image to align with the corresponding hue ranges in the source image. In some of these embodiments, for each pair of matching hue ranges in the target image and source image, a hue shift operation is determined that shifts the middle of a hue range in the target image to line up with the middle of the hue range in the source image.

Next, the process 4900 determines (at 4920) gain and lift operations to match the contrast of the target image to the contrast of the source image. In some embodiments, this operation is similar to the process 2000 described above by reference to FIG. 20 except the boundary luma levels of the hue ranges are used to determine the gain and lift operations. That is, for the pixels in the target image that fall in a particular hue range, the lowest luma level and the highest luma level of such pixels are used.

The operation 4930 is similar to the operation 1620 described above by reference to FIG. 16, but the operation 4930 also applies the determine hue shift operations in addition to the determined gain and lift operations to the target image.

The process 4900 next determines (at 4940) black balance and white balance operations to match the colors of the target image to the colors of the source image. The operation 4940 is similar to the process 2300 described above by reference to FIG. 23, but the operation 4940 determines the black balance and white balance operations based on the CbCr distributions of pixels at the lowest luma level and highest luma levels of each hue range in the target image and the corresponding hue ranges in the source image. In other words, the black balance and white balance operations match the average CbCr component values of the distributions at the lowest luma level of each hue range in the target image to the average CbCr component values of the distributions at the lowest luma level of the corresponding hue range in the source image. In addition, the average CbCr component values of the distributions at the highest luma level of each hue range in the target image are matched to the average CbCr component values of the distributions at the highest luma level of the corresponding hue range in the source image.

After determining the black balance and white balance operations, the process 4900 performs operation 4950. This operation is similar to the operation 1640 described above by reference to FIG. 16, except the determined hue shift operations are applied to the target image as well as the determined gain and lift operations and the determined black balance and white balance operations.

The process 4900 determines (at 4960) the saturation operations in the same manner as the process 2600 described above by reference to FIG. 26, but instead of determining the saturation operations based on luma ranges, the process 4900 of some embodiments determines the saturation operations based on the matching hue ranges in the target image and the source image. Therefore, these embodiments match the saturation of each hue range in the target image to the saturation of the corresponding hue range in the source image.

Finally, the process 4900 determines (at 4970) transforms to match colors of target image to colors of source image based on the determined hue shift operations, gain and lift operations, black balance and white balance operations, and saturation operation. Some embodiments of the process 4900 determine a set of transforms for each matching pair of hue ranges in the target image and the source image. Thus, the colors of each hue range in the target image are matched to the colors of the corresponding hue range in the source image.

Although the FIG. 49 illustrates a process that determines black balance and white balance operations to match the colors of the target image to the colors of the source image and determines transforms based on the black balance and white balance operations, some embodiments do not determine the transforms based on the black balance and white balance operations. In such embodiments, the process 4900 does not perform operation 4940 and accordingly does not apply black balance and white balance operations to the target image at operation 4950.

Some embodiments use a transformation matrix to represent the set of transforms (e.g., the determined operations) determined for each hue range in the target image. Thus, the determined operations for each hue range are incorporated into a transformation matrix to match the color of pixels in the hue ranges in the target image to the colors of pixels in the corresponding hue ranges in the source image. Furthermore, different embodiments define different transformation matrices with different dimensions to represent the set of transforms for a matching pair of hue range. For instance, some such embodiments define a 3×4 transformation matrix to represent the set of transforms for a luma range. Other such embodiments define a transformation matrix with different dimensions to represent the set of transforms for a luma range.

Furthermore, some embodiments associate a transformation matrix with each hue level of the target image. For instance, some of these embodiments define the pixels in the target image (and the source image) to represent 256 different hue levels. Therefore, these embodiments associated a transformation matrix with each of the 256 hue levels. As mentioned, some embodiments determine a set of transforms for each hue range in the target image. In some such embodiments, the transformation matrices associated with hue levels in a hue range are the same (i.e., have the same values).

To smooth out any sharp transitions among the transformation matrices, some embodiments of the process 4900 also perform a blending operation on the transformation matrices similar to the one describe above by reference to FIG. 28. In these embodiments, the process 2300 blends the transformation matrices on a hue level basis. For instance, in the embodiments that define pixels in the target image to represent 256 different hue levels, the process 2300 averages the values of the transformation matrix of each hue level with the values of the transformation matrices of its neighboring hue levels.

B. Matching Colors of Images

After determining transforms for matching the colors of a target image to the colors of a source image, some embodiments apply the transforms to the target image in order to match the colors of the target image to the colors of the source image. FIG. 50 conceptually illustrates a process 5000 of some embodiments for applying transforms to a target image to match the colors of the target image to the colors of the source image. As noted above, the process 5000 is performed by the process 600 of some embodiment (e.g., at the operation 650). The process 5000 is similar to the process 3000 describe above by reference to FIG. 30, but the process 5000 applies transforms to only pixels in the target image that have a hue component value within a dominant hue range in the target image.

The process 5000 starts the same way as the process 3000. Operation 5010 is the same as the operation 3010 described above. At this operation, the process 5000 identifies a pixel in the target image. The process 5000 then determines (at 5020) the hue component value of the pixel. As mentioned above, some embodiments determine the hue component value of the pixel by converting the target image to a color space that uses a hue component to represent pixels (e.g., a HSL, HLS, or HSB color space) while other embodiments determine the pixel's hue component value by applying a transform or equation to the pixel.

Next, the process 5000 determines (at 5030) whether the hue component value of the pixel is a value within a dominant hue range in the target image (e.g., identified by the process 3200 described above). When the process 5000 determines that the hue component value of the pixel is a value within a dominant hue range in the target image, the process 5000 proceeds to operation 5040.

Operation 5040 is similar to the operation 3030 described above by reference to FIG. 30, but instead of identifying a transformation matrix associated with the pixel's luma component value, the process 5000 identifies a transformation matrix associated with the pixels' hue component value.

Operations 5050 and 5060 are the same as the corresponding operations 3040 and 3050 as described above by reference to FIG. 30. At these operations, the process 5000 applies the identified transformation matrix to the pixel and determines whether any pixel in the target image is left to process. When the process 5000 determines that there is a pixel in the target image left to process, the process 5000 returns to the operation 5010 to continue processing the remaining pixels in the target image. Otherwise, the process 5000 ends. After the process 5000 ends, the dominant hues of the target image are matched to corresponding dominant hues of the source image.

III. Color Matching Using Color Segmentation

In addition to matching colors of a target image to colors of a source image based on the images' luma or the images' hues, some embodiments match the colors of the images by using a color segmentation technique. As noted above, the color segmentation technique of some embodiments identifies a set of color ranges (e.g., color segments or segmented colors) in the target image and identifies the set of color ranges in the source image. Based on the segmented colors, the set of colors of the target image are matched to the set of colors of the source image in some embodiments.

Figure 51:
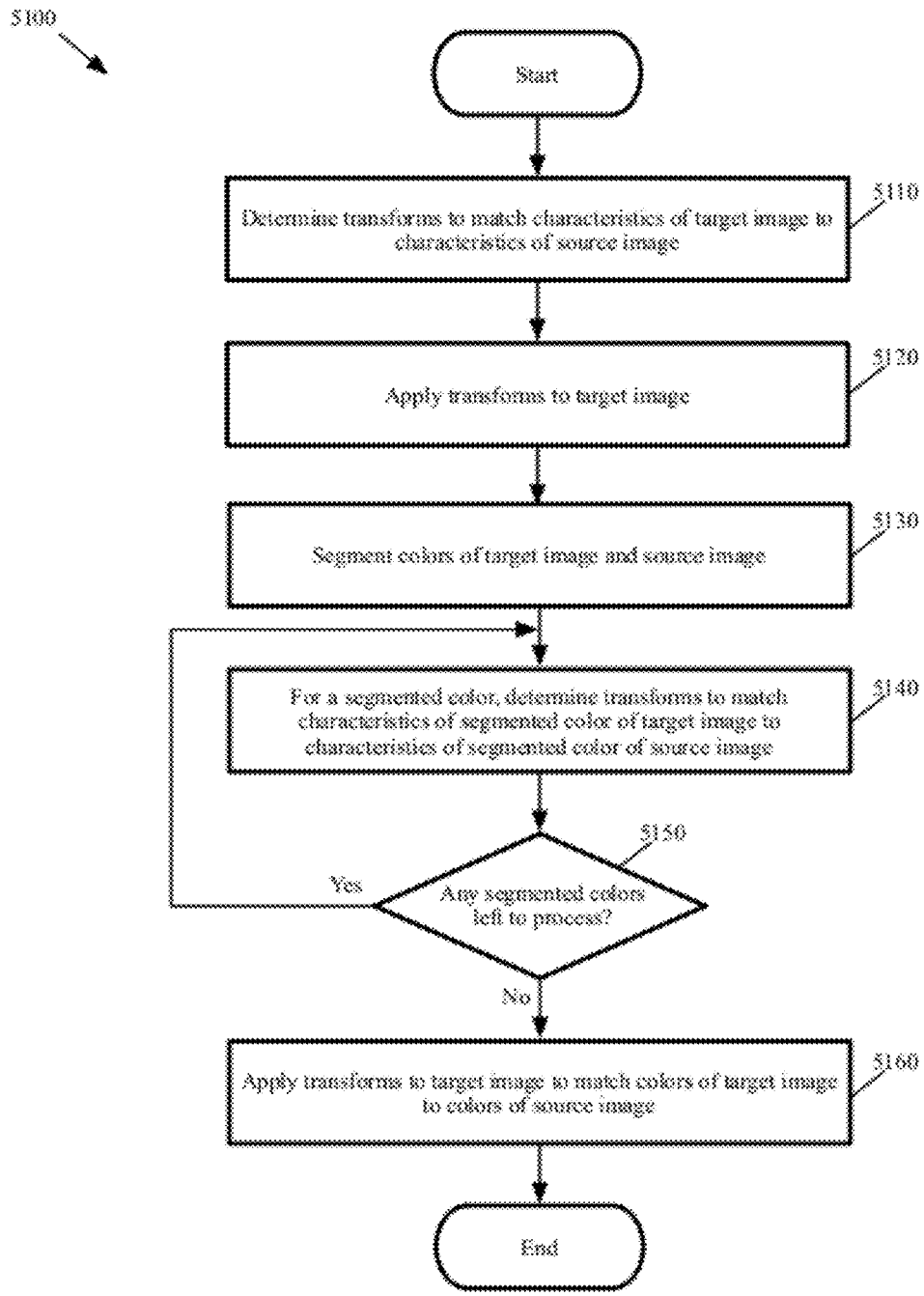
FIG. 51 conceptually illustrates a process of some embodiments for matching colors of a target image to colors of a source image by segmenting the colors of the images.

FIG. 51 conceptually illustrates a process 5100 of some embodiments for matching colors of a target image to colors of a source image by segmenting the colors of the images. The process 5100 is similar in many ways to the process 700, described above by reference to FIG. 7, but the process 1600 includes additional operations. The process 5100 starts in the same manner as the process 700. Operation 5110 is the same as described above for operation 710. At this operation, the process 5100 determines a set of transforms to match characteristics of the target image to the set of characteristics of the source image. As mentioned above, different embodiments of these transforms match different combinations of characteristics of the images, such as the average color of the image, the average color of dark portions of the image, the average color of bright portions of the image, the average saturation of the image, the contrast of the image. In some embodiments, these transforms are represented by a transformation matrix. An example of a process for determining such a set of transforms is described below by reference to FIG. 52.

Next, the process 5100 applies (at 5120) the transforms to the target image to match the set of characteristics of the target image to the set of characteristics of the source image. As mentioned, the transforms are represented by a transformation matrix in some embodiments. In some such embodiments, the process 5100 applies the transforms to the target image by applying the transformation matrix to the each of the pixels in the target image.

Figure 54:
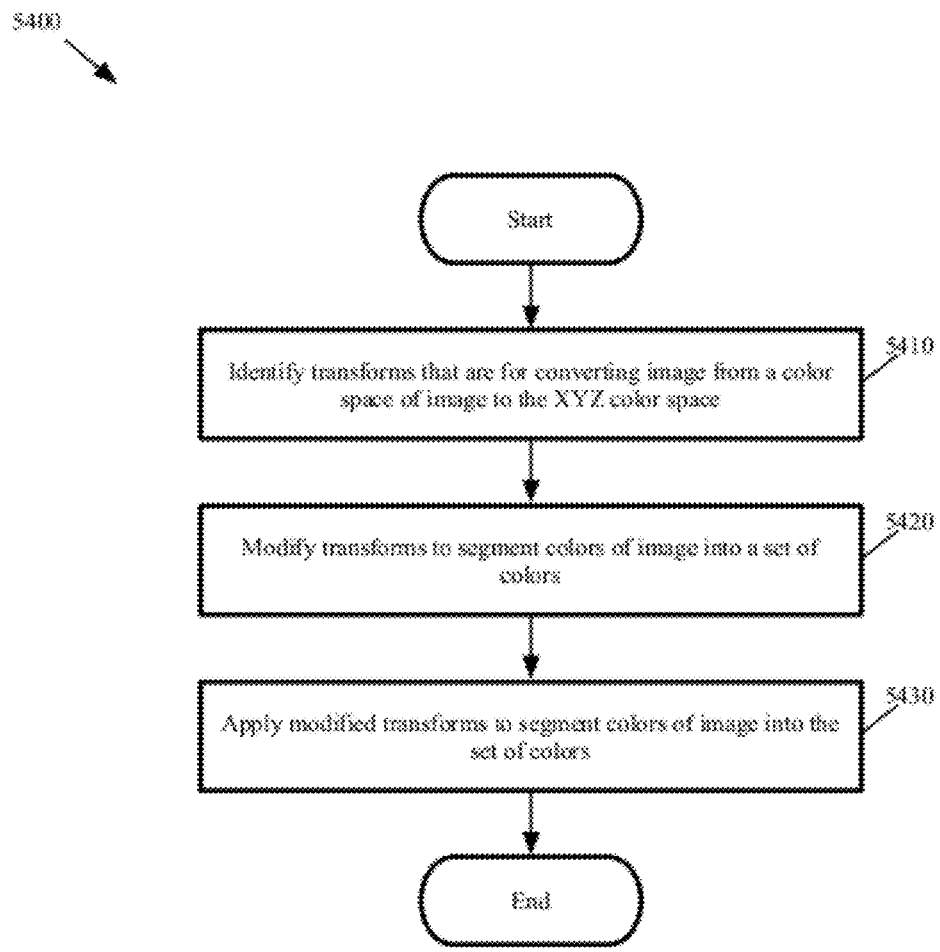
FIG. 54 conceptually illustrates a process of some embodiments for segmenting the colors of an image into a set of colors.

After the set of characteristics of the target image have been matched to the set of characteristics of the source image, the process 5100 segments (at 5130) the colors of the target image and the colors of the source image. Some embodiments segment colors of an image by converting the image to a color space that is optimized for identifying colors in the images. FIG. 54, which is described in more detail below, conceptually illustrates a process of some embodiments for segmenting colors of an image by converting the image to such a color space.

Figure 52:
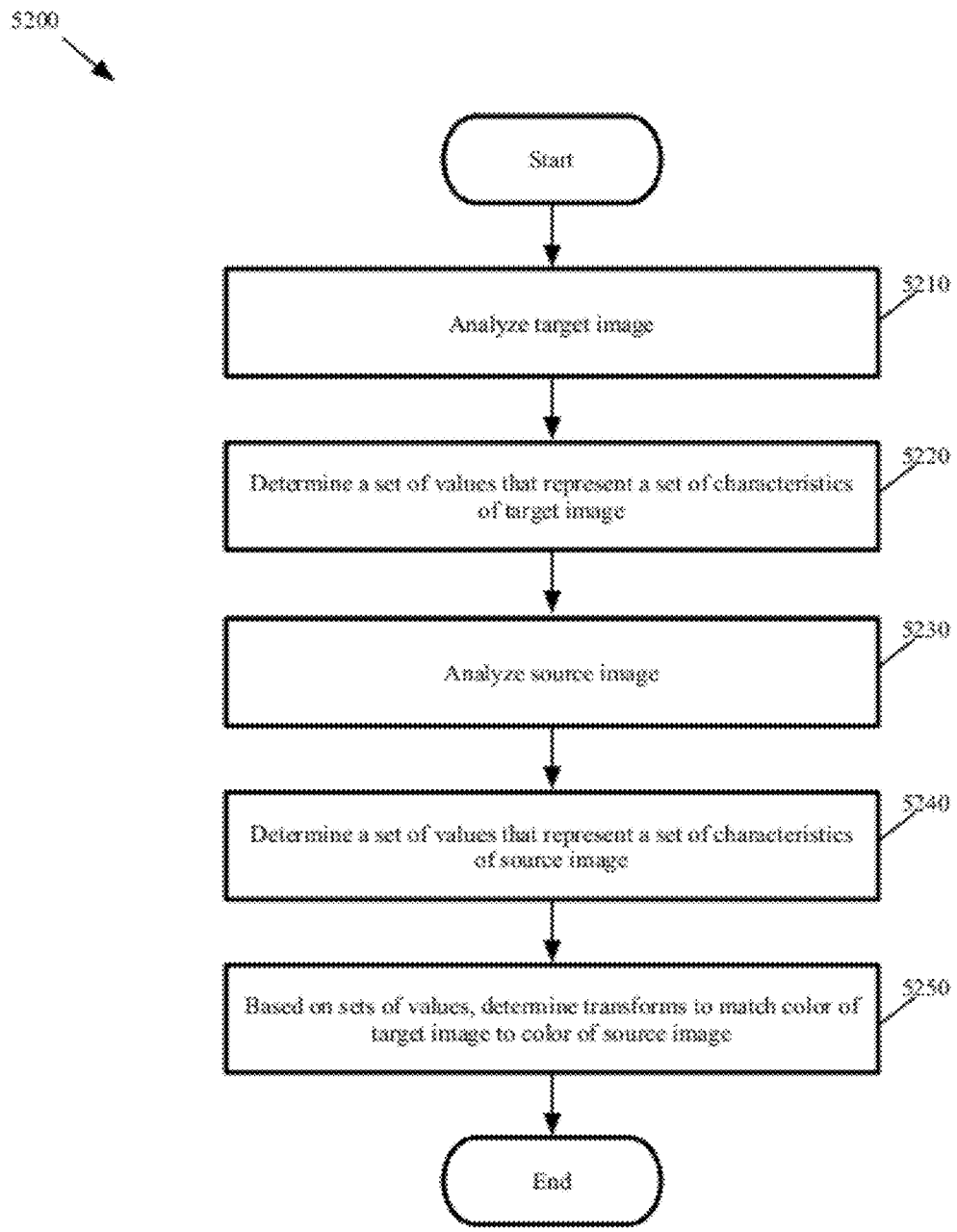
FIG. 52 conceptually illustrates a process of some embodiments for determining transforms to match characteristics of a target image to characteristics of a source image.

Next, the process 5100 determines (at 5140) a set of transforms to match characteristics of a segmented color of the target image to characteristics of the segmented color in the source image. As mentioned above, different embodiments of these transforms match different combinations of characteristics of the segmented color of the images, such as the average color of the segmented color in the image, the average color of dark portions of the segmented color in the image, the average color of bright portions of the segmented color in the image, the average saturation of the segmented color in the image, the contrast of the segmented color in the image. Some embodiments use a transformation matrix to represent the set of transforms. In some embodiments, the process described below by reference to FIG. 52 is used to determine the set of transforms.

The process 5100 then determines (at 5150) whether any segmented color is left to process. When the process 5100 determines that there is a segmented color left to process, the process 5100 returns to the operation 5140 to continue processing any remaining segmented colors.

When the process 5100 determines that there is no segmented color left to process, the process 5100 applies (at 5160) the transforms to the target image to match the colors of the target image to the colors of the source image. As noted above, the transforms are represented by a transformation matrix. Some such embodiments apply the transforms to the target image by applying the transforms to each pixel in the target image. As described in more detail below, FIG. 59 conceptually illustrates a process of some embodiments for applying the transforms to the target image in such manner. After applying the transforms to the target image, the process 5100 ends.

A. Determining Transforms

As mentioned above, some embodiments determine transforms to match characteristics of an image (e.g., a target image) to characteristics another image (e.g., a source image). For instance, the process 5100 illustrated in FIG. 51 describes determining transforms for matching a set of characteristics of a target image to the set of characteristics of a source image and transforms for matching characteristics of a segment color in the target image to characteristics of the corresponding segmented color in the source image. The following FIG. 52 illustrates an example of a process that determines such transforms. In particular, FIG. 52 conceptually illustrates a process 5200 of some embodiments for determining a set of transforms to match characteristics of a target image to characteristics of a source image. As noted above, the process 5200 is performed by the process 5100 of some embodiment (e.g., at the operation 5110 and/or the operation 5140).

The process 5200 begins by analyzing (at 5210) the target image. In some embodiments, the process 5200 analyzes the target image by identifying the values of components that define the pixels in the target image. For example, when the target image is defined in an RGB color space, the process 5200 identifies the red component value, the green component value, and the blue component value of the pixels. As another example, when the target image is defined in an HSL color space, the process 5200 identifies the hue component value, the saturation component value, and the luma (or lightness in some embodiments) component value of the pixels of the target image.

Next, the process 5200 determines (at 5220) a set of values that represent a set of characteristics of the target image. Different embodiments use different sets of characteristics of the target image. For example, the process 5200 of some embodiments determines a value that represents the average color of the pixels in the target image, the average color of dark pixels (e.g., shadows) in the target image, the average color of bright pixels (e.g., highlights) in the target image, the average saturation of pixels in the target image, the average contrast of pixels in the target image, and whether the target image is monochrome. In some embodiments, the target image is monochrome when each of the pixels in the target image has no saturation.

In some embodiments, multiple values are used to represent the average color of the pixels in the target image, the average color of dark pixels (e.g., shadows) in the target image, and the average color of bright pixels (e.g., highlights) in the target image. For instance, when the target image is defined in an RGB color space, three values are used to represents these characteristics: a value for the red component, a value for the green component, and a value for the blue component. As such, these embodiments use twelve values to represent the set of characteristics described above.

Some of these embodiments determine whether a pixel is a bright pixel and a dark pixel based on the value of the pixel's luminance. For instance, some of these embodiments determine that a pixel is a bright pixel when the value of the pixels' luminance passes a threshold luminance value. Similarly, some of these embodiments determine that a pixel is a dark pixel when the value of the pixels' luminance passes a threshold luminance value. In some embodiments, the threshold luminance values are different while, in other embodiments, they are the same.

In some embodiments, the process 5200 determines the contrast of the target image based on the distribution of luma component values of the pixels in the target image. Some such embodiments use a linear regression analysis to determine a line based on distribution of luma component values. The slope of this determined line represents the contrast in some embodiments.

As mentioned above, some embodiments of the process 5200 analyze the target image by identifying the values of the components of the pixels in the target image. In some of these embodiments, the process 5200 determines the set of values that represent the set of characteristics of the target image based on the values of the components of the pixels in the target image. For example, the process 5200 of some embodiments determines the value that represents the average saturation of the pixels in the target image by averaging the saturation value of each pixel in the target image. In some embodiments, the process 5200 applies transforms to the values of the components of the pixels in order to identify the saturation value of the pixels. The values for the other characteristics in the set of characteristics described above are determined in a similar way (e.g., averaging each of the red, green, and blue component values of the pixels in the target image, averaging each of the red, green, and blue component values of dark pixels in the target image, averaging each of the red, green, and blue component values of bright pixels in the target image, etc.).

As noted above, the process 5200 of some embodiments is performed when determining transforms for matching characteristics of a segmented color in the target image to characteristics of the corresponding segmented color in the source image (e.g., the operation 5140). In these embodiments, the same set of twelve characteristics of the target image is determined, but the values are weighted based on the amount of the segmented color in target image. As such, similar techniques described above are used to determine these twelve values for the segmented color, but the values are weighted based on the amount of the segmented color in the target image. For example, if 30 percent of the target image contains a particular segmented color, each value in the set of values is multiplied by 0.3 (except the value that represents whether the image is monochrome, in some embodiments). The value representing whether the target image is monochrome is set to indicate that the target image is monochrome for the transforms for the segmented color in some embodiments.

The operations 5230 and 5240 are the similar to that described for the operations 5210 and 5220, respectively, but the operations 5230 and 5240 are instead performed on a source image. At these operations 5230 and 5240, the process 5200 analyzes the source image and determines a set of values that represent a set of characteristics of the source image.

Finally, the process 5200 determines (at 5250) a set of transforms to match the colors of the target image to the colors of the source image based on the set of values. Some embodiments of the process 5200 determine the set of transforms by identifying the difference between the set of values of the target image and the set of values of the source image. The twelve differences are the set of transforms in some of these embodiments. In this fashion, the set of transforms can be used to match the colors of the target image to the colors of the source image.

B. Color Segmentation

As described with respect to the process 700 and the process 5100, the color segmentation technique of some embodiments segments the colors of the target image and the colors of the source image in order to match the colors of the target image to the colors of the source image. Different embodiments define a set of colors into which colors of an image are segmented differently. For instance, some embodiments define a set of colors by analyzing the multiple images in order to "learn" the colors that should be segmented into each color in the set of colors. The following FIG. 53 illustrates an example process for defining color ranges, which are used to segment the colors of an image in some embodiments.

i. Defining Color Ranges

Figure 53:
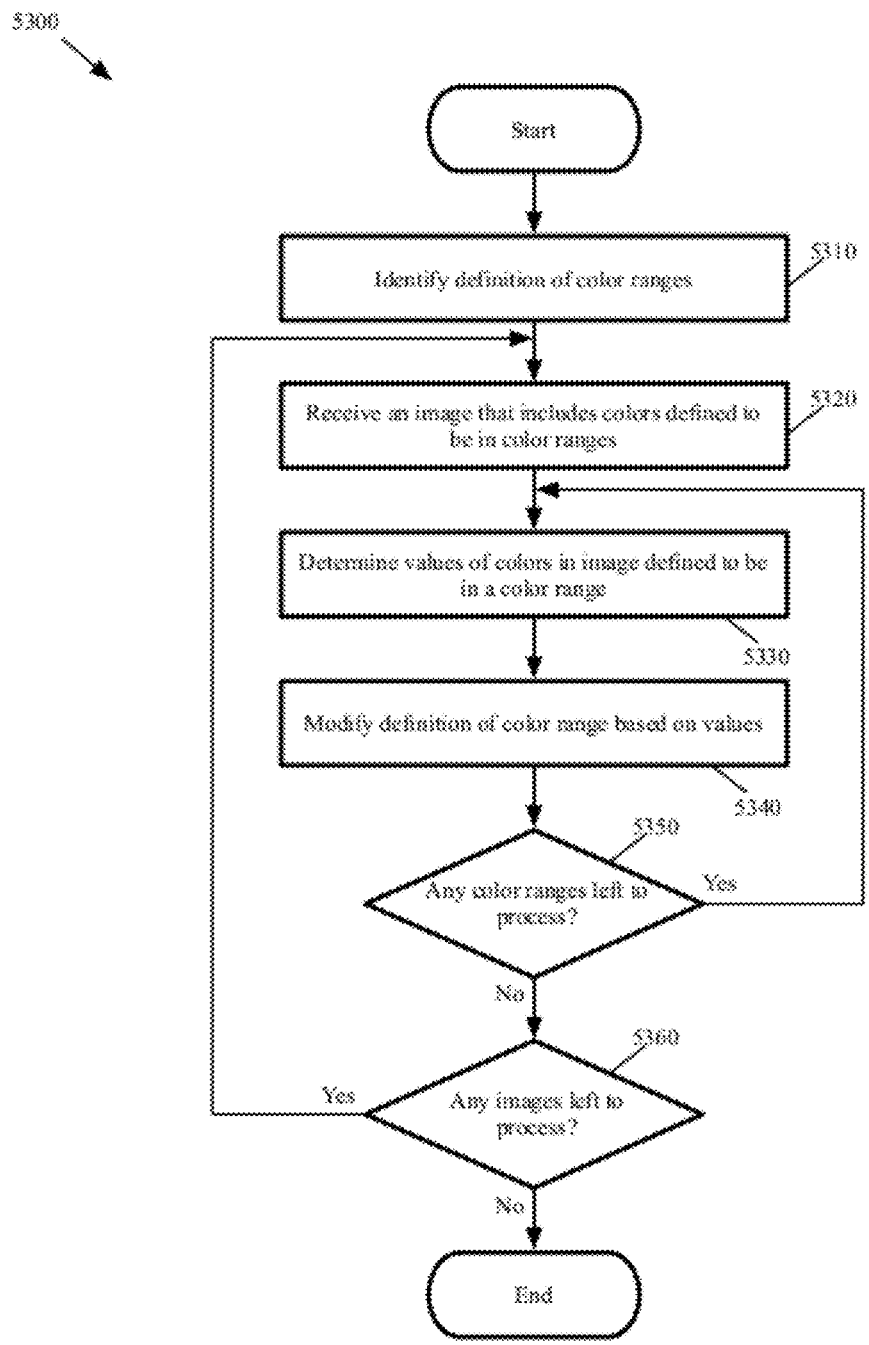
FIG. 53 illustrates a process of some embodiments for defining color ranges.

FIG. 53 illustrates a process 5300 of some embodiments for defining color ranges (e.g., segmented colors or color segments). In some embodiments, the defined color ranges are used (e.g., by the process described below by reference to FIG. 54) to segment the colors of an image.

The process 5300 starts by identifying (at 5310) a definition of a set color ranges. In some embodiments, the definition of each color range in the set of color ranges is defined by sets of color values with each set of color values representing a color in the color range. A set of color values corresponds to color component values that are used to define colors in a color space in some of these embodiments. For instance, for an RGB color space, a definition of a color range is defined by sets of color values that each includes a red component value, a green component value, and a blue component value. The definition of the set of color ranges is defined differently for different color spaces in different embodiments. In addition, in some embodiments, the identified definition of the set of color ranges is a default set of color ranges while, in other embodiments, the identified definition of the set of color ranges is a set of color ranges that was previously modified (e.g., by the process 5300).

The process 5300 then receives (at 5320) an image that includes colors that are defined to be in the set of color ranges. Some of the identified colors might already be defined in the set of color ranges while some of the identified colors might not yet be defined in the set of color ranges. In some embodiments, the received image includes information that identifies colors in the image (e.g., pixels) that are defined to be in the set of color ranges. Some embodiments also include information that identifies colors that are defined to not to be in the set of color ranges. Furthermore, the colors that are defined to be in the set of color ranges are identified by a user in some embodiments.

As mentioned above, some embodiments segment an image to identify different subject types in the image based on the color of the subject types, such as white and blue colors to identify sky, green colors to identify foliage, and red and brown colors to identify earth or terrain. Continuing with this example, the received image may include information that identifies white and blue colored pixels that are defined to be in one color range (e.g., segmented color or color segment), green pixels that are defined to be in another color range, and red and brown pixels that are defined to be in yet another color range.

Next, the process 5300 determines (at 5330) the values of the colors in the image (e.g., pixels) that are defined to be in a color range of the set of color ranges. As noted above, the definition of a color in a color range is defined by a set of color values that represents a color in a color space in some embodiments. As such, the process 5300 of some embodiments determines the values of the colors in the image that are defined to be in the color range by converting the values of the colors to the color space used to define colors in the definition of the set of color ranges when the color space used to define the values of the colors in the image is not the same as the color space used to define the colors in the definition of the set of color ranges. In some of these embodiments, the values are converted by applying a transform or equation to the values.

After determining the values of the colors, the process 5300 modifies (at 5340) the definition of the color range based on the determined values. As mentioned, some of the identified colors in the image might already be defined in the set of color ranges and some of the identified colors in the image might not yet be defined in the set of color ranges. For the values of the colors that are not yet defined in the color range, the process 5300 modifies the definition to include the values of such colors in the color range (e.g., by adding the values of the colors to the definition of the color range). Continuing with the example above, if the color range being processed is the white and blue color range, the values of blue and white colors in the image that are not defined in the color range for these colors is modified to include these values. As described above, some embodiments include information that identifies colors that are defined not to be in the set of color ranges. For these colors, the process 5300 modifies the definition to not include the values of such colors in the color range (e.g., by removing the values of the colors from the definition of the color range).

The process 5300 then determines (at 5350) whether there is any color range left to process. When the process 5300 determines that there is a color range left to process, the process 5300 returns to the operation 5330 to continue processing the remaining color ranges in the set of color ranges.

When the process 5300 determines that there is not a color range left to process, the process 5300 determines (at 5360) whether there is any image left to process. When the process 5300 determines that there is an image left to process, the process 5300 returns to the operation 5320 to continue processing image. By processing numerous images that include variations of colors defined to be in the set of color ranges, the definition of the set of color ranges is refined by including (or removing) such variations of colors in a color range.

ii. Segmenting Colors of an Image

Once a set of colors is defined, some embodiments segment the target image and the source image based on the defined set of colors. As mentioned above, some embodiments segment the colors of an image by converting the color space of the image to a color space that is optimized for identifying colors in the image. FIG. 54 conceptually illustrates an example of a process that segments an image in such a manner. Specifically, FIG. 54 illustrates a process 5400 of some embodiments for segmenting the colors of an image. In some embodiments, the process 5400 is performed by the process 5100 (e.g., to segment the colors of a target image and a source image at the operation 5130).

The process 5400 starts by identifying (at 5410) a set of transforms that is for converting an image from a color space of the image to an XYZ color space. As noted above, the XYZ color space of some embodiments is a device-independent color space (e.g., the International Commission on Illumination (CIE) 1931 XYZ color space).

In some embodiments, an image may be defined by device-dependent color spaces (e.g., an RGB color space), some embodiments of the process 5400 identify the set of transforms that is for converting the image from a device-dependent color space of a particular device to the XYZ color space. In other words, the set of transforms for converting the image from a device-dependent color space of the image to an XYZ color space is unique to the device on which the image is being used or viewed. In some embodiments, the set of transforms identified by the process 5400 is a transformation matrix that represents the set of transforms.

Next, the process 5400 modifies (at 5420) the identified set of transforms to segment the colors of the image into a set of colors. As noted above, the set of transforms can be represented by a transformation matrix in some embodiments. In such embodiments, the process 5400 modifies the transformation matrix so that the transformation matrix segments the colors of the image into the set of colors.

In some embodiments, the process 5400 modifies the set of transforms by modifying the mapping of colors in the color space of the image to the XYZ color space so that the set of transforms shift colors in the color space of the image towards the set of colors in the XYZ color space. For instance, using the example described above by reference to FIG. 53, the set of transforms is modified so that blue and white colors are shifted towards (e.g., mapped to) blue colors so that they are identified as blue colors in the modified color space and red and brown colors are mapped to/shifted towards red colors.

In some embodiments, the set of colors is a set of color ranges that are defined by the process 5300, which is described above, while, in other embodiments, the set of colors is a set of predefined colors (e.g., by a user of an application that provides a color matching tool that uses the process 5400 to segment colors of images).

Finally, the process 5400 applies (at 5430) the modified set of transforms to the image to segment the colors of the image into the set of colors. As mentioned above, a transformation matrix is used to represent the set of transforms in some embodiments. In such embodiments, the process 5400 applies the set of transforms to the image on a pixel-by-pixel basis. As such, the transformation matrix is applied to each pixel of the image to segment the colors of the image into the set of colors.

Although the process 5400 illustrates modifying a transform for converting a color space of an image to an XYZ color space, other transforms that convert the color space of the image to a device-independent color space may be used and similarly modified in other embodiments.

Figure 55:
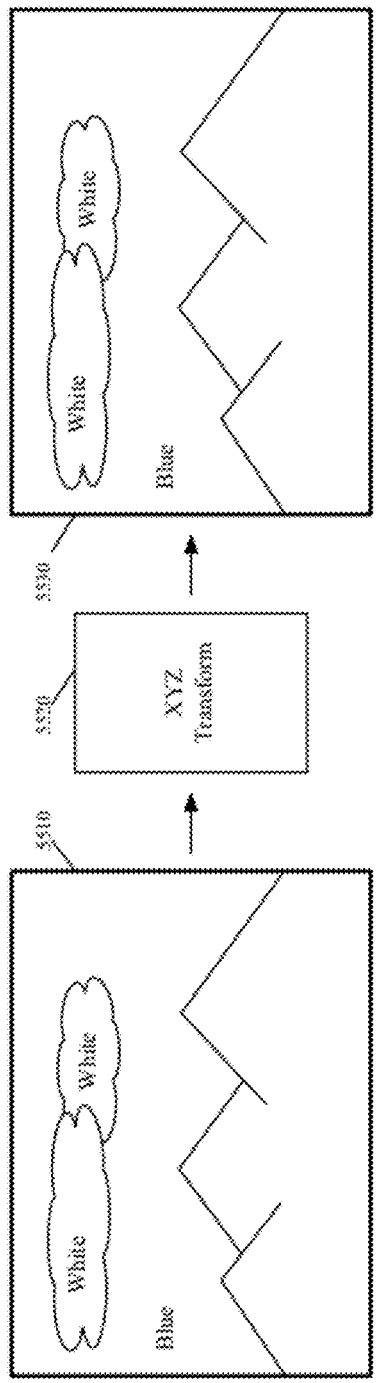
FIGS. 55-58 illustrates examples of segmenting colors of an image into a set of colors.

The following FIGS. 55-58 illustrates several examples of segmenting colors of an image into a set of colors. FIG. 55 illustrates an example of applying an unmodified XYZ transform 5520 to an image 5510 to convert a color space of the image (e.g., an RGB color space) to an XYZ color space. As illustrated in this figure, the image 5510 in this example shows a mountain range against a blue sky and white clouds. After the XYZ transform 5520 for converting the color space of the image 5510 to the XYZ color space is applied, the colors of the converted image 5530 remain the same. As shown, the color of the sky in the image 5530 is still blue and the color of the clouds in the image 5530 is still white.

Figure 56:
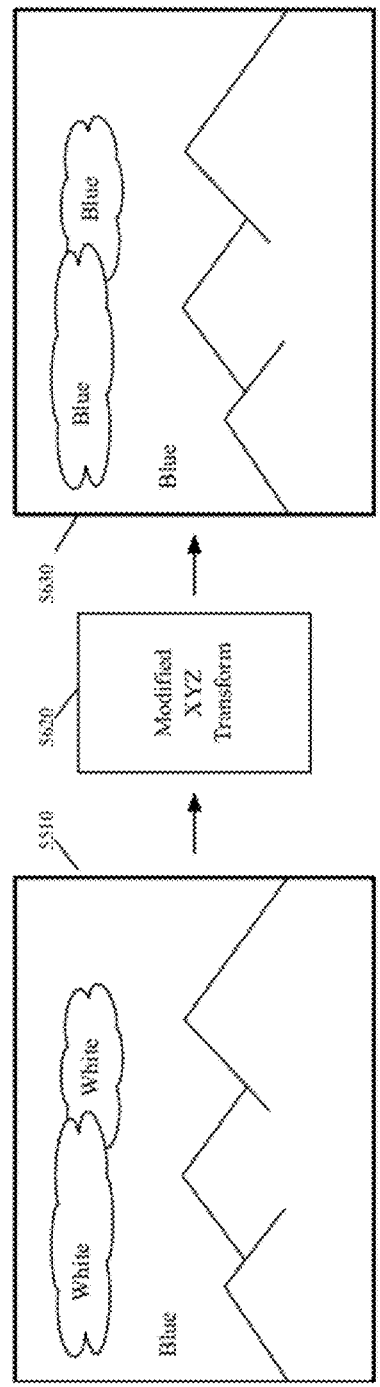

FIG. 56 illustrates an example of segmenting colors of the image 5510 into a set of colors when applying a modified XYZ transform 5620 to the image 5510. In this example, the blue colors and the highlights (e.g., white colors) of the image 5510 are segmented to blue colors. As such, the XYZ transform 5520 is modified to identify blue colors and highlights in the image 5510 and shift them towards blue colors. After applying the modified XYZ transform 5620 to the image 5510, the blue colors and the highlights (e.g., white colors) of the converted image 5630 are segmented to blue colors. As shown, the color of the sky in the image 5630 is blue and the color of the clouds in the image 5630 is also blue.

Figure 57:
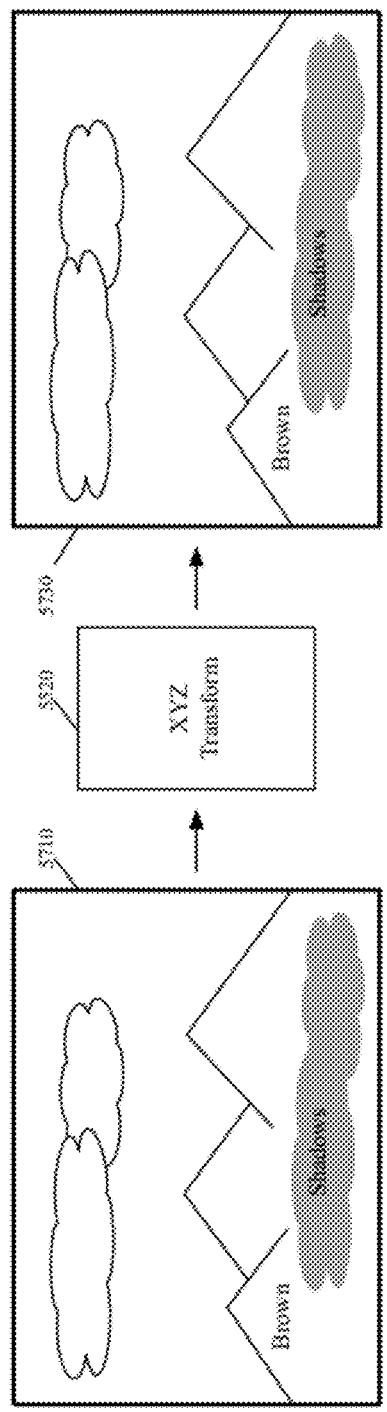

FIG. 57 illustrates another example of applying an unmodified XYZ transform 5520 to an image 5710 to convert a color space of the image (e.g., an RGB color space) to an XYZ color space. In this example, the image 5710 shows a brown mountain range against a sky and clouds and a gray shadow on the ground that is cast by the clouds. After the XYZ transform 5520 for converting the color space of the image 5710 to the XYZ color space is applied, the colors of the converted image 5730 are unchanged. As shown, the color of the mountain range in the image 5730 is still brown and the color of the shadows in the image 5530 is still gray.

Figure 58:
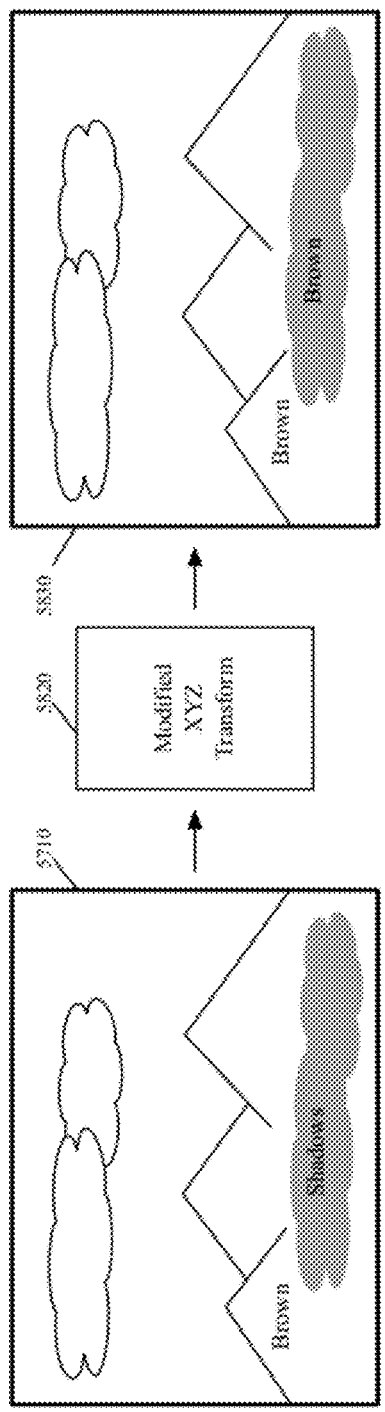

FIG. 58 illustrates an example of segmenting colors of the image 5710 into a set of colors when applying a modified XYZ transform 5820 to the image 5710. The brown colors and the shadows (e.g., gray colors and black colors) of the image 5710 are segmented to brown colors. Thus, the XYZ transform 5520 is modified to identify brown colors and shadows in the image 5710 and shift them towards brown colors. After applying the modified XYZ transform 5820 to the image 5710, the brown colors and the shadows (e.g., gray colors and black colors) of the converted image 5830 are segmented to brown colors. As illustrated in FIG. 58, the color of the mountain range in the image 5830 is brown and the color of the shadow in the image 5830 is also brown.

The FIGS. 55-58 illustrated above show several examples of segmenting colors of an image into a set of colors. However, additional and/or other colors can be segmented into different sets of colors in different embodiments. For example, some embodiments segment red colors, brown colors, and shadow-like colors to a certain color (e.g., red colors or brown colors).

C. Matching Colors of Images

Figure 59:
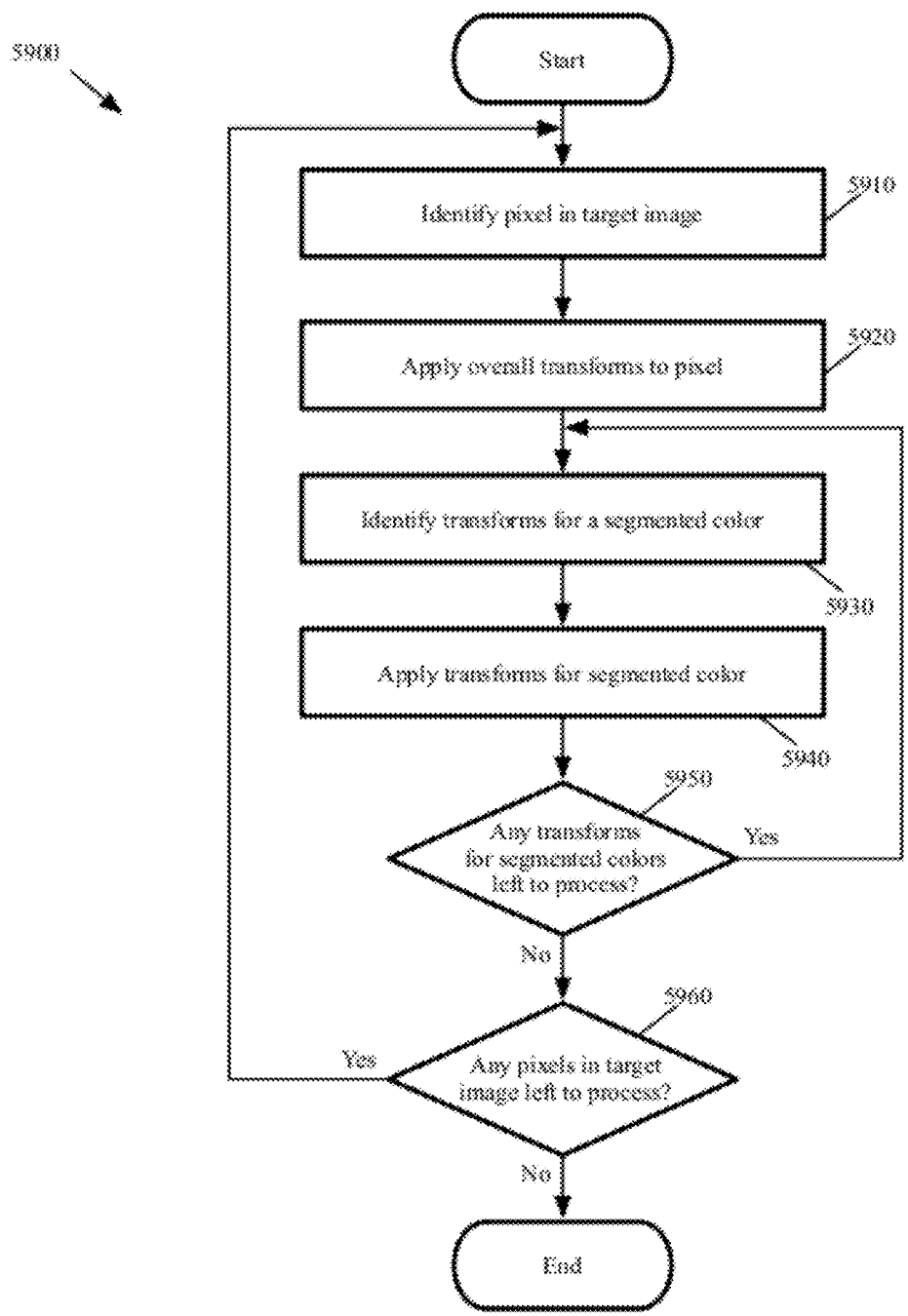
FIG. 59 conceptually illustrates a process of some embodiments for applying transforms to a target image to match the colors of the target image to the colors of a source image.

As mentioned above, after determining transforms for matching the colors of a target image to the colors of a source image, some embodiments apply the determined transforms to the target image (e.g., at the operations 5120 and 5140). FIG. 59 conceptually illustrates a process 5900 of some embodiments for applying transforms to a target image to match the colors of the target image to the colors of a source image. In some embodiments, the process 5900 is performed by the process 5100 (e.g., to apply transforms to a target image at the operation 5160). In this example, the transforms that are applied to the target image are transforms determined by the process 5100 (e.g., transforms for a set of characteristics and transforms for segmented colors), as described above.

The process 5900 starts by identifying (at 5910) a pixel in the target image. The process 5900 then applies (at 5920) the set of transforms for matching a set of characteristics of the target image to the set of characteristics of the source image. As noted above, some embodiments represent the transforms using a transformation matrix. In such embodiments, the transformation matrix is applied to the pixel.

Next, the process 5900 identifies (at 5930) a set of transforms for matching characteristics of a segmented color of the target image to characteristics of the segmented color in the source image. After identifying the set of transforms, the process 5900 applies (at 5940) the set of transforms to the pixel. As mentioned above, some embodiments use a transformation matrix to represent this set of transforms. In such embodiments, the process 5900 applies the transformation matrix to the pixel.

The process 5900 then determines (at 5950) whether any set of transforms for a segmented color is left to process. When the process 5900 determines that there is a set of transforms for a segmented color left to process, the process 5900 returns to the operation 5930 to continue identifying and applying sets of transforms for any remaining segmented colors. When the process 5900 determines that there is not a set of transforms for a segmented color left to process, the process 5900 proceeds to operation 5960.

At 5960, the process 5900 determines whether any pixel in the target image is left to process. When the process 5900 determines that there is a pixel in the target image left to process, the process 5900 returns to the operation 5910 to continue processing any remaining pixels in the target image. When the process 5900 determines that there is not a pixel in the target image left to process, the process 5900 ends.

Figure 60:
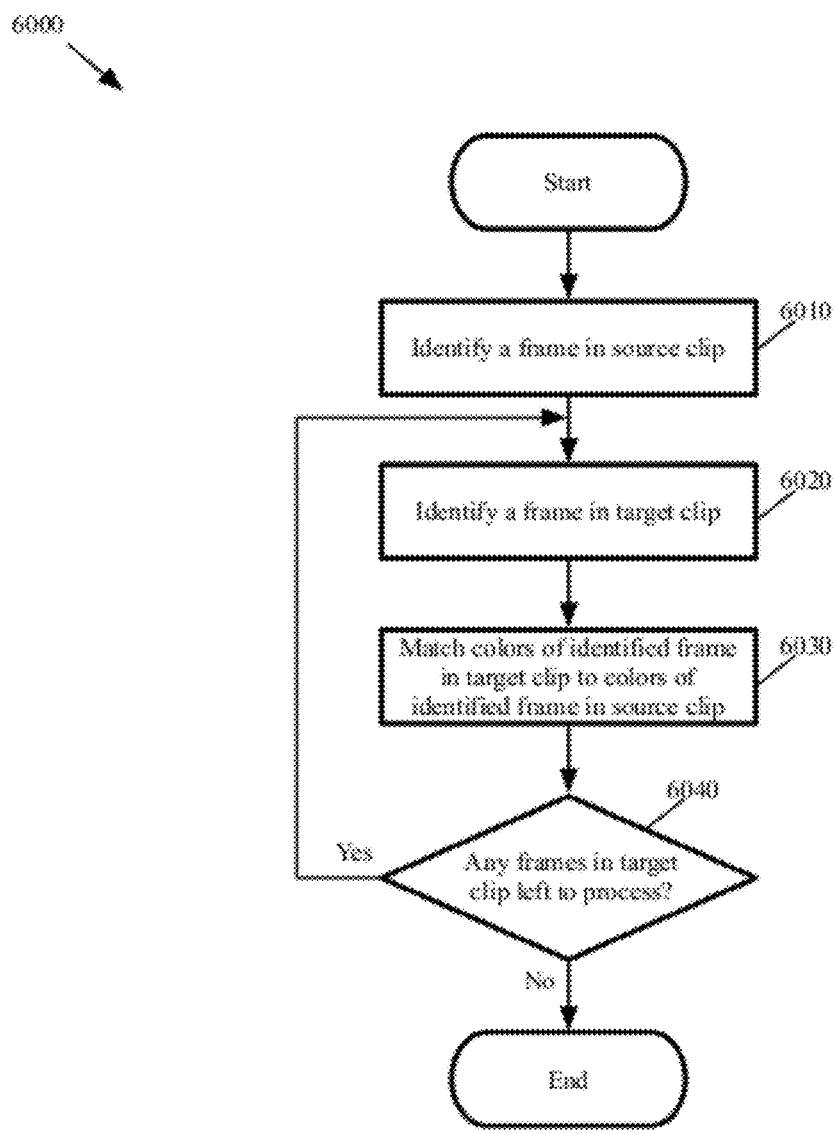
FIG. 60 illustrates a process of some embodiments for matching the colors of each frame of a target video clip to the colors of a source image.

Many of the figures illustrated above show examples of matching the colors of an image to the colors of another image. However, in some embodiments, the colors of frames in a target video clip are matched to the colors of a frame in a source video clip (or a source image). For instance, some embodiments identify a frame in the source video clip to which to match all the frames in the target video clip. The follow FIG. 60 illustrates an example of a process that matches the frames of a target video clip to a frame of a source video clip. Specifically, FIG. 60 illustrates a process 6000 of some embodiments for matching the colors of each frame of a target video clip to the colors of a frame of a source video clip.

The process 6000 begins by identifying (at 6010) a frame in a source video clip. Different embodiments identify a frame in the source video clip in different ways. For example, one way of identifying a frame in a source video clip is described in further detail below by reference to FIG. 61.

Next, the process 6000 identifies (at 6020) a frame in the target video clip. When identifying the initial frame in the target video clip, different embodiments identify the frame differently. For instance, some embodiments may identify the first frame in the target video clip (e.g., the frame that is displayed first when the video clip is played back) as the initial frame while other embodiments may identify the last frame in the target video clip (e.g., the frame that is displayed last when the video clip is played back) as the initial frame. The process 6000 of other embodiments identifies other frames of the target video clip as the initial frame.

The process 6000 then matches (at 6030) the colors of the identified frame in the target video clip to the colors of the identified frame in the source image. Some embodiments of the process 6000 performs the process 5100, which is previously described by reference to FIG. 51, to match the colors of the identified frame of the target video clip to the colors of the identified frame of the source video clip. In some such embodiments, the process 6000 uses the same transforms that are determined (e.g., at the operations 5110 and 5140) for the initial identified frame of the target video clip to match the colors of subsequent identified frames of the target video clip to the colors of the identified frame of the source video clip. In contrast, the process 6000 of other such embodiments determines transforms (e.g., at the operations 5110 and 5140) for the identified frame of the target video clip each time the process 6000 matches the colors of the identified frame of the target video clip to the colors of the identified frame of the source video clip.

Finally, the process 6000 determines (at 6040) whether any frame in the target video clip is left to process. When the process 6000 determines that there is a frame in the target video clip left to process, the process 6000 returns to the operation 6020 to continue processing frames in the target video clip. Otherwise, the process 6000 ends.

While the process 6000 illustrates matching the colors of a target video clip to a frame of a source video clip, the process 6000 of some embodiments can be used for matching the colors of a target video clip to a source image (instead of a source video clip) as well. In some of these embodiments, instead of identifying a frame in a source video clip at the operation 6010, the process 6000 identifies a source image at the operation 6010.

Figure 61:
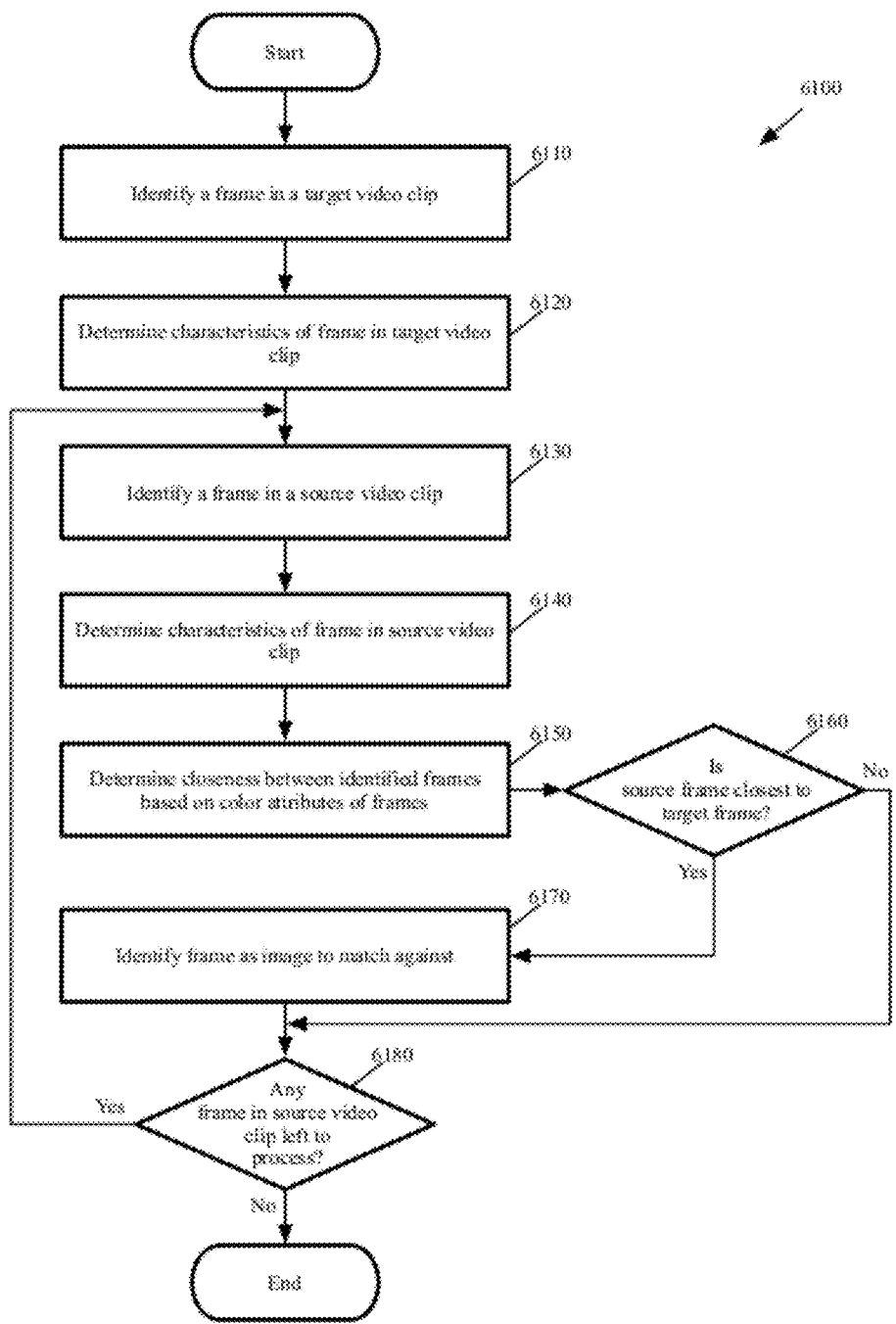
FIG. 61 conceptually illustrates a process of some embodiments for identifying a frame in a source video clip to match a frame of a target video clip against.

As described above, different embodiments identifying a frame in a source video clip for matching a frame in a target video clip against in different ways. Some embodiments identify the frame in the source video clip that is "closest" to the frame in the target video clip. FIG. 61 illustrates an example of such a process. Specifically, FIG. 61 conceptually illustrates a process 6100 of some embodiments for identifying a frame in a source video clip against which to match a frame of a target video clip. Although the process 6100 illustrates identifying a frame in a source video clip against which to match a frame of a target video clip, in some embodiments the process 6100 can be used to identifying a frame in a source video clip against which to match a target image. In some embodiments, the process 6100 is performed by the process 6000 (e.g., to identify a frame in a source video clip at the operation 6010).

The process 6100 starts by identifying (at 6110) a frame in the target video clip. In some embodiments, the identified frame is a frame in the target video clip selected by a user through a GUI of an application (e.g., GUI 100) that provides the color matching tool. In other embodiments, the identified frame is a default frame (e.g., the first frame, middle frame, last frame, etc.) in the target video clip.

Next, the process 6100 identifies (at 6120) a set of characteristics of the identified frame of the target video clip. In some embodiments, the process 6100 identifies the set of characteristics by determining a set of values that represent a set of characteristics of the frame in the same or similar fashion as described above by reference to operations 5220 and 5240 of FIG. 52.

The process 6100 then identifies (at 6130) a frame in the source video clip. When identifying the initial frame in the source video clip, some embodiments of the process 6100 identify the first frame (e.g., the frame that is displayed first when the video clip is played back) as the initial frame while other embodiments of the process 6100 identify the last frame (e.g., the frame that is displayed last when the video clip is played back). Still, some embodiments identify the middle frame (e.g., the frame that is displayed midway through playback of the video clip). Other ways of identifying the initial frame are possible in other embodiments.

After identifying a frame in the source video clip, the process 6100 identifies (at 6140) a set of characteristics of the identified frame of the source. Similar to the operation 6120, the process 6100 of some embodiments identifies the set of characteristics by determining a set of values that represents a set of characteristics of the frame in the same or similar fashion as described above by reference to operations 5220 and 5240 of FIG. 52.

Next, the process 6100 determines (at 6150) the closeness between the frame in the target video clip and the frame in the source video clip based on the sets of characteristics of the frames. In some embodiments, the closeness between the frames is determined by the Euclidean distance between the sets of values.

FIG. 62 illustrates an example of determining closeness between two images. In particular, this example illustrates determining the Euclidean distance between a matrix of a set of twelve values that are determined in the similar manner described above by reference to operations 5220 and 5240 of FIG. 52.

To determine the Euclidean distance between the two 3×4 matrices of values, the following equation is used:

$$\text{distance} = \sqrt{\begin{array}{l}(T1-S1)^2 + (T2-S2)^2 + (T3-S3)^2 + (T4-S4)^2 + \\ (T5-S5)^2 + (T6-S6)^2 + (T7-S7)^2 + (T8-S8)^2 + \\ (T9-S9)^2 + (T10-S10)^2 + (T11-S11)^2 + (T12-S12)^2\end{array}}$$

where T1-T12 are the values of the matrix of the target frame and S1-S12 are the values of the matrix of the source frame. For this example, the values D1-D12 are used for the matrix of the target frame and the values E1-E12 are used for the matrix of the source frame. As shown in FIG. 62, the above equation is used to determine the Euclidean distance between the matrix of the target frame and the matrix of the source frame.

Some embodiments apply different weights to different values. In this manner, values representing characteristics of the frames that are determined to be more important than others in determining the closeness between the matrices of the frames are given more weight than those values that are determined to be less important.

Returning to FIG. 61, the process 6100 then determines (at 6160) whether the frame of the source video clip is closest to the frame of the target video clip. In some embodiments that use the above equation to determine closeness, the frame in the source video clip that is closest to the frame in the target video clip is the frame with the smallest Euclidean distance to the frame in the target video clip. When the process 6100 determines that the frame of the source video clip is closest to the frame of the target video clip, the process identifies (at 6170) the frame in the source video clip as the closest frame to the frame in the target video clip. Otherwise, the process 6100 proceeds to operation 6180.

At 6180, the process 6100 determines whether any frame in the source video clip is left to process. When the process 6100 determines that there is a frame in the source video clip left to process, the process 6100 returns to operation 6130 to continue processing any remaining frames in the source video clip in order to identify the frame in the source video clip that the closest to the frame in the target video clip. When the process 6100 determines that there is not a frame in the source video clip left to process, the process 6100 ends.

IV. Software Architecture

Figure 63:
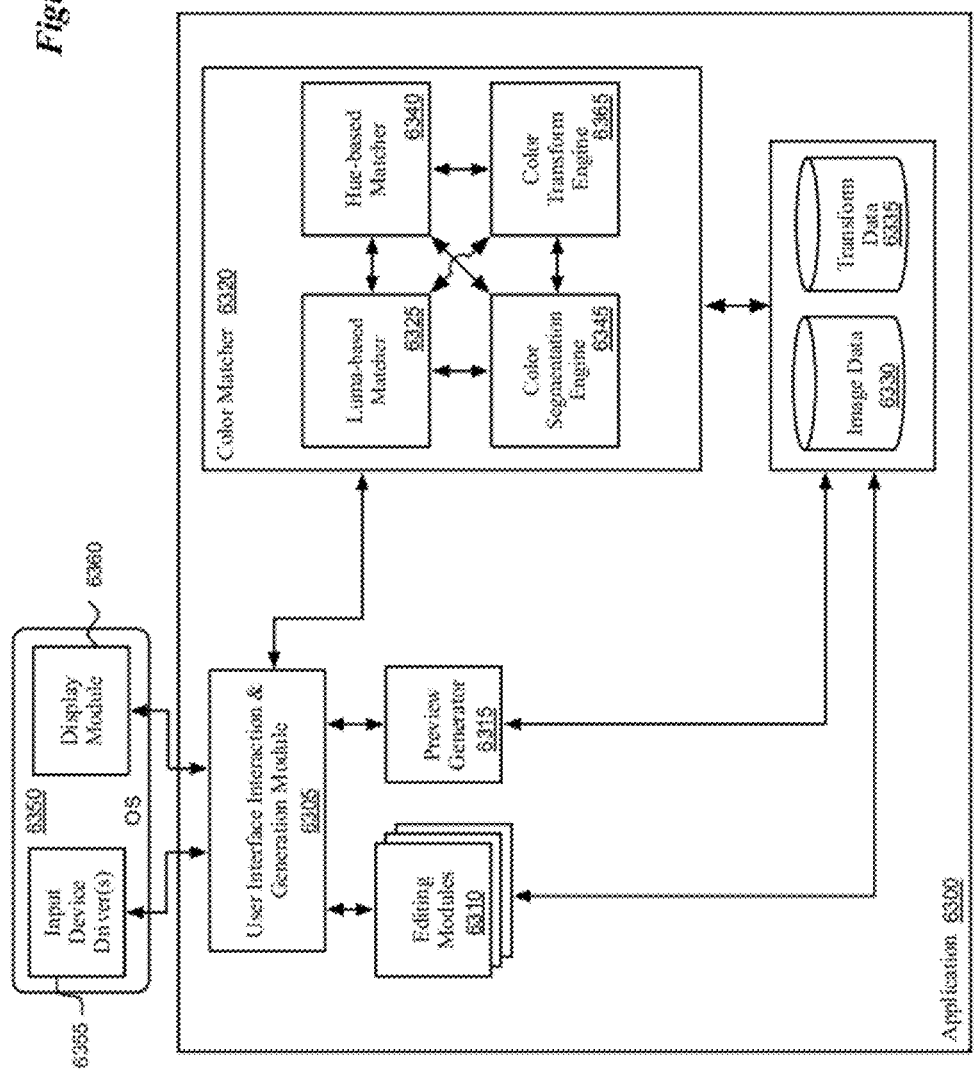
FIG. 63 conceptually illustrates the software architecture of a media editing application of some embodiments.

In some embodiments, the processes described above are implemented as software running on a particular machine, such as a computer or a handheld device, or stored in a computer readable medium. FIG. 63 conceptually illustrates the software architecture of a media editing application 6300 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

As shown, the media editing application 6300 includes a user interface (UI) interaction module 6305, a set of editing modules 6310, a preview generator 6315, and a color matcher 6320. The media editing application 6300 also includes media data 6330 and transform data 6335. In some embodiments, the transform data 6335 stores numerous transform that the media-editing application may apply to images before color matching images (e.g., transforms for converting an image to a particular color space). In some embodiments, the transform data 6335 also stores transforms determined by the color matcher 6320 during color matching images, which the color matcher 6320 might later use for color matching images (e.g., gain and lift transforms, black balance and white balance transforms, saturation transforms, etc.). The media data 6330 stores media content (e.g., text, audio, image, and video content) data of media clips. In some embodiments, storages 6330 and 6335 are all stored in one physical storage. In other embodiments, the storages are in separate physical storages. In some cases, for example, the media data 6330 may be stored across multiple hard drives, network drives, etc.

FIG. 63 also illustrates an operating system 6350 that includes input device driver(s) 6355 and display module 6360. In some embodiments, as illustrated, the input device drivers 6355 and display module 6360 are part of the operating system 6350 even when the media editing application is an application separate from the operating system 6350.

The input device drivers 6355 may include drivers for translating signals from a keyboard, mouse, touchpad, tablet, touch screen, etc. A user interacts with one or more of these input devices, which send signals to their corresponding device driver. The device driver then translates the signals into user input data that is provided to the UI interaction module 6305.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch-screen device. In some embodiments, with touch control, a user can directly manipulate objects by interacting with the graphical user interface that is displayed on the display of the touch-screen device. For instance, a user can select a particular object in the graphical user interface by simply touching that particular object on the display of the touch-screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 6360 translates the output of a user interface for a display device. That is, the display module 6360 receives signals (e.g., from the UI interaction module 6305) describing what should be displayed and translates these signals into pixel information that is sent to the display device. The display device may be an LCD, plasma screen, CRT monitor, touch screen, etc.

The UI interaction module 6305 of the media editing application 6300 interprets the user input data received from the input device drivers 6355 and passes it to various modules, including the editing modules 6310, and the preview generator 6315. The UI interaction module also manages the display of the UI and outputs this display information to the display module 6360. This UI display information may be based on information from the color matcher 6320 or directly from input data (e.g., when a user moves an item in the UI that does not affect any of the other modules of the media editing application 6300).

The color matcher 6320 matches the colors of an image to the colors of another image based on user inputs received from the UI interaction module 6305. The color matcher 6320 includes a luma-based matcher 6325, a hue-based matcher 6340, a color segmentation engine 6345, and a color transform engine 6365.

The luma-based matcher 6325 matches images based on the images' luma. In some embodiments, the luma-based matcher 6325 includes the transform generator 220, as described above. In these embodiments, the luma-based matcher 6325 might identify luma ranges for images being color matched, determine transforms based on the identified luma ranges, and blend the determined transforms. The luma-based matcher 6325 sends transforms to the color transform engine 6365 to apply the transforms to the image being matched.

The hue-based matcher 6340 matches images based on the images' hues. In some embodiments, the hue-based matcher 6340 includes the hue engine 520, as described above. In these embodiments, the hue-based matcher 6340 may identify dominant hue ranges in the images being color matched, match the identified hue ranges, and perform hue shifts on the matched hue ranges. The hue-based matched 6340 sends transforms to the color transform engine 6365 to apply the transform to the image being matched.

The color segmentation engine 6345 segments images being matched and matches the segmented colors of the images. The color segmentation engine 6345 might identify a frame in a video clip to which to match another image or a frame or frames of another video clip. The color segmentation engine 6345 sends transforms to the color transform engine 6365 to apply the transform to the image being matched.

The color transform engine 6365 receives transforms from the luma-based matcher 6325, the hue-based matcher 6340, and the color segmentation engine 6345 along with an image to which to apply the transforms. In some embodiments, different color matching options are provided by the media-editing application. However, in some embodiments, a combination of different color matching options is provided as one color matching option. In such embodiments, after applying transform to an image, the color transform engine 6365 might send the image to the luma-based matcher 6325, the hue-based matcher 6340, and/or the color segmentation engine 6345 for further color matching.

The preview generator 6315 enables the output of audio and video from the media editing application so that a user can preview images or clips. The preview generator 6315 uses the media data to send display instructions to the UI interaction module 6305, which incorporates the preview into the user interface. In some embodiments, the preview generator 6315 sends a preview of a color matching operation to an image or frame in a video clip to the UI interaction module 6305 before the color matcher 6320 actually performs the color matching operation(s).

While many of the features have been described as being performed by one module (e.g., the color segmentation engine 6345 or the preview generator 6315), one of ordinary skill would recognize that the functions might be split up into multiple modules. Similarly, the functions described as being performed by multiple different modules might be performed by a single module in some embodiments (e.g., the color transform engine 6365 might be included in each of the luma-based matcher 6325, the hue-based matcher 6340, and the color segmentation engine 6345).

V. Computer System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 64:
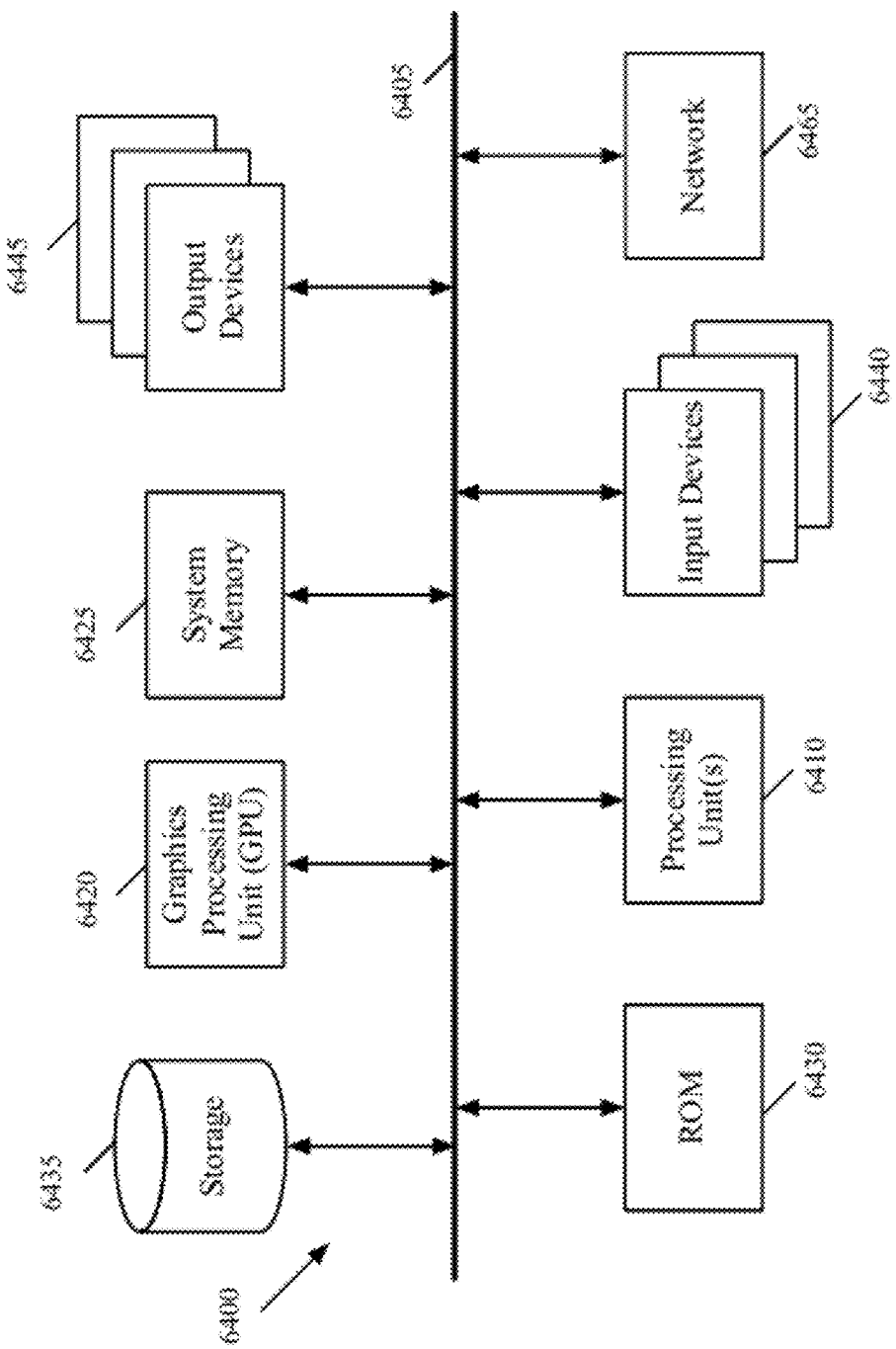
FIG. 64 conceptually illustrates an electronic computer system with which some embodiments of the invention are implemented.

FIG. 64 conceptually illustrates a computer system 6400 with which some embodiments of the invention are implemented. The electronic system 6400 may be a computer, phone, PDA, or any other sort of electronic device. Such an electronic system includes various types of computer readable media and interfaces for various other types of computer readable media. Electronic system 6400 includes a bus 6405, processing unit(s) 6410, a graphics processing unit (GPU) 6420, a system memory 6425, a read-only memory 6430, a permanent storage device 6435, input devices 6440, and output devices 6445.

The bus 6405 collectively represents all system, peripheral, and chipset buses that communicatively connect the numerous internal devices of the electronic system 6400. For instance, the bus 6405 communicatively connects the processing unit(s) 6410 with the read-only memory 6430, the GPU 6420, the system memory 6425, and the permanent storage device 6435.

From these various memory units, the processing unit(s) 6410 retrieve instructions to execute and data to process in order to execute the processes of the invention. The processing unit(s) may be a single processor or a multi-core processor in different embodiments. Some instructions are passed to and executed by the GPU 6420. The GPU 6420 can offload various computations or complement the image processing provided by the processing unit(s) 6410. In some embodiments, such functionality can be provided using CoreImage's kernel shading language.

The read-only-memory (ROM) 6430 stores static data and instructions that are needed by the processing unit(s) 6410 and other modules of the electronic system. The permanent storage device 6435, on the other hand, is a read-and-write memory device. This device is a non-volatile memory unit that stores instructions and data even when the electronic system 6400 is off. Some embodiments of the invention use a mass-storage device (such as a magnetic or optical disk and its corresponding disk drive) as the permanent storage device 6435.

Other embodiments use a removable storage device (such as a floppy disk, flash drive, or ZIP® disk, and its corresponding disk drive) as the permanent storage device. Like the permanent storage device 6435, the system memory 6425 is a read-and-write memory device. However, unlike storage device 6435, the system memory is a volatile read-and-write memory, such a random access memory. The system memory stores some of the instructions and data that the processor needs at runtime. In some embodiments, the invention's processes are stored in the system memory 6425, the permanent storage device 6435, and/or the read-only memory 6430. For example, the various memory units include instructions for processing multimedia clips in accordance with some embodiments. From these various memory units, the processing unit(s) 6410 retrieve instructions to execute and data to process in order to execute the processes of some embodiments.

The bus 6405 also connects to the input and output devices 6440 and 6445. The input devices enable the user to communicate information and select commands to the electronic system. The input devices 6440 include alphanumeric keyboards and pointing devices (also called "cursor control devices"). The output devices 6445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 64, bus 6405 also couples electronic system 6400 to a network 6465 through a network adapter (not shown). In this manner, the computer can be a part of a network of computers (such as a local area network ("LAN"), a wide area network ("WAN"), or an Intranet, or a network of networks, such as the Internet. Any or all components of electronic system 6400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 6, 7, 10, 12, 14, 15, 16, 20, 23, 26, 28, 30, 32, 35, 37, 40, 46, 49, 50, 51, 52, 53, 54, 59, 60, and 61) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A non-transitory computer readable medium storing a computer program which when executed by at least one processing unit matches colors of a first image to colors of a second image, the program comprising sets of instructions for:
    identifying a first set of transforms for converting pixel values of the first and second images from first and second color spaces to a device-independent color space;
    modifying the first set of transforms to generate a second set of transforms that not only convert the pixel values of the first and second images to the device-independent color space, but also shift colors during the transform in order to segment the colors into more-defined color segments in the device-independent color space;
    applying the second set of transforms to pixel values of the first and second images; and
    modifying, for each color segment in the color segments, pixel values in the first image so that colors of pixels in the first image that fall within the color segment shift towards colors of pixels in the second image that fall within the color segment.

2. The non-transitory computer readable medium of claim 1, wherein the second set of transforms includes a transform for segmenting highlight colors into blue colors.

3. The non-transitory computer readable medium of claim 2, wherein highlight colors include colors having a luminance value greater than a threshold value.

4. The non-transitory computer readable medium of claim 1, wherein the second set of transforms includes a transform for segmenting shadow colors into brown or red colors.

5. The non-transitory computer readable medium of claim 4, wherein shadow colors include colors having a luminance value less than a threshold value.

6. The non-transitory computer readable medium of claim 1, wherein the device-independent color space is an XYZ color space.

7. The non-transitory computer readable medium of claim 1, wherein the set of instructions for modifying pixel values in the first image comprises a set of instructions for modifying pixel values in the first image so that, for each color segment in the color segments, a set of characteristics of the colors of pixels in the first image that fall within the color segment matches the set of characteristics of the colors of pixels in the second image that fall within the color segment.

8. The non-transitory computer readable medium of claim 7, wherein the set of characteristics includes an average color of pixels in the segmented color.

9. The non-transitory computer readable medium of claim 7, wherein the set of characteristics includes an average color of dark pixels in the segmented color.

10. The non-transitory computer readable medium of claim 7, wherein the set of characteristics includes an average color of bright pixels in the segmented color.

11. The non-transitory computer readable medium of claim 7, wherein the set of characteristics includes an average saturation of pixels in the segmented color.

12. The non-transitory computer readable medium of claim 7, wherein the set of characteristics includes an average contrast of pixels in the segmented color.

13. The non-transitory computer readable medium of claim 1, wherein the first image is a frame of a video clip.

14. The non-transitory computer readable medium of claim 1, wherein the video clip is a first video clip, wherein the second image is a frame of a second video clip.

15. The non-transitory computer readable medium of claim 1, wherein the first image is a still image.

16. A method for color matching a first image to a second image, the method comprising:
   determining a first set of transforms for modifying pixel values of pixels in the first image to match a first set of characteristics of the first image to the first set of characteristics of the second image;
   segmenting pixels of the first image into a set of colors and pixels of the second image into the set of colors;
   determining a second set of transforms for modifying pixel values of pixels in the first image to match a second set of characteristics of each color in the set of colors of the first image to the second set of characteristics of the corresponding color of the second image; and
   modifying the pixel values of the first image to match the pixel values of the second image by applying the first set of transforms and the second set of transforms to the pixel values of the first image so that the first set of characteristics of the first image matches to the first set of characteristics of the second image and the second set of characteristics of each color in the set of colors of the first image matches to the second set of characteristics of the corresponding color of the second image.

17. The method of claim 16, wherein segmenting the pixels comprises:
   applying to the pixels of the first image a third set of transforms for mapping the pixels of the first image into the set of colors; and
   applying to the pixels of the second image a fourth set of transforms for mapping the pixels of the second image into the set of colors.

18. The method of claim 17, wherein the third set of transforms and the fourth set of transforms are the same.

19. The method of claim 17, wherein the third set of transforms is further for converting the first image to a device-independent color space.

20. The method of claim 19, wherein the fourth set of transforms is further for converting the second image to a device-independent color space.

21. The method of claim 20, wherein the device-independent color space is an XYZ color space.

22. The method of claim 16, wherein the modification of the pixel values of the first image by applying the first set of transforms to the first image is performed before the segmentation of colors of the first and second images, the determination of the second set of transforms, and the modification of the pixel values of the first image by applying the second set of transforms.

23. The method of claim 16, wherein the first and second sets of characteristics each includes average color.

24. The method of claim 16, wherein the first and second sets of characteristics each includes average color of bright pixels.

25. The method of claim 16, wherein the first and second sets of characteristics each includes average color of dark pixels.

26. The method of claim 16, wherein the first and second sets of characteristics each includes average saturation.

27. The method of claim 16, wherein the first and second sets of characteristics each includes average contrast.

* * * * *